United States Patent
Yamaguchi et al.

(10) Patent No.: US 9,951,707 B2
(45) Date of Patent: Apr. 24, 2018

(54) EXHAUST PURIFICATION SYSTEM OF INTERNAL COMBUSTION ENGINE

(71) Applicant: TOYOTA JIDOSHA KABUSHIKI KAISHA, Toyota-shi, Aichi-ken (JP)

(72) Inventors: Yuji Yamaguchi, Susono (JP); Koichi Hoshi, Susono (JP); Hiroyuki Hokuto, Numazu (JP); Kazuya Suzuki, Susono (JP); Yuji Miyoshi, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 258 days.

(21) Appl. No.: 15/066,089

(22) Filed: Mar. 10, 2016

(65) Prior Publication Data

US 2016/0265465 A1    Sep. 15, 2016

(30) Foreign Application Priority Data

Mar. 12, 2015 (JP) ................. 2015-050013

(51) Int. Cl.
*F02D 41/24* (2006.01)
*F02D 41/00* (2006.01)
(Continued)

(52) U.S. Cl.
CPC ........... *F02D 41/2461* (2013.01); *F01N 3/18* (2013.01); *F01N 11/007* (2013.01);
(Continued)

(58) Field of Classification Search
CPC .... F02D 41/2461; F02D 41/0295; F01N 3/10; F01N 11/007; F01N 2550/02; F02N 2560/025
See application file for complete search history.

(56) References Cited

U.S. PATENT DOCUMENTS

| | | | |
|---|---|---|---|
| 6,877,498 B1 * | 4/2005 | Matsushima | F02D 41/1474 123/672 |
| 2001/0025485 A1 * | 10/2001 | Kobayashi | F02D 41/0295 60/285 |

(Continued)

FOREIGN PATENT DOCUMENTS

| | | |
|---|---|---|
| EP | 2 511 491 A1 | 10/2012 |
| JP | H08-246925 A | 9/1996 |
| JP | 2005-098205 A | 4/2005 |
| JP | 2011-069337 A | 4/2011 |
| JP | 2012-219732 A | 11/2012 |

*Primary Examiner* — Patrick Maines
(74) *Attorney, Agent, or Firm* — Andrews Kurth Kenyon LLP

(57) ABSTRACT

The exhaust purification system comprises an exhaust purification catalyst, downstream side air-fuel ratio sensor, and control device. The control device performs average air-fuel ratio control which alternately sets a target average air-fuel ratio between a rich air-fuel ratio and a lean air-fuel ratio and inter-cylinder air-fuel ratio control which controls the target air-fuel ratios of the cylinders so that the target air-fuel ratio becomes the rich air-fuel ratio at least at one cylinder among the plurality of cylinders even if the target average air-fuel ratio is set to the lean air-fuel ratio. The control device uses a cumulative value of a first oxygen amount from when switching the target average air-fuel ratio to the lean air-fuel ratio to when again switching it to the rich air-fuel ratio and a cumulative value of a second oxygen amount from when switching the target average air-fuel ratio to the rich air-fuel ratio to when again switching it to the lean air-fuel ratio as the basis for correcting a parameter relating to the air-fuel ratio so that the difference of these becomes smaller as learning control.

17 Claims, 23 Drawing Sheets

(51) Int. Cl.
  *F02D 41/02* (2006.01)
  *F01N 11/00* (2006.01)
  *F02D 41/14* (2006.01)
  *F01N 3/18* (2006.01)
  *F01N 3/10* (2006.01)
  *F01N 3/08* (2006.01)

(52) U.S. Cl.
  CPC ....... *F02D 41/008* (2013.01); *F02D 41/0235* (2013.01); *F02D 41/0295* (2013.01); *F02D 41/1408* (2013.01); *F02D 41/1454* (2013.01); *F02D 41/1475* (2013.01); *F02D 41/1495* (2013.01); *F02D 41/2454* (2013.01); *F01N 3/08* (2013.01); *F01N 3/10* (2013.01); *F01N 3/101* (2013.01); *F01N 2430/06* (2013.01); *F01N 2550/02* (2013.01); *F01N 2560/025* (2013.01); *F01N 2560/14* (2013.01); *F02D 2200/0814* (2013.01); *F02D 2200/0816* (2013.01); *Y02A 50/2324* (2018.01); *Y02T 10/22* (2013.01)

(56) References Cited

U.S. PATENT DOCUMENTS

| | | | |
|---|---|---|---|
| 2004/0000135 A1* | 1/2004 | Uchida | F01N 3/101 60/277 |
| 2004/0187481 A1 | 9/2004 | Elwart et al. | |
| 2006/0090456 A1* | 5/2006 | Tani | F01N 11/007 60/285 |
| 2007/0095051 A1* | 5/2007 | Iihoshi | F01N 11/007 60/277 |
| 2007/0186540 A1* | 8/2007 | Hahn | F01N 9/00 60/285 |
| 2007/0220863 A1* | 9/2007 | Iida | F01N 3/101 60/277 |
| 2010/0212291 A1* | 8/2010 | Schnaibel | F02D 41/0295 60/274 |
| 2011/0146379 A1* | 6/2011 | Kilinc | G01N 27/4175 73/23.31 |
| 2013/0133312 A1 | 5/2013 | Ise | |
| 2014/0060016 A1 | 3/2014 | Sato et al. | |
| 2015/0089927 A1* | 4/2015 | Kubo | F02D 41/1454 60/277 |
| 2016/0312733 A1* | 10/2016 | Tsuchiya | F02D 41/1441 |

\* cited by examiner

EXHAUST PURIFICATION SYSTEM OF INTERNAL COMBUSTION ENGINE

CROSS-REFERENCE TO RELATED APPLICATION

This application claims priority based on Japanese Patent Application No. 2015-050013 filed with the Japan Patent Office on Mar. 12, 2015, the entire contents of which are incorporated into the present specification by reference.

TECHNICAL FIELD

Embodiments of the present invention relate to an exhaust purification system of an internal combustion engine.

BACKGROUND ART

Known in the past has been an exhaust purification system of an internal combustion engine which provides an exhaust purification catalyst which is provided in an exhaust passage of the internal combustion engine, an air-fuel ratio sensor at an upstream side of the exhaust passage in the direction of flow of exhaust, and an oxygen sensor at a downstream side in the direction of flow of exhaust. Such an exhaust purification system, for example, performs feedback control so that the output of this air-fuel ratio sensor becomes a target value corresponding to a target air-fuel ratio based on the output of the upstream side air-fuel ratio sensor and uses the output of the downstream side oxygen sensor as the basis to correct the target value of the upstream side air-fuel ratio sensor.

In the exhaust purification system which is described in JP2011-069337A, when the output voltage of the downstream side oxygen sensor is the high side threshold value or more and the state of the exhaust purification catalyst is an oxygen deficient state, the target air-fuel ratio of the exhaust gas which flows into the exhaust purification catalyst is made a lean air-fuel ratio. Conversely, when the output voltage of the downstream side oxygen sensor is the low side threshold value or less and the state of the exhaust purification catalyst is an oxygen excess state, the target air-fuel ratio is made a rich air-fuel ratio. According to the exhaust purification system which is described in JP2011-069337A, due to this, when in the oxygen deficient state or oxygen excess state, it is considered possible to quickly return the state of the exhaust purification catalyst to an intermediate state of these two states (that is, the state where the exhaust purification catalyst stores a suitable amount of oxygen).

Summary

In this regard, even if the air-fuel ratio of the exhaust gas which is discharged from the engine body is constant, the greater the amount of hydrogen which is contained in the exhaust gas, the air-fuel ratio corresponding to the output of the air-fuel ratio sensor (below, also referred to as the "output air-fuel ratio") deviates to the rich side. This is believed to be because hydrogen slips through the diffusion regulating layer which is provided at the air-fuel ratio sensor more easily compared with unburned HC and other content in exhaust gas.

On the other hand, the assignee has proposed, as air-fuel ratio control in an exhaust purification system, to perform average air-fuel ratio control and inter-cylinder air-fuel ratio control. Here, "average air-fuel ratio control" is control which alternately sets an average value of the target air-fuel ratios for all cylinders, constituting a target average air-fuel ratio, between a rich air-fuel ratio and a lean air-fuel ratio. On the other hand, "inter-cylinder air-fuel ratio control" is control which makes the target air-fuel ratios of the cylinders an air-fuel ratio which is richer than the target average air-fuel ratio at part of the cylinders among a plurality of cylinders and makes the target air-fuel ratios of the cylinders an air-fuel ratio leaner than the target air-fuel ratios at the remaining cylinders.

Here, when performing inter-cylinder air-fuel ratio control, exhaust gas of an air-fuel ratio richer than the target average air-fuel ratio flows out from part of the cylinders. Such a rich air-fuel ratio exhaust gas contains unburned HC and CO and also hydrogen. For this reason, even if the air-fuel ratio of the exhaust gas is constant, when performing inter-cylinder air-fuel ratio control, compared to when not performing inter-cylinder air-fuel ratio control, the amount of hydrogen which is contained in the exhaust gas is large. As a result, the output air-fuel ratio of the air-fuel ratio sensor easily deviates to the rich side. However, if the output air-fuel ratio of the air-fuel ratio sensor deviates in this way, it is no longer possible to suitably control the exhaust air-fuel ratio and sometimes deterioration of the exhaust emission is invited.

Therefore, an object of embodiments of the present invention, in view of the above problem, is to provide an exhaust purification system which can compensate for any deviation which occurs in the output air-fuel ratio of the air-fuel ratio sensor.

To solve this problem, in a first aspect of embodiments of the invention, there is provided an exhaust purification system of an internal combustion engine which has a plurality of cylinders including an exhaust purification catalyst which is arranged in an engine exhaust passage and which can store oxygen; a downstream side air-fuel ratio sensor which is arranged at a downstream side of the exhaust purification catalyst in a direction of flow of exhaust; and a control device which controls by feedback the fuel feed amounts to combustion chambers so that combustion air-fuel ratios when combustion is performed at the cylinders become target air-fuel ratios. The control device is configured to be able to: perform an average air-fuel ratio control which alternately controls an average value of the target air-fuel ratios for all cylinders, constituting a target average air-fuel ratio, between a rich air-fuel ratio which is richer than a stoichiometric air-fuel ratio and a lean air-fuel ratio which is leaner than the stoichiometric air-fuel ratio and an inter-cylinder air-fuel ratio control which controls the target air-fuel ratios of the cylinders so that the target air-fuel ratio becomes the rich air-fuel ratio at least at one cylinder among the plurality of cylinders even if the target average air-fuel ratio is set to the lean air-fuel ratio by the average air-fuel ratio control; and calculate an amount of oxygen which becomes in excess or an amount of oxygen which becomes deficient when trying to make the exhaust gas which flows into the exhaust purification catalyst the stoichiometric air-fuel ratio, constituting a cumulative oxygen excess/deficiency. The control device is further configured to perform a learning control which uses an absolute value of the cumulative oxygen excess/deficiency in a first time period from when switching the target average air-fuel ratio from the rich air-fuel ratio to the lean air-fuel ratio to when again switching it to the rich air-fuel ratio, constituting a cumulative value of a first oxygen amount, and an absolute value of the cumulative oxygen excess/deficiency in a second time period from when switching the target average air-fuel ratio from the lean air-fuel ratio to the rich air-fuel ratio to when again switching it to the lean air-fuel ratio, constituting a cumulative value of a second oxygen amount, as the basis to correct a parameter relating to the air-fuel ratio so that a difference between the cumulative value of the first oxygen amount and cumulative value of the second oxygen amount becomes smaller.

In a second aspect of embodiments of the invention, there is provided the first aspect above, wherein the control device is further configured to set the target average air-fuel ratio in the average air-fuel ratio control so that a difference between the target average air-fuel ratio and stoichiometric air-fuel ratio when setting the target average air-fuel ratio to a lean air-fuel ratio, constituting a lean shift amount, becomes smaller than a difference between the target average air-fuel ratio and stoichiometric air-fuel ratio when setting the target average air-fuel ratio to a rich air-fuel ratio, constituting a rich shift amount.

In a third aspect of embodiments of the invention, there is provided the first aspect above, wherein the control device is further configured to control the target air-fuel ratios of the cylinders without performing the inter-cylinder air-fuel ratio control when the difference of the cumulative value of the first oxygen amount and the cumulative value of the second oxygen amount is a predetermined value or more, so that the target air-fuel ratios become equal at all of the cylinders.

In a fourth aspect of embodiments of the invention, there is provided the first aspect above, wherein the control device is further configured to perform a stoichiometric air-fuel ratio stuck learning, which corrects the parameter relating to the air-fuel ratio, in the learning control when the target average air-fuel ratio is set to one air-fuel ratio of either the rich air-fuel ratio or lean air-fuel ratio, if the air-fuel ratio which is detected by the downstream side air-fuel ratio sensor is maintained within a stoichiometric air-fuel ratio vicinity air-fuel ratio region between a rich judged air-fuel ratio which is richer than the stoichiometric air-fuel ratio and a lean judged air-fuel ratio which is leaner than the stoichiometric air-fuel ratio over a stoichiometric air-fuel ratio maintenance judgment time or more or a time period until the cumulative oxygen excess/deficiency becomes a predetermined value or more, so that the air-fuel ratio of the exhaust gas which flows into the exhaust purification catalyst changes to the one air-fuel ratio side.

In a fifth aspect of embodiments of the invention, there is provided the fourth aspect above, wherein the control device is further configured to control the target air-fuel ratios of the cylinders without performing the inter-cylinder air-fuel ratio control when the target average air-fuel ratio is set to one air-fuel ratio of either the rich air-fuel ratio or lean air-fuel ratio, if the air-fuel ratio which is detected by the downstream side air-fuel ratio sensor is maintained within the stoichiometric air-fuel ratio vicinity air-fuel ratio region over a stoichiometric air-fuel ratio maintenance judgment time or more or a time period until the cumulative oxygen excess/deficiency becomes a predetermined value or more, so that the target air-fuel ratios become equal at all of the cylinders.

In a sixth aspect of embodiments of the invention, there is provided the first aspect above, wherein the control device is further configured to perform a lean stuck learning, which corrects the parameter relating to the air-fuel ratio so that the air-fuel ratio of the exhaust gas which flows into the exhaust purification catalyst changes to the rich side, in the learning control when the target average air-fuel ratio is set to the rich air-fuel ratio, if the output air-fuel ratio of the downstream side air-fuel ratio sensor is maintained at a lean air-fuel ratio which is leaner than the stoichiometric air-fuel ratio over a lean air-fuel ratio judgment time or more.

In a seventh aspect of embodiments of the invention, there is provided the sixth aspect above, wherein the control device is further configured to control the target air-fuel ratios of the cylinders without performing the inter-cylinder air-fuel ratio control when the target average air-fuel ratio is set to the rich air-fuel ratio, if the output air-fuel ratio of the downstream side air-fuel ratio sensor is maintained at a lean air-fuel ratio which is leaner than the lean judged air-fuel ratio over the lean air-fuel ratio judgment time or more, so that the target air-fuel ratios become equal at all of the cylinders.

In an eighth aspect of embodiments of the invention, there is provided the first aspect above, wherein the control device is further configured to perform a rich stuck learning, which corrects the parameter relating to the air-fuel ratio so that the air-fuel ratio of the exhaust gas which flows into the exhaust purification catalyst changes to the lean side, in the learning control when the target average air-fuel ratio is set to the lean air-fuel ratio, if the output air-fuel ratio of the downstream side air-fuel ratio sensor is maintained at a rich air-fuel ratio which is richer than the stoichiometric air-fuel ratio over a rich air-fuel ratio judgment time or more.

In a ninth aspect of embodiments of the invention, there is provided the eighth aspect above, wherein the control device is further configured to control the target air-fuel ratios of the cylinders so that the target air-fuel ratios become equal at all of the cylinders without performing the inter-cylinder air-fuel ratio control when the target average air-fuel ratio is set to the lean air-fuel ratio, if the output air-fuel ratio of the downstream side air-fuel ratio sensor is maintained at a rich air-fuel ratio which is richer than the rich judged air-fuel ratio over the rich air-fuel ratio judgment time or more.

In a tenth aspect of embodiments of the invention, there is provided the first aspect above, wherein the control device is further configured to: calculate a learning value based on the difference between the cumulative value of the first oxygen amount and correct the parameter relating to the air-fuel ratio based on the learning value; and store the learning value in a storage medium which is not erased even if an ignition key of the vehicle which mounts the internal combustion engine is turned on.

In an eleventh aspect of embodiments of the invention, there is provided the first aspect above and further comprises an upstream side air-fuel ratio which is arranged at an upstream side of the exhaust purification catalyst in the direction of flow of exhaust and which detects the air-fuel ratio of the exhaust gas which flows into the exhaust purification catalyst, wherein the control device is further configured to calculate the oxygen excess/deficiency based on the air-fuel ratio which is detected by the upstream side air-fuel ratio sensor and a flow amount of the exhaust gas which flows into the exhaust purification catalyst or fuel injection amount.

In a twelfth aspect of embodiments of the invention, there is provided the first aspect above, wherein the control device is further configured to use an air-fuel ratio forming the control center, the target average air-fuel ratio, or fuel feed amount as the parameter relating to the air-fuel.

In a thirteenth aspect of embodiments of the invention, there is provided the first aspect above and further comprises an upstream side air-fuel ratio which is arranged at an upstream side of the exhaust purification catalyst in the direction of flow of exhaust and which detects the air-fuel ratio of the exhaust gas which flows into the exhaust purification catalyst, wherein the control device is further configured to: perform feedback control of the fuel feed amount to the combustion chamber so that the average air-fuel ratio which is detected by the upstream side air-fuel ratio sensor becomes the target average air-fuel ratio; and use an output value of the upstream side air-fuel ratio sensor as the parameter relating to the air-fuel ratio.

In a fourteenth aspect of embodiments of the invention, there is provided the first aspect above, wherein the control device is further configured to set the target air-fuel ratios of the cylinders even when the average air-fuel ratio control is used so that the target average air-fuel ratio is set to the rich air-fuel ratio, so that the target air-fuel ratio becomes the lean air-fuel ratio at least one of the cylinders among the plurality of cylinders.

In a fifteenth aspect of embodiments of the invention, there is provided the first aspect above, wherein the control device is further configured to set the target air-fuel ratios of the cylinders without performing the inter-cylinder air-fuel ratio control when the target average air-fuel ratio is set to the rich air-fuel ratio, so that the combustion air-fuel ratios become the rich air-fuel ratio at all of the plurality of cylinders.

In a sixteenth aspect of embodiments of the invention, there is provided the first aspect above, wherein the control device is further configured to: switch the target average air-fuel ratio to the lean air-fuel ratio in the average air-fuel ratio control when setting the target average air-fuel ratio to the rich air-fuel ratio, if the output air-fuel ratio of the downstream side air-fuel ratio sensor becomes a rich judged air-fuel ratio which is richer than the stoichiometric air-fuel ratio or becomes less; and switch the target average air-fuel ratio to the rich air-fuel ratio in the average air-fuel ratio control when controlling the target average air-fuel ratio to the lean air-fuel ratio, if the output air-fuel ratio of the downstream side air-fuel ratio sensor becomes a lean judged air-fuel ratio which is leaner than the stoichiometric air-fuel ratio or becomes more.

In a seventeenth aspect of embodiments of the invention, there is provided the first aspect above, wherein the control device is further configured to: switch the target average air-fuel ratio to the lean air-fuel ratio in the average air-fuel ratio control when setting the target average air-fuel ratio to the rich air-fuel ratio, if the output air-fuel ratio of the downstream side air-fuel ratio sensor becomes a rich judged air-fuel ratio which is richer than the stoichiometric air-fuel ratio or becomes less; and switch the target average air-fuel ratio to the rich air-fuel ratio in the average air-fuel ratio control when the oxygen storage amount of the exhaust purification catalyst from when starting to control the target average air-fuel ratio to a lean air-fuel ratio reaches a predetermined switching reference storage amount which is smaller than the maximum storable oxygen amount of the exhaust purification catalyst.

According to embodiments of the present invention, there is provided an exhaust purification system which can compensate for any deviation which occurs in the output air-fuel ratio of the air-fuel ratio sensor even if the output air-fuel ratio of the air-fuel ratio sensor deviated because of hydrogen in the exhaust gas.

DESCRIPTION OF EMBODIMENTS

Figure 1:
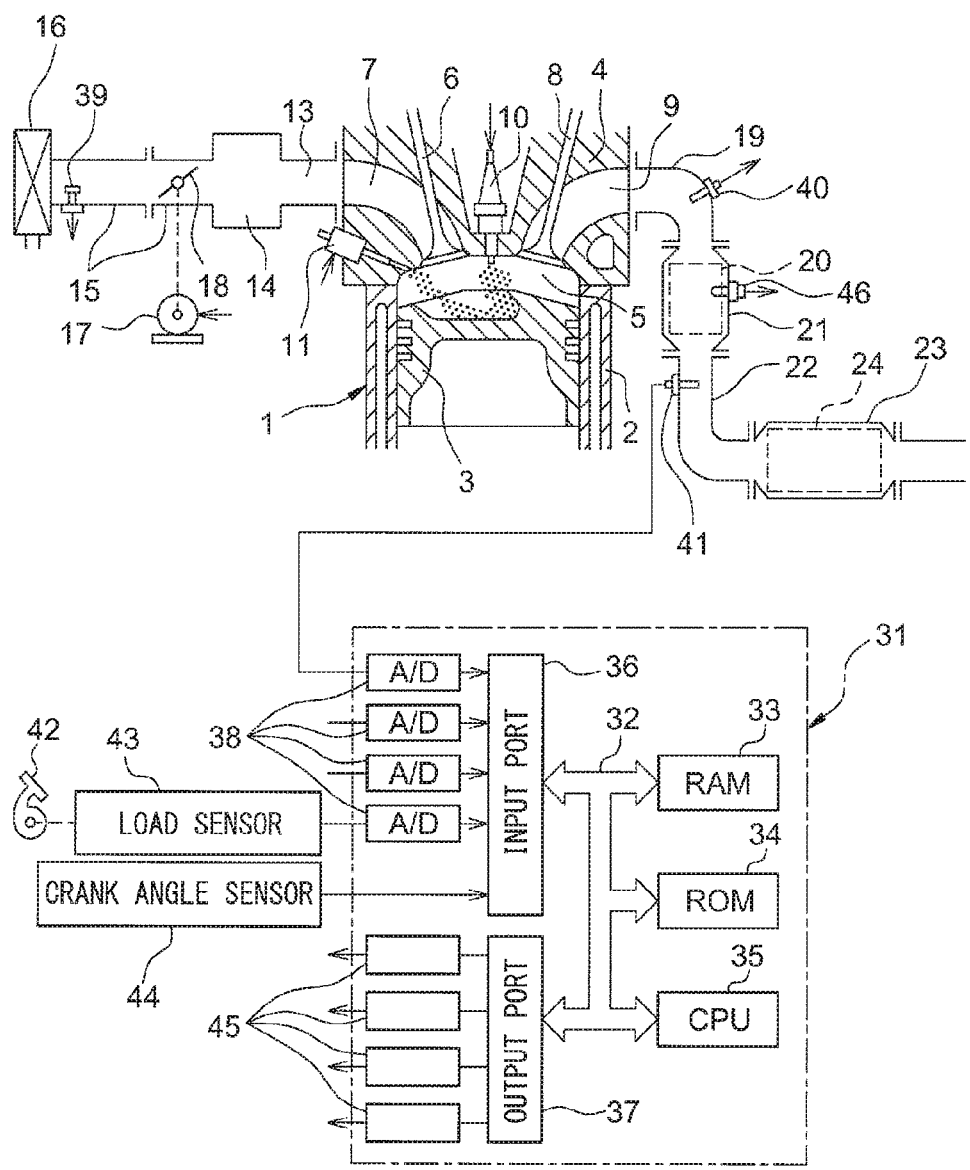
FIG. 1 is a view which schematically shows an internal combustion engine in which a control device of embodiments of the present invention is used.

Below, referring to the drawings, embodiments of the present invention will be explained in detail. Note that, in the following explanation, similar components are assigned the same reference numerals.

<Explanation of Internal Combustion Engine as a Whole>

FIG. 1 is a view which schematically shows an internal combustion engine in which an exhaust purification system according to embodiments of the present invention is used. Referring to FIG. 1, 1 indicates an engine body, 2 indicates a cylinder block, 3 indicates a piston which reciprocates in the cylinder block 2, 4 indicates a cylinder head which is fastened to the cylinder block 2, 5 indicates a combustion chamber which is formed between the piston 3 and the cylinder head 4, 6 indicates an intake valve, 7 indicates an intake port, 8 indicates an exhaust valve, and 9 indicates an exhaust port. The intake valve 6 opens and closes the intake port 7, while the exhaust valve 8 opens and closes the exhaust port 9. The internal combustion engine according to the present embodiment is an in-line four cylinder internal combustion engine. Therefore, the engine body 1 comprises four combustion chambers 5. However, the internal combustion engine is not limited to this constitution as long as the internal combustion engine has a plurality of cylinders. For example, the internal combustion engine may be other types of internal combustion engines such as a six cylinder internal combustion engine or a V-type internal combustion engine.

As shown in FIG. 1, a spark plug 10 is arranged at a center part of an inside wall surface of the cylinder head 4, while a fuel injector 11 is arranged at a peripheral part of the inner wall surface of the cylinder head 4. The spark plug 10 is configured to generate a spark in accordance with an ignition signal. Further, the fuel injector 11 injects a predetermined amount of fuel into the combustion chamber 5 in accordance with an injection signal. Note that, the fuel injector 11 may also be arranged so as to inject fuel into the intake port 7. Further, in the present embodiment, as the fuel, gasoline with a stoichiometric air-fuel ratio of 14.6 is used. However, the internal combustion engine of the present embodiment may also use another kind of fuel.

The intake port 7 of each cylinder is connected to a surge tank 14 through a corresponding intake runner 13, while the surge tank 14 is connected to an air cleaner 16 through an intake pipe 15. The intake port 7, intake runner 13, surge tank 14, and intake pipe 15 form an intake passage. Further, inside the intake pipe 15, a throttle valve 18 which is driven by a throttle valve drive actuator 17 is arranged. The throttle valve 18 can be operated by the throttle valve drive actuator 17 to thereby change the aperture area of the intake passage.

On the other hand, the exhaust port 9 of each cylinder is connected to an exhaust manifold 19. The exhaust manifold 19 has a plurality of runners which are connected to the exhaust ports 9 and a collected part at which these runners are collected. The collected part of the exhaust manifold 19 is connected to an upstream side casing 21 which houses an upstream side exhaust purification catalyst 20. The upstream side casing 21 is connected through an exhaust pipe 22 to a downstream side casing 23 which houses a downstream side exhaust purification catalyst 24. The exhaust port 9, exhaust manifold 19, upstream side casing 21, exhaust pipe 22, and downstream side casing 23 form an exhaust passage.

The electronic control unit (ECU) 31 is comprised of a digital computer which is provided with components which are connected together through a bidirectional bus 32 such as a RAM (random access memory) 33, ROM (read only memory) 34, CPU (microprocessor) 35, input port 36, and output port 37. In the intake pipe 15, an airflow meter 39 is arranged for detecting the flow rate of air flowing through the intake pipe 15. The output of this airflow meter 39 is input through a corresponding AD converter 38 to the input port 36. Further, at the collected part of the exhaust manifold 19, an upstream side air-fuel ratio sensor 40 is arranged which detects the air-fuel ratio of the exhaust gas flowing through the inside of the exhaust manifold 19 (that is, the exhaust gas flowing into the upstream side exhaust purification catalyst 20). In addition, in the exhaust pipe 22, a downstream side air-fuel ratio sensor 41 is arranged which detects the air-fuel ratio of the exhaust gas flowing through the inside of the exhaust pipe 22 (that is, the exhaust gas flowing out from the upstream side exhaust purification catalyst 20 and flowing into the downstream side exhaust purification catalyst 24). The outputs of these air-fuel ratio sensors 40 and 41 are also input through the corresponding AD converters 38 to the input port 36. In addition, at the upstream side exhaust purification catalyst 20, a temperature sensor 46 is arranged which detects the temperature of the upstream side exhaust purification catalyst 20. The output of this temperature sensor 46 is also input through a corresponding AD converter 38 to the input port 36.

Further, an accelerator pedal 42 is connected to a load sensor 43 generating an output voltage which is proportional to the amount of depression of the accelerator pedal 42. The output voltage of the load sensor 43 is input to the input port 36 through a corresponding AD converter 38. The crank angle sensor 44 generates an output pulse every time, for example, a crankshaft rotates by 15 degrees. This output pulse is input to the input port 36. The CPU 35 calculates the engine speed from the output pulse of this crank angle sensor 44. On the other hand, the output port 37 is connected through corresponding drive circuits 45 to the spark plugs 10, fuel injectors 11, and throttle valve drive actuator 17. Note that the ECU 31 functions as a control device for controlling the internal combustion engine and the exhaust purification system.

Note that the internal combustion engine according to the present embodiment is a non-supercharged internal combustion engine which is fueled by gasoline, but the internal combustion engine according to embodiments of the present invention is not limited to the above configuration. For example, the internal combustion engine according to the present invention may have a cylinder array, state of injection of fuel, configuration of intake and exhaust systems, configuration of valve mechanism, presence of supercharger, and/or supercharged state, etc. which are different from the above internal combustion engine.

<Explanation of Exhaust Purification Catalysts>

The upstream side exhaust purification catalyst 20 and downstream side exhaust purification catalyst 24 both have similar configurations. The exhaust purification catalysts 20 and 24 are three-way catalysts which have oxygen storage abilities. Specifically, the exhaust purification catalysts 20 and 24 are three-way catalysts comprised of carriers made of ceramics on which precious metals which have catalytic actions (for example, platinum (Pt)) and substances which have oxygen storage abilities (for example, ceria ($CeO_2$), below, also referred to as "oxygen storing substances") are carried. Three-way catalysts have the functions of simultaneously removing unburned HC, CO, and $NO_X$ if the air-fuel ratio of the exhaust gas which flows into the three-way catalysts is maintained at the stoichiometric air-fuel ratio. In addition, when the exhaust purification catalysts 20 and 24 have oxygen storage abilities, unburned HC, CO, and $NO_X$ are simultaneously removed even if the air-fuel ratio of the exhaust gas which flows into the exhaust purification catalysts 20 and 24 deviates somewhat to the rich side or lean side from the stoichiometric air-fuel ratio.

That is, since such three-way catalysts have oxygen storage abilities, they store excess oxygen which is contained in exhaust gas when the air-fuel ratio of the exhaust gas which flows into the exhaust purification catalysts 20 and 24 becomes an air-fuel ratio leaner than the stoichiometric air-fuel ratio (below, simply referred to as the "lean air-fuel ratio"). Due to this, the surfaces of the exhaust purification catalysts 20 and 24 are maintained at the stoichiometric air-fuel ratio and unburned HC, CO, and $NO_X$ are simultaneously removed at the surfaces of the exhaust purification catalysts 20 and 24. At this time, the air-fuel ratio of the exhaust gas which is discharged from the exhaust purification catalysts 20 and 24 becomes the stoichiometric air-fuel ratio.

However, three-way catalysts can no longer store any further oxygen if the oxygen storage amounts reach the maximum value of the storable oxygen amount, that is, the maximum storable oxygen amount Cmax. Therefore, if, in the state where the oxygen storage amounts of the three-way catalyst reach substantially the maximum storable oxygen amount Cmax, the air-fuel ratio of the exhaust gas which flows into the exhaust purification catalysts 20 and 24 becomes the lean air-fuel ratio, the exhaust purification catalysts 20 and 24 soon can no longer be maintained at the stoichiometric air-fuel ratio on their surfaces. For this reason, in this case, the air-fuel ratio of the exhaust gas which is discharged from the exhaust purification catalysts 20 and 24 becomes the lean air-fuel ratio.

On the other hand, in such three-way catalysts, when the air-fuel ratio of the exhaust gas which flows into the exhaust purification catalysts 20 and 24 becomes an air-fuel ratio richer than the stoichiometric air-fuel ratio (below, simply referred to as the "rich air-fuel ratio"), oxygen which is insufficient for reducing the unburned HC, CO which are contained in the exhaust gas is released from the exhaust purification catalysts 20 and 24. In this case as well, the surfaces of the exhaust purification catalysts 20 and 24 are maintained at the stoichiometric air-fuel ratio and the unburned HC, CO, and $NO_X$ are simultaneously removed at the surfaces of the exhaust purification catalysts 20 and 24. At this time, the air-fuel ratio of the exhaust gas which is discharged from the exhaust purification catalysts 20 and 24 becomes a stoichiometric air-fuel ratio. However, the three-way catalysts can no longer release any further oxygen if the oxygen storage amounts reach zero. Therefore, if, in the state where the oxygen storage amounts of the three-way catalysts reach substantially zero, the air-fuel ratio of the exhaust gas which flows into the exhaust purification catalysts 20 and 24 becomes the rich air-fuel ratio, the exhaust purification catalysts 20 and 24 soon can no longer maintain their surfaces at the stoichiometric air-fuel ratio. For this reason, in this case, the air-fuel ratio of the exhaust gas which is discharged from the exhaust purification catalysts 20 and 24 becomes a rich air-fuel ratio.

In the above way, according to the exhaust purification catalysts 20 and 24 which are used in the present embodiment, the characteristics of removal of the unburned HC, CO, and $NO_X$ in the exhaust gas changes according to the air-fuel ratio of the exhaust gas which flows into the exhaust purification catalysts 20 and 24 and the oxygen storage amounts.

<Output Characteristic of Air-Fuel Ratio Sensor>

Figure 2:
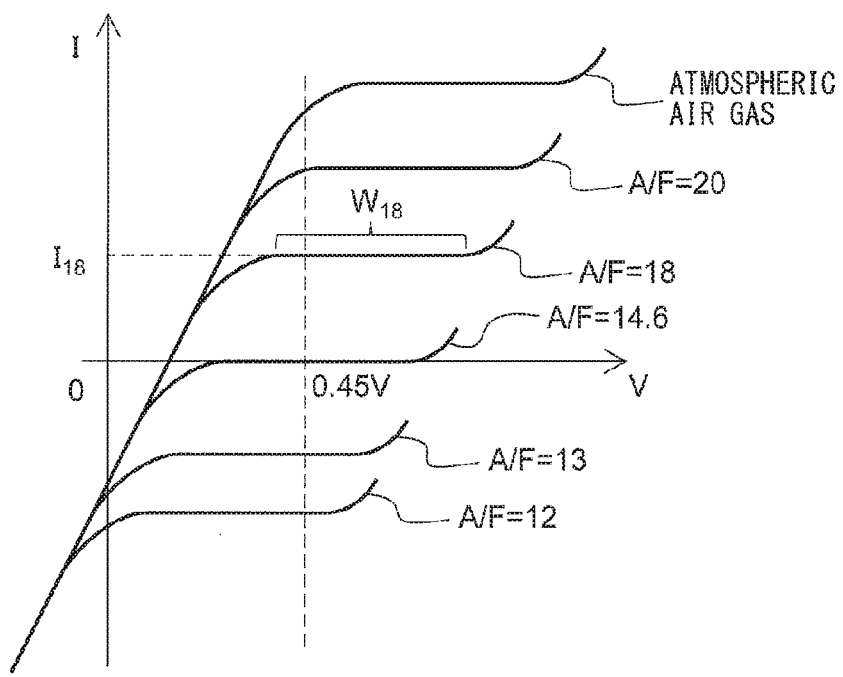
FIG. 2 is a view which shows the relationship between a sensor applied voltage and output current at each exhaust air-fuel ratio.
Figure 3:
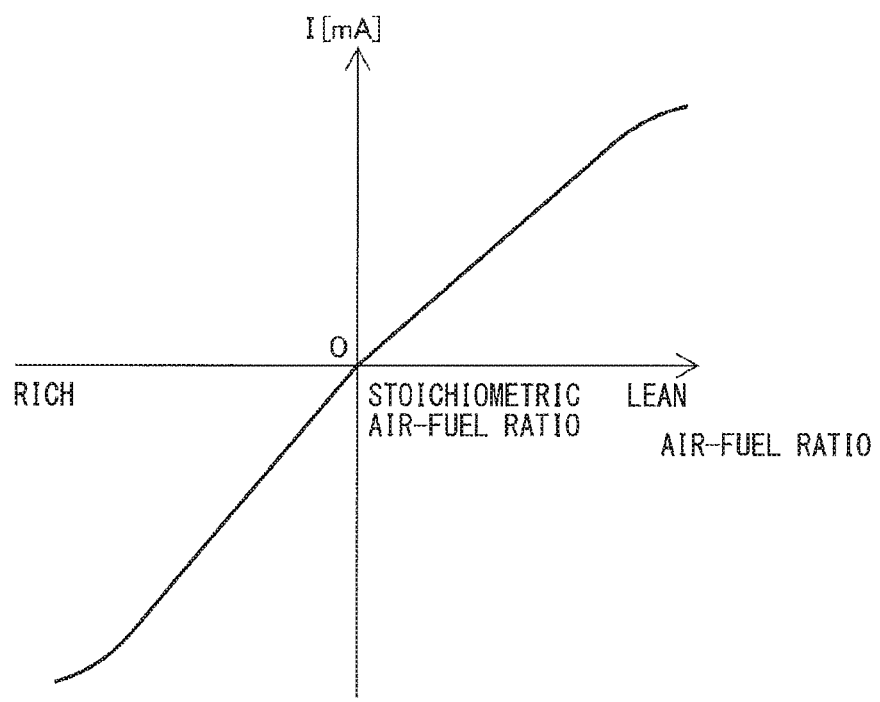
FIG. 3 is a view which shows the relationship of an exhaust air-fuel ratio and output current when making the sensor applied voltage constant.

Next, referring to FIGS. 2 and 3, the output characteristic of air-fuel ratio sensors 40 and 41 in the present embodiment will be explained. FIG. 2 is a view showing the voltage-current (V-I) characteristic of the air-fuel ratio sensors 40 and 41 of the present embodiment. FIG. 3 is a view showing the relationship between air-fuel ratio of the exhaust gas (below, referred to as "exhaust air-fuel ratio") flowing around the air-fuel ratio sensors 40 and 41 and output current I, when making the supplied voltage constant. Note that, in this embodiment, the air-fuel ratio sensor having the same configurations is used as both air-fuel ratio sensors 40 and 41.

As will be understood from FIG. 2, in the air-fuel ratio sensors 40 and 41 of the present embodiment, the output current I becomes larger the higher (the leaner) the exhaust air-fuel ratio. Further, the line V-I of each exhaust air-fuel ratio has a region substantially parallel to the V axis, that is, a region where the output current does not change much at all even if the supplied voltage of the sensor changes. This voltage region is called the "limit current region". The current at this time is called the "limit current". In FIG. 2, the limit current region and limit current when the exhaust air-fuel ratio is 18 are shown by $W_{18}$ and $I_{18}$, respectively. Therefore, the air-fuel ratio sensors 40 and 41 can be referred to as "limit current type air-fuel ratio sensors".

FIG. 3 is a view which shows the relationship between the exhaust air-fuel ratio and the output current I when making the supplied voltage constant at about 0.45V. As will be understood from FIG. 3, in the air-fuel ratio sensors 40 and 41, the output current I varies linearly (proportionally) with respect to the exhaust air-fuel ratio such that the higher (that is, the leaner) the exhaust air-fuel ratio, the greater the output current I from the air-fuel ratio sensors 40 and 41. In addition, the air-fuel ratio sensors 40 and 41 are configured so that the output current I becomes zero when the exhaust air-fuel ratio is the stoichiometric air-fuel ratio.

Note that, in the above example, as the air-fuel ratio sensors 40 and 41, limit current type air-fuel ratio sensors are used. However, as the air-fuel ratio sensors 40 and 41, it is also possible to use an air-fuel ratio sensor that is not a limit current type sensor or any other air-fuel ratio sensor, as long as the output current varies linearly with respect to the exhaust air-fuel ratio. Further, the air-fuel ratio sensors 40 and 41 may have structures different from each other.

<Summary of Air-Fuel Ratio Control>

Next, a summary of the air-fuel ratio control in the exhaust purification system of the present embodiment will be given. In the present embodiment, the output air-fuel ratio of the upstream side air-fuel ratio sensor 40 is used as the basis for feedback control which controls the amounts of fuel injection from the fuel injectors 11 so that the output air-fuel ratio of the upstream side air-fuel ratio sensor 40 matches the target air-fuel ratio. Note that, "the output air-fuel ratio" means the air-fuel ratio corresponding to the output value of the air-fuel ratio sensor.

Here, as explained later, in the present embodiment, sometimes the fuel injection amounts from the fuel injectors 11 are made to differ between cylinders. In this case, the output air-fuel ratio of the upstream side air-fuel ratio sensor 40 fluctuates somewhat during one cycle. In such a case as well, in the present embodiment, the fuel injection amounts from the fuel injectors are controlled so that the average value of the output air-fuel ratio of the upstream side air-fuel ratio sensor 40 (below, referred to as the "average output air-fuel ratio") matches the average value of the target air-fuel ratios which differ between cylinders, that is, the target average air-fuel ratio.

In addition, in the air-fuel ratio control of the present embodiment, average air-fuel ratio control and inter-cylinder air-fuel ratio control (dither control) are performed. The average air-fuel ratio control is control which uses the output air-fuel ratio of the downstream side air-fuel ratio sensor 41 as the basis to set the target average air-fuel ratio. In other words, it can be said to control the average air-fuel ratio of the exhaust gas which flows into the upstream side exhaust purification catalyst 20. On the other hand, the inter-cylinder air-fuel ratio control is control which sets different target air-fuel ratios for the different cylinders. In other words, it is control of the air-fuel ratio of the air-fuel mixture when combustion is performed in each cylinder (below, referred to as "combustion air-fuel ratio". Corresponding to air-fuel ratio of air-fuel mixture which is fed to each cylinder).

<Average Air-Fuel Ratio Control>

First, average air-fuel ratio control will be explained. In average air-fuel ratio control, first, if, in the state where the target average air-fuel ratio is set to the later explained rich set air-fuel ratio, it is judged that the output air-fuel ratio of the downstream side air-fuel ratio sensor 41 has become the rich air-fuel ratio, the target average air-fuel ratio is switched to the lean set air-fuel ratio. Due to this, the average air-fuel ratio of the exhaust gas which flows into the upstream side exhaust purification catalyst 20 change to the lean set air-fuel ratio. Here, in the present embodiment, when the output air-fuel ratio of the downstream side air-fuel ratio sensor 41 becomes a rich judged air-fuel ratio which is slightly richer than the stoichiometric air-fuel ratio (for example, 14.55) or becomes less, it is judged that the output air-fuel ratio of the downstream side air-fuel ratio sensor 41 has become the rich air-fuel ratio. Therefore, in average air-fuel ratio control, when the average air-fuel ratio of the exhaust gas which flows into the upstream side exhaust purification catalyst 20 is controlled to the rich air-fuel ratio, the average air-fuel ratio is switched to the lean air-fuel ratio when the output air-fuel ratio of the downstream side air-fuel ratio sensor 41 becomes the rich judged air-fuel ratio or less. Further, the lean set air-fuel ratio is made a predetermined air-fuel ratio which is slightly leaner than the stoichiometric air-fuel ratio (air-fuel ratio becoming control center), for example, 14.7 or so.

On the other hand, in average air-fuel ratio control, if, in the state where the target average air-fuel ratio is set to the lean set air-fuel ratio, it is judged that the output air-fuel ratio of the downstream side air-fuel ratio sensor 41 has become the lean air-fuel ratio, the target average air-fuel ratio is switched to the rich set air-fuel ratio. Due to this, the average air-fuel ratio of the exhaust gas which flows into the upstream side exhaust purification catalyst 20 changes to the rich set air-fuel ratio. Here, in the present embodiment, when the output air-fuel ratio of the downstream side air-fuel ratio sensor 41 becomes a lean judged air-fuel ratio (for example, 14.65) which is slightly leaner than the stoichiometric air-fuel ratio or becomes more, it is judged that the output air-fuel ratio of the downstream side air-fuel ratio sensor 41 has become the lean air-fuel ratio. Therefore, in average air-fuel ratio control, when controlling the average air-fuel ratio of the exhaust gas which flows into the upstream side exhaust purification catalyst 20 to the lean air-fuel ratio, the average air-fuel ratio is switched to the rich air-fuel ratio when the output air-fuel ratio of the downstream side air-fuel ratio sensor 41 becomes the lean judged air-fuel ratio or more. Further, the rich set air-fuel ratio is made a predetermined air-fuel ratio which is richer to a certain extent than the stoichiometric air-fuel ratio (air-fuel ratio becoming control center), for example, 14.4 or so. Note that, the difference between the lean set air-fuel ratio and the stoichiometric air-fuel ratio (below, also referred to as the "lean shift amount") is smaller than the difference between the rich set air-fuel ratio and the stoichiometric air-fuel ratio (below, also referred to as the "rich shift amount").

As a result, in average air-fuel ratio control, the target average air-fuel ratio is alternately set to the rich air-fuel ratio and the lean air-fuel ratio. Due to this, the average air-fuel ratio of the exhaust gas which flows into the upstream side exhaust purification catalyst 20 is alternately controlled to the rich air-fuel ratio and the lean air-fuel ratio.

Note that, the rich judged air-fuel ratio and lean judged air-fuel ratio are made air-fuel ratios within 1% of the stoichiometric air-fuel ratio, preferably within 0.5%, more preferably within 0.35%. Therefore, the differences of the rich judged air-fuel ratio and lean judged air-fuel ratio from the stoichiometric air-fuel ratio when the stoichiometric air-fuel ratio is 14.6 are made 0.15 or less, preferably 0.073 or less, more preferably 0.051 or less. Further, the set air-fuel ratio at the target average air-fuel ratio (for example, rich set air-fuel ratio or lean set air-fuel ratio) is set so that the difference from the stoichiometric air-fuel ratio becomes larger than the above-mentioned difference.

Figure 4:
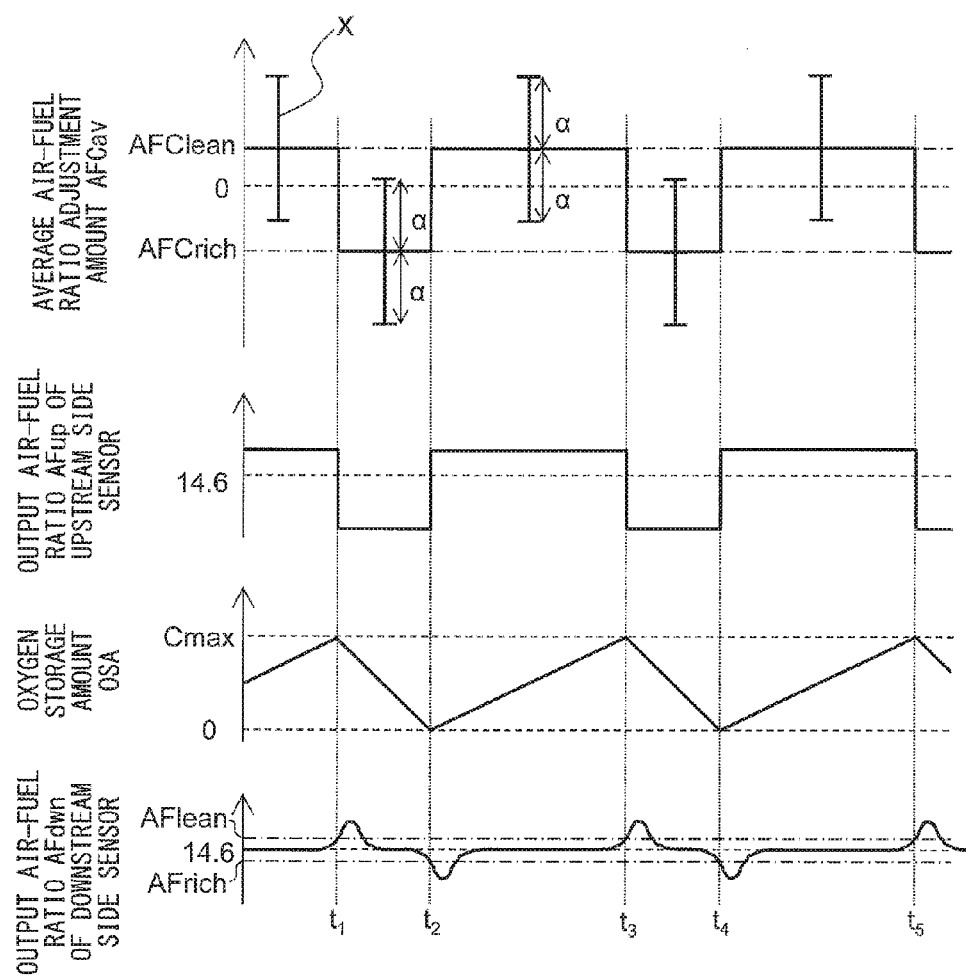
FIG. 4 is a time chart of an average air-fuel ratio correction amount etc. in the case of performing air-fuel ratio control by the exhaust purification system according to an embodiment.

Referring to FIG. 4, the average air-fuel ratio control will be specifically explained. FIG. 4 is a time chart of the average air-fuel ratio correction amount AFCav, output air-fuel ratio AFup of the upstream side air-fuel ratio sensor 40, oxygen storage amount OSA of the upstream side exhaust purification catalyst 20, and output air-fuel ratio AFdwn of the downstream side air-fuel ratio sensor 41 when performing air-fuel ratio control according to an exhaust purification system according to the present embodiment.

Note that, the average air-fuel ratio correction amount AFCav is a correction amount which corresponds to the target average air-fuel ratio of the exhaust gas which flows into the upstream side exhaust purification catalyst 20. When the average air-fuel ratio correction amount AFCav is 0, it means that the target average air-fuel ratio is an air-fuel ratio equal to the air-fuel ratio becoming the control center (below, referred to as the "control center air-fuel ratio") (in the present embodiment, basically stoichiometric air-fuel ratio). Further, when the average air-fuel ratio correction amount AFCav is a positive value, it means that the target average air-fuel ratio is an air-fuel ratio leaner than the control center air-fuel ratio (in the present embodiment, lean air-fuel ratio). Further, the absolute value of the average air-fuel ratio correction amount AFCav at this time corresponds to the difference of the target average air-fuel ratio and the control center air-fuel ratio or the difference between the average air-fuel ratio of the exhaust gas which flows into the upstream side exhaust purification catalyst 20 and the control center air-fuel ratio, constituting the "lean shift amount". Note that, "control center air-fuel ratio" means the air-fuel ratio to which the average air-fuel ratio correction amount AFCav is added according to the engine operating state, that is, the air-fuel ratio which becomes the reference when changing the target average air-fuel ratio in accordance with the average air-fuel ratio correction amount AFCav.

Similarly, when the average air-fuel ratio correction amount AFCav is a negative value, it means the target average air-fuel ratio is an air-fuel ratio which is richer than the control center air-fuel ratio (in the present embodiment, rich air-fuel ratio). Further, the absolute value of the average air-fuel ratio correction amount AFCav at this time corresponds to the difference of the target average air-fuel ratio and the control center air-fuel ratio or the difference between the average air-fuel ratio of the exhaust gas which flows into the upstream side exhaust purification catalyst 20 and the control center air-fuel ratio, constituting the "rich shift amount".

In the example which is shown in FIG. 4, in the state before the time $t_1$, the average air-fuel ratio correction amount AFCav is set to the lean set correction amount AFClean (corresponding to lean set air-fuel ratio). That is, the target average air-fuel ratio is made the lean air-fuel ratio. Along with this, the output air-fuel ratio AFup of the upstream side air-fuel ratio sensor 40, that is, the air-fuel ratio of the exhaust gas which flows into the upstream side exhaust purification catalyst 20, becomes a lean air-fuel ratio. The excess oxygen which is contained in the exhaust gas which flows into the upstream side exhaust purification catalyst 20 is stored in the upstream side exhaust purification catalyst 20. Along with this, the oxygen storage amount OSA of the upstream side exhaust purification catalyst 20 gradually increases. On the other hand, the upstream side exhaust purification catalyst 20 stores the oxygen, therefore the exhaust gas which flows out from the upstream side exhaust purification catalyst 20 does not contain oxygen, therefore the output air-fuel ratio AFdwn of the downstream side air-fuel ratio sensor 41 becomes substantially the stoichiometric air-fuel ratio.

If the oxygen storage amount OSA of the upstream side exhaust purification catalyst 20 gradually increases, finally, the oxygen storage amount OSA approaches the maximum storable oxygen amount Cmax. Along with this, part of the oxygen which flows into the upstream side exhaust purification catalyst 20 starts to flow out without being stored at the upstream side exhaust purification catalyst 20. Due to this, the output air-fuel ratio AFdwn of the downstream side air-fuel ratio sensor 41 gradually rises. At the time $t_1$, it reaches the lean judged air-fuel ratio AFlean.

In the present embodiment, if the output air-fuel ratio AFdwn of the downstream side air-fuel ratio sensor 41 becomes the lean judged air-fuel ratio AFlean or more, the oxygen storage amount OSA is made to decrease by switching the average air-fuel ratio correction amount AFCav to the rich set correction amount AFCrich (corresponding to rich set air-fuel ratio). Therefore, the target average air-fuel ratio is switched to the rich air-fuel ratio.

Note that, in the present embodiment, rather than right after the output air-fuel ratio AFdwn of the downstream side air-fuel ratio sensor 41 changes from the stoichiometric air-fuel ratio to the rich air-fuel ratio, the average air-fuel ratio correction amount AFCav is switched after the rich judged air-fuel ratio AFrich is reached. This is because even if the oxygen storage amount OSA of the upstream side exhaust purification catalyst 20 is sufficient, the air-fuel ratio of the exhaust gas which flows out from the upstream side exhaust purification catalyst 20 sometimes ends up deviating very slightly from the stoichiometric air-fuel ratio. Conversely speaking, the rich judged air-fuel ratio is made an air-fuel ratio which the air-fuel ratio of the exhaust gas which flows out from the upstream side exhaust purification catalyst 20 does not usually reach when the oxygen storage amount OSA of the upstream side exhaust purification catalyst 20 is sufficient. Note that, the same can be said for the above-mentioned lean judged air-fuel ratio.

If, at the time $t_1$, the target average air-fuel ratio is switched to the rich air-fuel ratio, along with this, the output air-fuel ratio AFup of the upstream side air-fuel ratio sensor 40, that is, the average air-fuel ratio of the exhaust gas which flows into the upstream side exhaust purification catalyst 20, changes to the rich air-fuel ratio. The excess unburned HC and CO which is contained in the exhaust gas which flows into the upstream side exhaust purification catalyst 20 are removed at the upstream side exhaust purification catalyst 20. Along with this, the oxygen storage amount OSA of the upstream side exhaust purification catalyst 20 gradually decreases. On the other hand, the upstream side exhaust purification catalyst 20 removes the unburned HC and CO, therefore the exhaust gas which flows out from the upstream side exhaust purification catalyst 20 does not contain unburned HC and CO, therefore the output air-fuel ratio AFdwn of the downstream side air-fuel ratio sensor 41 becomes substantially the stoichiometric air-fuel ratio.

If the oxygen storage amount OSA of the upstream side exhaust purification catalyst 20 gradually decreases, finally the oxygen storage amount OSA approaches zero. Along with this, part of the unburned HC and CO which flows into the upstream side exhaust purification catalyst 20 starts to flow out without being removed at the upstream side exhaust purification catalyst 20. Due to this, the output air-fuel ratio AFdwn of the downstream side air-fuel ratio sensor 41 gradually falls. At the time $t_2$, it reaches the rich judged air-fuel ratio AFrich.

In the present embodiment, if the output air-fuel ratio AFdwn of the downstream side air-fuel ratio sensor 41 becomes the rich judged air-fuel ratio AFrich or less, to make the oxygen storage amount OSA increase, the average air-fuel ratio correction amount AFCav is switched to the lean set correction amount AFClean. Therefore, the target air-fuel ratio is switched to the lean air-fuel ratio. After that, at the time $t_3$ on, an operation similar to the above-mentioned operation is repeated.

Further, in the average air-fuel ratio control which is shown in FIG. 4, the absolute value of the lean set correction amount AFClean is made a value smaller than the absolute value of the rich set correction amount AFCrich. Therefore, the difference between the average air-fuel ratio and control center air-fuel ratio (stoichiometric air-fuel ratio) when controlling the average air-fuel ratio of the exhaust gas which flows into the upstream side exhaust purification catalyst 20 to the lean air-fuel ratio, constituting the "lean shift amount", is made smaller than the difference between the average air-fuel ratio and control center air-fuel ratio when controlling the average air-fuel ratio to the rich air-fuel ratio, constituting the "rich shift amount". Due to this, the time period in which the target average air-fuel ratio is set to the lean set correction amount AFClean (for example, times $t_2$ to $t_3$) is made longer than the time period in which the target air-fuel ratio is set to the rich set correction amount AFCrich (for example, times $t_1$ to $t_2$).

<Inter-Cylinder Air-Fuel Ratio Control>

Next, inter-cylinder air-fuel ratio control will be explained. In inter-cylinder air-fuel ratio control, the fuel injection amounts from the fuel injectors 11 are controlled so that the combustion air-fuel ratios becomes different air-fuel ratios at least partially between the cylinders. In particular, in the present embodiment, in part of the cylinders, the combustion air-fuel ratio is made richer than the target average air-fuel ratio, while at the remaining cylinders, the combustion air-fuel ratio is made leaner than the target air-fuel ratio.

Figure 5:
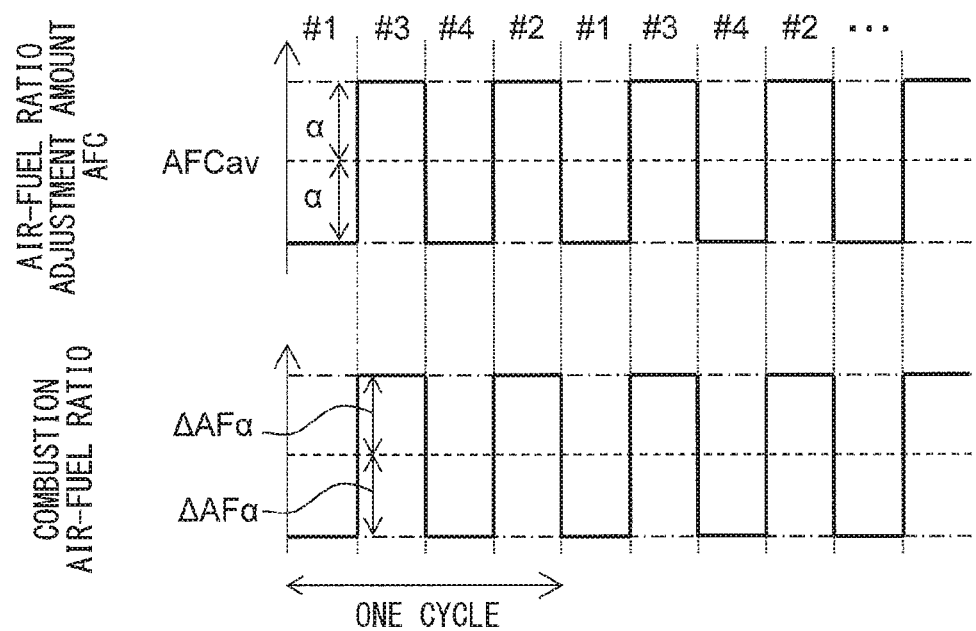
FIG. 5 is a time chart of an air-fuel ratio correction amount and combustion air-fuel ratio.

FIG. 5 is a time chart of the air-fuel ratio correction amount AFC and combustion air-fuel ratios of the cylinders. In the present embodiment, the internal combustion engine is an in-line four-cylinder internal combustion engine, therefore the air-fuel mixture is burned in the combustion chambers 5 in the order of the #1 cylinder, #3 cylinder, #4 cylinder, and #2 cylinder. In the example which is shown in FIG. 5, in the #1 cylinder where combustion is first performed in one cycle, the air-fuel ratio correction amount AFC in the cylinder is decreased by the average air-fuel ratio correction amount AFCav. That is, in the #1 cylinder, the air-fuel ratio of the air-fuel mixture which is fed to the combustion chamber 5 is made richer than the average target air-fuel ratio. Therefore, in the #1 cylinder, the combustion air-fuel ratio is made an air-fuel ratio richer than the average air-fuel ratio of the exhaust gas which flows into the upstream side exhaust purification catalyst 20.

Further, at the #3 cylinder at which combustion is next performed, the air-fuel ratio correction amount AFC of the cylinder is increased by the average air-fuel ratio correction amount AFCav. As a result, at the #3 cylinder, the combustion air-fuel ratio is made an air-fuel ratio leaner than the average air-fuel ratio. Further, at the #4 cylinder at which combustion is next performed, the combustion air-fuel ratio is made an air-fuel ratio richer than the average air-fuel ratio, while at the #2 cylinder at which combustion is next performed, the combustion air-fuel ratio is made an air-fuel ratio which is leaner than the average air-fuel ratio.

Further, in the present embodiment, the amounts of change from the average air-fuel ratio correction amount AFCav in the inter-cylinder air-fuel ratio control are made the same between cylinders made richer than the average air-fuel ratio (in the figure, #1 cylinder and #4 cylinder, below, also referred to as "rich side cylinders"). In the example which is shown in FIG. 5, the amounts of change of the air-fuel ratio correction amounts in the #1 cylinder and #4 cylinder both become $\alpha$. As a result, the combustion air-fuel ratios are made air-fuel ratios richer than the average air-fuel ratio by exactly $\Delta AF\alpha$ (corresponding to amount of change $\alpha$). Similarly, in the present embodiment, the amounts of change from the average air-fuel ratio correction amount AFCav in the inter-cylinder air-fuel ratio control are made the same between cylinders made leaner than the average air-fuel ratio (in the figure, #2 cylinder and #3 cylinder, below, also referred to as "lean side cylinders"). In the example which is shown in FIG. 5, the amounts of change of the air-fuel ratio correction amounts in the #2 cylinder and #3 cylinder both become $\alpha$. As a result, the combustion air-fuel ratios in these cylinders are made air-fuel ratios leaner than the average air-fuel ratio by exactly $\Delta AF\alpha$ (corresponding to amount of change $\alpha$).

Furthermore, in the present embodiment, between the rich side cylinders and the lean side cylinders as well, the amounts of change from the average air-fuel ratio correction amount AFCav are made the same $\alpha$. As a result, the difference between the combustion air-fuel ratio and average air-fuel ratio of a cylinder which is made richer than the average air-fuel ratio becomes equal to the difference between the combustion air-fuel ratio and average air-fuel ratio of a cylinder which is made leaner than the average air-fuel ratio.

In FIG. 4, X indicates the amounts of change of combustion air-fuel ratios from the average air-fuel ratio correction amount AFCav in inter-cylinder air-fuel ratio control. As will be understood from FIG. 4, at the times $t_1$ to $t_2$ when the average air-fuel ratio correction amount AFCav is set to the rich set correction amount AFCrich, at the rich side cylinders (#1 cylinder, #4 cylinder), the air-fuel ratio correction amounts AFC of the cylinders become the rich set correction amount AFCrich minus the amount of change $\alpha$ (AFCrich-$\alpha$). As a result, at the rich side cylinders, the combustion air-fuel ratios are made air-fuel ratios richer than the average air-fuel ratio by exactly $\Delta AF\alpha$ (corresponding to amount of change $\alpha$). Further, at the times $t_1$ to $t_2$, at the lean side cylinders, the air-fuel ratio correction amounts AFC of the cylinders become the rich set correction amount AFCrich plus the amount of change $\alpha$ (AFCrich+$\alpha$). As a result, at the lean side cylinders, the combustion air-fuel ratios are made air-fuel ratios leaner than the average air-fuel ratio by exactly $\Delta AF\alpha$ (corresponding to amount of change $\alpha$). In addition, the amount of change $\alpha$ is made a value larger than the absolute value of the rich set correction amount AFCrich. For this reason, at the lean side cylinders, the combustion air-fuel ratios are controlled so that the combustion air-fuel ratios become lean air-fuel ratios.

Similarly, at the times $t_2$ to $t_3$ where the average air-fuel ratio correction amount AFCav is set to the lean set correction amount AFlean, at the lean side cylinders (#2 cylinder, #3 cylinder), the air-fuel ratio correction amounts AFC of the cylinders become the lean set correction amount AFClean plus the amount of change $\alpha$ (AFClean+$\alpha$). As a result, at the lean side cylinders, the combustion air-fuel ratios are made air-fuel ratios leaner than the average air-fuel ratio by exactly $\Delta AF\alpha$ (corresponding to amount of change $\alpha$). Further, at the times $t_2$ to $t_3$, at the rich side cylinders, the air-fuel ratio correction amounts AFC of the cylinders become the lean set correction amount AFClean minus the amount of change $\alpha$ (AFClean-$\alpha$). As a result, at the rich side cylinders, the combustion air-fuel ratios are made air-fuel ratios richer than the average air-fuel ratio by exactly $\Delta AF\alpha$ (corresponding to amount of change $\alpha$). In addition, the amount of change $\alpha$ is made a value larger than the absolute value of the lean set correction amount AFClean. For this reason, at the rich side cylinders, the combustion air-fuel ratios are controlled so that the combustion air-fuel ratios becomes rich air-fuel ratios.

Note that, the amount of change $\alpha$ is larger than the absolute values of the rich set correction amount AFCrich and lean set correction amount AFClean. For this reason, in inter-cylinder air-fuel ratio control, the difference between the combustion air-fuel ratio of a cylinder which is made richer than the average air-fuel ratio and the combustion air-fuel ratio of a cylinder which is made leaner than the average air-fuel ratio (that is, amplitude of air-fuel ratio in inter-cylinder air-fuel ratio control) is larger than the difference between the rich set air-fuel ratio and lean set air-fuel ratio at the average air-fuel ratio control (that is, amplitude of air-fuel ratio in average air-fuel ratio control).

<Effects of Average Air-Fuel Ratio Control and Inter-Cylinder Air-Fuel Ratio Control>

Figure 6A:
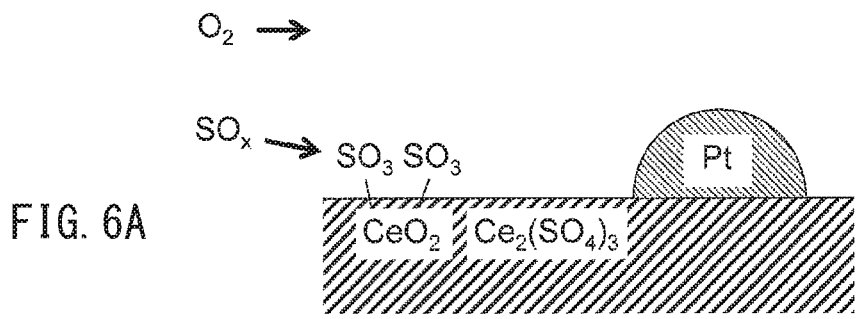
FIGS. 6A to 6C are views which schematically show a carrier surface of an exhaust purification catalyst.
Figure 6B:
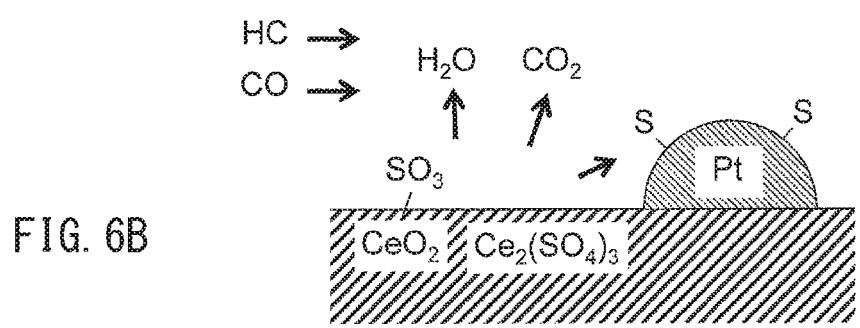
Figure 6C:
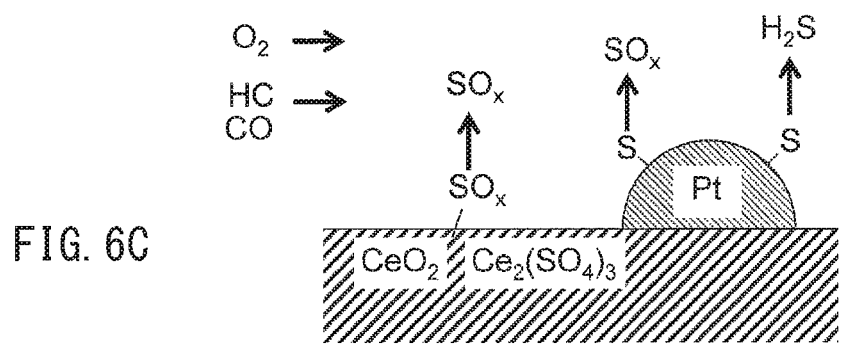

Next, referring to FIGS. 6A to 6C and FIGS. 7A and 7B, the effects due to average air-fuel ratio control and inter-cylinder air-fuel ratio control will be explained. First, referring to FIGS. 6A to 6C, the effect of performing the above-mentioned such average air-fuel ratio control will be explained. FIGS. 6A to 6C are views which schematically show the carrier surfaces of the exhaust purification catalysts 20 and 24. In the example which is shown in FIGS. 6A to 6C, the carriers of the exhaust purification catalysts 20 and 24 contain platinum (Pt) as a precious metal which has a catalytic action and ceria ($CeO_2$) as a substance which has an oxygen storage ability.

In this regard, the fuel which is supplied into the internal combustion engine contains a sulfur content, though slight, therefore the exhaust gas which is discharged from the combustion chamber 5 contains a slight amount of sulfur oxides ($SO_X$). When the temperatures of the exhaust purification catalysts 20 and 24 do not become that high (for example, are 600° C. or less), if the $SO_X$ which is contained in the exhaust gas flows into the exhaust purification catalysts 20 and 24, even if the air-fuel ratio of the exhaust gas is a substantially stoichiometric air-fuel ratio, the $SO_X$ is physically adsorbed at the ceria on the carrier by Van der Waals force. However, the $SO_X$ which is contained in the exhaust gas is firmly stored by the ceria on the carriers if the air-fuel ratio of the exhaust gas is the lean air-fuel ratio.

FIG. 6A shows the state where the exhaust gas of a lean air-fuel ratio flows into the exhaust purification catalysts 20 and 24 when the temperature of the exhaust purification catalysts 20 and 24 is not that high (for example, 600° C. or less). Therefore, in the state which is shown in FIG. 6A, the exhaust gas which flows into the exhaust purification catalysts 20 and 24 contains a large amount of excess oxygen. If the exhaust gas which flows into the exhaust purification catalysts 20 and 24 contains excess oxygen, the $SO_X$ which is contained in the exhaust gas is chemically adsorbed at the ceria as $SO_3$. According to this chemical adsorption, $SO_X$ is adsorbed at the ceria more firmly than the above-mentioned physical adsorption. Further, if the excess oxygen which is contained in the exhaust gas becomes further greater, that is, if the lean degree of the air-fuel ratio of the exhaust gas becomes larger, the $SO_X$ which is contained in the exhaust gas reacts with the ceria to become $Ce_2(SO_4)_3$ and is absorbed. By such absorption, $SO_X$ is firmly absorbed at the ceria by the above-mentioned chemical adsorption. Note that, in the following explanation, $SO_X$ being "adsorbed" and "absorbed" at the ceria will be referred to all together as the $SO_X$ being "stored" at the ceria.

In such a state, if exhaust gas exhaust gas of a rich air-fuel ratio flows into the exhaust purification catalysts 20 and 24, the sulfur content of the $SO_X$ which is stored in the ceria moves on to the platinum. This state is shown in FIG. 6B. As shown in FIG. 6B, if exhaust gas of a rich air-fuel ratio flows into the exhaust purification catalysts 20 and 24, the exhaust gas contains a large amount of excess unburned HC and CO. For this reason, the $SO_X$ which is stored in the ceria is broken down by the unburned HC and CO resulting in the production of water ($H_2O$) and carbon dioxide ($CO_2$). In addition, the sulfur content which is produced by breakdown of $SO_X$ is adsorbed on the surface of the platinum. In this way, if the sulfur content which is adsorbed on the surface of the platinum increases and covers the surface of the platinum, the area by which the platinum contacts the surrounding gas decreases thereby inviting a drop in the catalytic activity of the platinum.

Note that, breakdown of sulfur which is stored in the ceria becomes harder the stronger $SO_X$ is stored at the ceria. Therefore, compared with when $SO_X$ is chemically adsorbed at the ceria, when $SO_X$ is absorbed in the ceria as $Ce_2(SO_4)_3$, breakdown of sulfur which is stored in the ceria becomes harder and therefore movement of the sulfur content from the ceria to the platinum does not easily occur. For this reason, movement of sulfur content when $SO_X$ is absorbed at the ceria does not occur, compared with when $SO_X$ is chemically adsorbed at ceria, if the rich degree of the air-fuel ratio of the exhaust gas is not large or if the temperature of the exhaust purification catalysts 20 and 24 is not high.

In this way, in the state where the sulfur content is adsorbed on the surface of the platinum, the exhaust purification catalysts 20 and 24 become high in temperature (for example, 600° C. or more). If rich air-fuel ratio exhaust gas flows into the exhaust purification catalysts 20 and 24, the sulfur content which is adsorbed on the surfaces of the platinum is made to separate. This state is shown in FIG. 6C. As shown in FIG. 6C, if rich air-fuel ratio exhaust gas flows into the exhaust purification catalysts 20 and 24, the inflowing exhaust gas contains a large amount of excess unburned HC and CO. Further, even when the air-fuel ratio of the exhaust gas is a rich air-fuel ratio, the exhaust gas contains oxygen, though slight. For this reason, if the exhaust purification catalysts 20 and 24 are high in temperature, the sulfur content which is adsorbed on the platinum surfaces reacts with the unburned HC, CO, and oxygen in the exhaust gas to become $SO_X$ and $H_2S$ which are made to be separated from the platinum surface. Note that, at this time, the $SO_X$ which is stored at the ceria is also made to separate without being absorbed at the platinum surfaces.

Here, during operation of the internal combustion engine, the temperature of the exhaust purification catalysts 20 and 24 is not constantly maintained at a high temperature (for example, 720° C. or more). Depending on the engine operating state, it is sometimes maintained at a certain degree of low temperature (for example, less than 720° C.). When in this way the exhaust purification catalysts 20 and 24 are maintained at a certain degree of low temperature, if the air-fuel ratio of the exhaust gas which flows into the exhaust purification catalysts 20 and 24 becomes a rich air-fuel ratio, as shown in FIG. 6B, the sulfur content moves from the ceria to the platinum surfaces and a drop of the catalytic activity of the platinum ends up being invited.

As opposed to this, in the average air-fuel ratio control which is shown in FIG. 4, the lean shift amount is made smaller than the rich shift amount. Due to this, the time period during which the average air-fuel ratio is lean becomes longer than the time period during which the average air-fuel ratio is rich. In this way, in the average air-fuel ratio control which is shown in FIG. 4, the time period in which the average air-fuel ratio of the exhaust gas which flows into the upstream side exhaust purification catalyst 20 is lean becomes longer or the time period in which the average air-fuel ratio is rich becomes shorter. For this reason, it becomes harder for the sulfur content to move from the ceria to the platinum surface and accordingly becomes possible to suppress the drop in catalytic activity of the platinum.

Note that, from the viewpoint of making the time period when the average air-fuel ratio is lean longer and making the time period when the average air-fuel ratio is rich shorter, it is preferable that the lean shift amount be as small as possible and that the rich shift amount be as large as possible. That is, the difference between the lean shift amount and the rich shift amount is preferably made as large as possible.

Figure 7A:
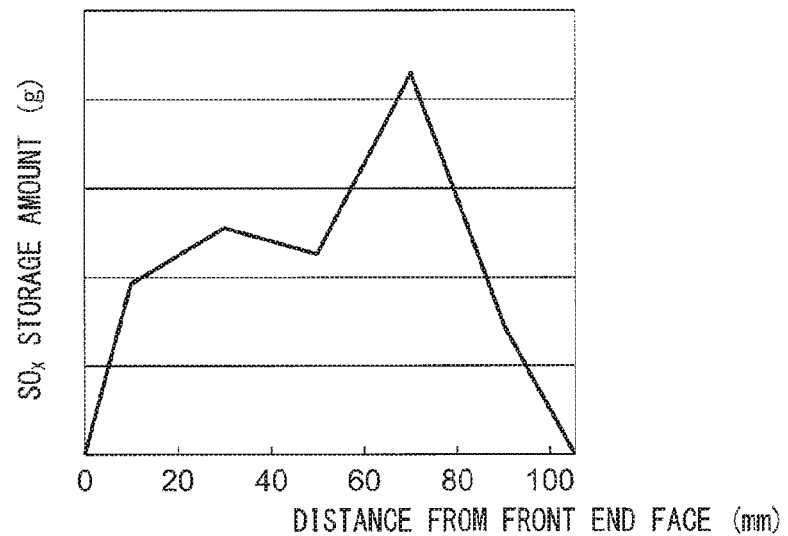
FIGS. 7A and 7B are views which show the relationship between a distance from a front end surface of an upstream side exhaust purification catalyst and a storage amount of $SO_X$ per unit volume.
Figure 7B:
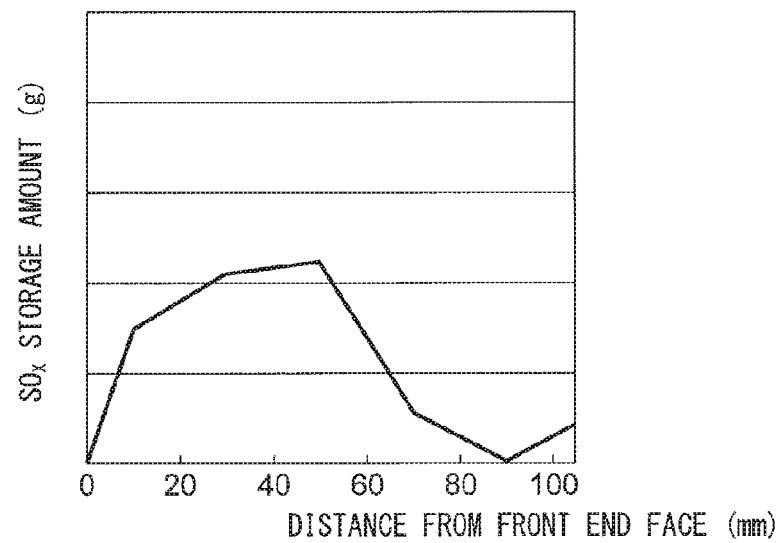

Next, referring to FIGS. 7A and 7B, the effect of performing inter-cylinder air-fuel ratio control will be explained. FIGS. 7A and 7B show the relationship between the distance from the upstream side end face of the upstream side exhaust purification catalyst in the direction of flow of exhaust (front end face) and the storage amount of the $SO_X$ in the carrier per unit volume of the exhaust purification catalyst and shows the results of experiments when using fuel with a high sulfur content concentration to operate the internal combustion engine for a predetermined time.

FIG. 9A shows the results when maintaining the average exhaust air-fuel ratio of the exhaust gas which flows into the upstream side exhaust purification catalyst at the stoichiometric air-fuel ratio and not performing the above-mentioned inter-cylinder air-fuel ratio control. Therefore, FIG. 9A shows the results when the combustion air-fuel ratios are maintained at the stoichiometric air-fuel ratios at all cylinders. As will be understood from FIG. 7A, when inter-cylinder air-fuel ratio control is not being performed, $SO_X$ is stored across the entire direction of flow of exhaust of the upstream side exhaust purification catalyst and in particular a large amount of $SO_X$ is stored at the back.

On the other hand, FIG. 7B shows the results when maintaining the average exhaust air-fuel ratio of the exhaust gas which flows into the upstream side exhaust purification catalyst at the stoichiometric air-fuel ratio and performing the above-mentioned inter-cylinder air-fuel ratio control. Therefore, FIG. 7B shows the results in the case when the combustion air-fuel ratio is made to shift to the rich side and lean side from the stoichiometric air-fuel ratio for each cylinder. As will be understood from FIG. 9B, when performing inter-cylinder air-fuel ratio control, a large amount of $SO_X$ is stored in the front of the upstream side exhaust purification catalyst in the direction of flow of exhaust and almost no $SO_X$ is stored in the back.

In this way, as the reason why $SO_X$ is stored at the front of the upstream side exhaust purification catalyst when performing inter-cylinder air-fuel ratio control, the existence of a relationship between the storage of $SO_X$ and adsorption and release of oxygen may be considered. When performing inter-cylinder air-fuel ratio control, exhaust gas which contains excess unburned HC and CO is discharged from a cylinder with a combustion air-fuel ratio of a rich air-fuel ratio. On the other hand, exhaust gas which contains excess unburned oxygen is discharged from a cylinder with a combustion air-fuel ratio of a lean air-fuel ratio. As a result, the exhaust gas which flows into the upstream side exhaust purification catalyst contains large amounts of unburned HC, CO, and oxygen even if the average air-fuel ratio is the stoichiometric air-fuel ratio.

As a result, when performing inter-cylinder air-fuel ratio control (FIG. 7B), oxygen is actively adsorbed and released at the front of the upstream side exhaust purification catalyst. Here, storage of $SO_X$ at the carrier of the upstream side exhaust purification catalyst is believed to easily occur in the region of the upstream side exhaust purification catalyst where oxygen is actively absorbed and released. For this reason, when performing inter-cylinder air-fuel ratio control, a large amount of $SO_X$ is stored at the front of the upstream side exhaust purification catalyst where oxygen is actively absorbed and released. As a result, $SO_X$ is no longer stored at the back.

On the other hand, when not performing inter-cylinder air-fuel ratio control (FIG. 7A), the unburned HC, CO, and oxygen which are contained in the exhaust gas which flows into the upstream side exhaust purification catalyst are not that great. For this reason, at the front side of the upstream side exhaust purification catalyst, a reaction that is not that active occurs. Therefore, at the front side, oxygen is not actively absorbed or released. As a result, oxygen is actively absorbed and released at the middle to back of the upstream side exhaust purification catalyst. For this reason, when not performing inter-cylinder air-fuel ratio control, $SO_X$ is stored over the entire region in the direction of flow of exhaust. In particular, it is believed that a large amount of $SO_X$ is stored from the middle to the back of the upstream side exhaust purification catalyst. Note that, in the example which is shown in FIGS. 7A and 7B, the case is shown where the average air-fuel ratio of the exhaust gas which flows into the upstream side exhaust purification catalyst is maintained at the stoichiometric air-fuel ratio, but a similar trend is observed when the average air-fuel ratio of the exhaust gas which flows into the upstream side exhaust purification catalyst is maintained at the lean air-fuel ratio.

Here, the maximum storable oxygen amount Cmax of the upstream side exhaust purification catalyst changes in accordance with the state of storage of $SO_X$. Specifically, if $SO_X$ is stored even a little in a certain region of the upstream side exhaust purification catalyst, the amount of oxygen which can be stored in that region decreases. After that, even though the amount of storage of $SO_X$ in that region increases, the amount of oxygen which can be stored is hardly decreased further. Therefore, when not performing inter-cylinder air-fuel ratio control (FIG. 7A), $SO_X$ is stored across the entire direction of flow of exhaust of the upstream side exhaust purification catalyst, therefore the maximum storable oxygen amount Cmax of the upstream side exhaust purification catalyst becomes smaller. As opposed to this, when performing inter-cylinder air-fuel ratio control (FIG. 7B), a region remains where almost no $SO_X$ is stored at the back of the upstream side exhaust purification catalyst. As a result, in this case, a drop in the maximum storable oxygen amount Cmax can be suppressed.

Further, if performing the inter-cylinder air-fuel ratio control when the average air-fuel ratio correction amount AFCav is the lean set correction amount AFClean (for example, times $t_2$ to $t_3$ of FIG. 4), at a lean side cylinder, the air-fuel ratio correction amount AFC becomes the lean set correction amount AFClean plus the amount of change α. As a result, the combustion air-fuel ratio of the lean side cylinder is lean with a large lean degree.

Here, as explained with reference to FIG. 6A, the larger the lean degree of the air-fuel ratio of the exhaust gas which flows into the upstream side exhaust purification catalyst 20, the more strongly the $SO_X$ is stored at the ceria. Therefore, by performing average air-fuel ratio control plus additional inter-cylinder air-fuel ratio control, the $SO_X$ can be made to be firmly stored at the ceria and therefore the movement of sulfur content from the ceria to the platinum surface can be suppressed.

From the above, according to the air-fuel ratio which is shown in FIG. 4, by performing the above-mentioned such average air-fuel ratio control, the sulfur content which was adsorbed at the carrier (ceria etc.) can be kept from moving to the precious metal (platinum etc.). Due to this, it is possible to suppress a drop in catalytic activity of the precious metal. In addition, by performing the above-mentioned such inter-cylinder air-fuel ratio control, it is possible to suppress the storage of $SO_X$ in the carrier at the rear of the upstream side exhaust purification catalyst 20. Due to this, it is possible to suppress a drop in the maximum storable oxygen amount. Furthermore, even by performing the above-mentioned inter-cylinder air-fuel ratio control, it is possible to keep the sulfur content which was adsorbed at the carrier from moving to the precious metal.

Note that, in the above embodiment, in inter-cylinder air-fuel ratio control, the amount of change α becomes the same in all of the rich side cylinders. Accordingly, the combustion air-fuel ratio becomes the same. However, there is no need to make the amount of change α constant at all of the rich side cylinders. It may also be possible to make it a value which differs in amount of change even between cylinders at the rich side. In this case, the combustion air-fuel ratio will differ between the rich side cylinders. Further, the same can be said for the lean side cylinders.

Further, in the above embodiment, in inter-cylinder air-fuel ratio control, the combustion air-fuel ratio is made to shift to either the rich side or the lean side from the average air-fuel ratio in all of the cylinders. However, in inter-cylinder air-fuel ratio control, in part of the cylinders, the amount of change may be made zero and combustion air-fuel ratio may be made to match the average air-fuel ratio.

In addition, in the above embodiment, in inter-cylinder air-fuel ratio control, the number of the rich side cylinders and the number of the lean side cylinders are the same. However, the number of the rich side cylinders and the number of the lean side cylinders need not necessarily be the same. Therefore, for example, in the case of a four-cylinder internal combustion engine, just one cylinder may be made a cylinder made to shift to the rich side and the remaining three cylinders or two of the remaining three cylinders may be made cylinders made to shift to the lean side.

However, in each case, even when the average air-fuel ratio is controlled to the lean air-fuel ratio by average air-fuel ratio control, inter-cylinder air-fuel ratio control has to be performed so that the combustion air-fuel ratio becomes the rich air-fuel ratio at least at one cylinder among the plurality of cylinders. Further, even when the average air-fuel ratio is controlled to the rich air-fuel ratio by average air-fuel ratio control, inter-cylinder air-fuel ratio control is preferably performed so that the combustion air-fuel ratio becomes the lean air-fuel ratio at least at one cylinder among the plurality of cylinders. Further, in inter-cylinder air-fuel ratio control, the combustion air-fuel ratios of the cylinders are preferably controlled so as to become richer than the average air-fuel ratio at part of the cylinders among the plurality of cylinders and so as to become leaner than the average air-fuel ratio at the remaining cylinders among the plurality of cylinders.

<Deviation in Upstream Side Air-Fuel Ratio Sensor>

In this regard, even if the air-fuel ratio of the exhaust gas which is exhausted from the engine body is constant, the greater the amount of hydrogen which is contained in the exhaust gas, the more the air-fuel ratio which corresponds to the output of the air-fuel ratio sensor (below, also referred to as the "output air-fuel ratio") deviates to the rich side. This is believed to be because hydrogen slips through the diffusion regulating layer which is provided at the air-fuel ratio sensor more easily compared with unburned HC and other content in exhaust gas. For example, when the equivalent ratio of unburned HC and CO and oxygen which are contained in exhaust gas is 1:1, since the diffusion rates of these ingredients are not that different in magnitude, the output air-fuel ratio of the air-fuel ratio sensor becomes substantially the stoichiometric air-fuel ratio. As opposed to this, when the equivalent ratio of unburned HC and CO and hydrogen which are contained in exhaust gas is 1:1, the diffusion rate is faster for only hydrogen among these, therefore a large amount of hydrogen is present around the exhaust side electrode of the air-fuel ratio sensor. As a result, the output air-fuel ratio of the air-fuel ratio sensor ends up deviating to the rich side.

In particular, when performing inter-cylinder air-fuel ratio control, exhaust gas of an air-fuel ratio richer than the target average air-fuel ratio flows out from part of the cylinders. The exhaust gas of such a rich air-fuel ratio contains hydrogen in addition to unburned HC and CO. For this reason, even if the air-fuel ratio of the exhaust gas is constant, when performing inter-cylinder air-fuel ratio control, the amount of hydrogen which is contained in the exhaust gas is greater compared with when not performing inter-cylinder air-fuel ratio control. As a result, the output air-fuel ratio of the air-fuel ratio sensor easily deviates to the rich side.

If deviation occurs in the output air-fuel ratio of the upstream side air-fuel ratio sensor 40 in this way, even if having performed the above-mentioned such average air-fuel ratio control or inter-cylinder air-fuel ratio control, sometimes the effect can no longer be sufficiently obtained. Below, this will be explained referring to FIG. 8.

Figure 8:
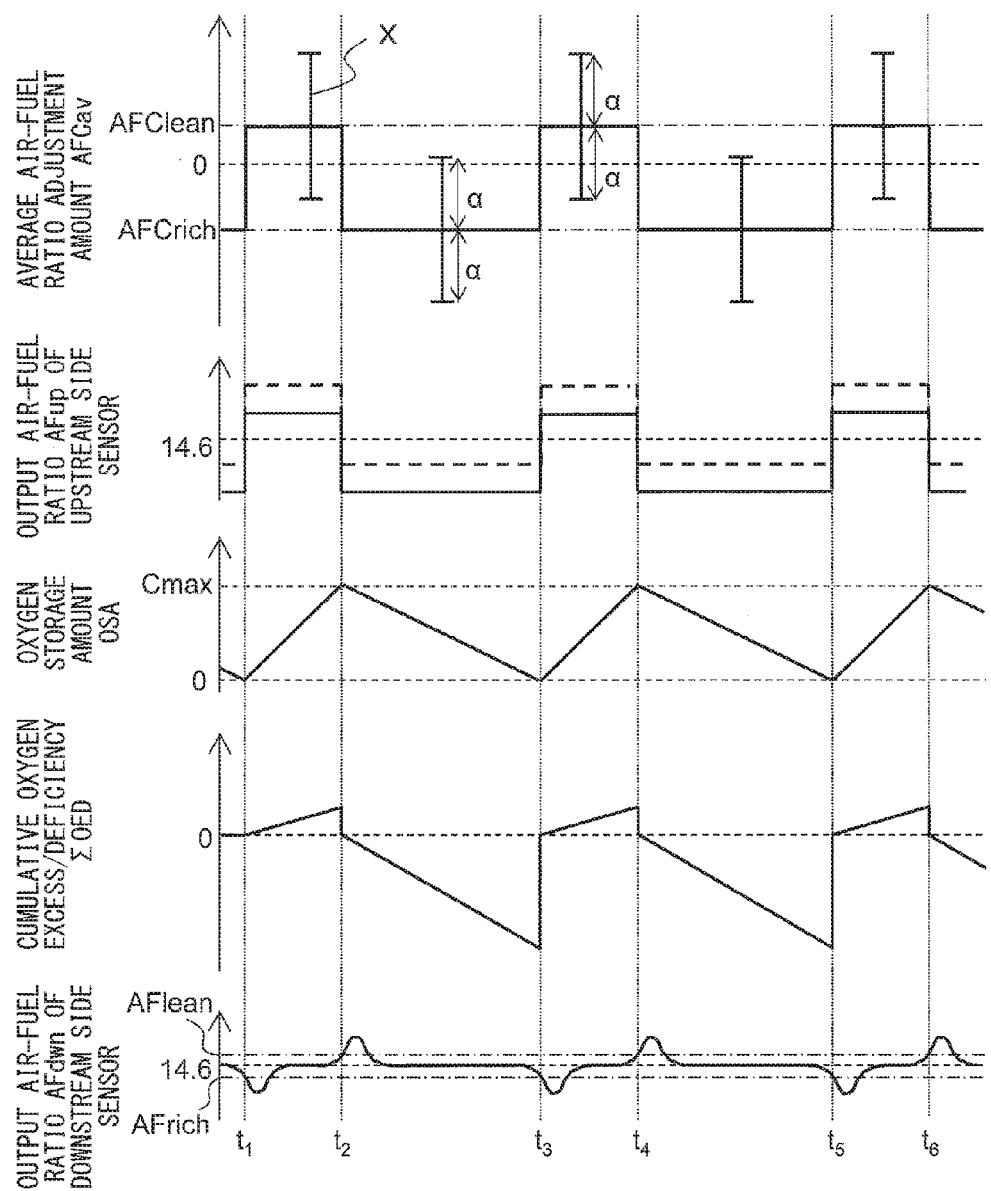
FIG. 8 is a time chart of an average air-fuel ratio correction amount etc. when deviation occurs in an output air-fuel ratio of an upstream side air-fuel ratio sensor.

FIG. 8 is a time chart of the average air-fuel ratio correction amount AFCav, etc., similar to FIG. 4. FIG. 8 shows the case where the output air-fuel ratio of the upstream side air-fuel ratio sensor 40 deviates to the rich side. In the figure, the solid line in the output air-fuel ratio AFup of the upstream side air-fuel ratio sensor 40 shows the actual output air-fuel ratio. On the other hand, the broken line shows the actual air-fuel ratio of the exhaust gas flowing around the upstream side air-fuel ratio sensor 40.

In the example shown in FIG. 8, before the time $t_1$, the average air-fuel ratio correction amount AFCav is set to the rich set adjustment amount AFCrich. Accordingly, the target average air-fuel ratio is set to the rich set air-fuel ratio. Along with this, the output air-fuel ratio AFup of the upstream side air-fuel ratio sensor 40 becomes an air-fuel ratio equal to the rich set air-fuel ratio. However, since, as explained above, the output air-fuel ratio of the upstream side air-fuel ratio sensor 40 deviates to the rich side, the actual air-fuel ratio of the exhaust gas becomes an air-fuel ratio which is at the lean side from the rich set air-fuel ratio. That is, the output air-fuel ratio AFup of the upstream side air-fuel ratio sensor 40 becomes lower (richer) than the actual air-fuel ratio (broken line in figure). For this reason, the speed of decrease of the oxygen storage amount OSA of the upstream side exhaust purification catalyst 20 becomes slower.

Further, in the example shown in FIG. 8, the output air-fuel ratio AFdwn of the downstream side air-fuel ratio sensor 41 reaches the rich judged air-fuel ratio AFrich at the time $t_1$. For this reason, as explained above, the average air-fuel ratio correction amount AFCav is switched to the lean set correction amount AFClean at the time $t_1$. That is to say, the target air-fuel ratio is switched to the lean set air-fuel ratio.

Along with this, the output air-fuel ratio AFup of the upstream side air-fuel ratio sensor 40 becomes an air-fuel ratio equal to the lean set air-fuel ratio. However, since, as explained above, the output air-fuel ratio of the upstream side air-fuel ratio sensor 40 deviates to the rich side, the actual air-fuel ratio of the exhaust gas becomes an air-fuel ratio which is at the lean side from the lean set air-fuel ratio. That is, the output air-fuel ratio AFup of the upstream side air-fuel ratio sensor 40 becomes lower (richer) than the actual air-fuel ratio (broken line in figure). For this reason, the speed of decrease of the oxygen storage amount OSA of the upstream side exhaust purification catalyst 20 becomes faster.

If, in this way, deviation occurs in the output air-fuel ratio AFdwn of the upstream side air-fuel ratio sensor 40, compared with when no deviation occurs, the speed of decrease of the oxygen storage amount OSA when the average air-fuel ratio correction amount AFCav is set to the rich set correction amount AFCrich becomes slower. In addition, the speed of increase of the oxygen storage amount OSA when the average air-fuel ratio correction amount AFCav is set to the lean set correction amount AFClean becomes faster. For this reason, the time period during which the average air-fuel ratio correction amount AFCav is set to the rich set correction amount AFCrich becomes longer while the time period during which it is set to the lean set correction amount AFClean becomes shorter. Therefore, the time period during which the average air-fuel ratio of the exhaust gas which flows into the upstream side exhaust purification catalyst 20 is rich becomes longer while the time period during which the average air-fuel ratio is lean becomes shorter. For this reason, the sulfur content easily moves from the ceria to the platinum surface and therefore is liable to invite a drop in the catalytic activity of the platinum.

Therefore, to keep down the drop in the catalytic activity, it is necessary to correct the output air-fuel ratio etc. so as to compensate for the deviation of the output air-fuel ratio of the upstream side air-fuel ratio sensor 40.

<Normal Learning Control>

Therefore, in this embodiment of the present invention, to compensate for the deviation of the output air-fuel ratio of the upstream side air-fuel ratio sensor 40, learning control is performed during normal operation (that is, when performing feedback control based on the above-mentioned such target average air-fuel ratio). First, normal learning control will be explained.

Here, the time period from when switching the target average air-fuel ratio to the lean air-fuel ratio to when again switching to the rich air-fuel ratio is made the "oxygen increase time period (first time period). Similarly, the time period from when switching the target average air-fuel ratio to the rich air-fuel ratio to when again switching to the lean air-fuel ratio is made the "oxygen decrease time period" (second time period). In normal learning control of the present embodiment, the lean oxygen amount cumulative value (cumulative value of the first oxygen amount) is calculated as the absolute value of the cumulative oxygen excess/deficiency ΣOED in the oxygen increase time period. In addition, the rich oxygen amount cumulative value (cumulative value of the second oxygen amount) is calculated as the absolute value of the cumulative oxygen excess/deficiency ΣOED in the oxygen decrease time period. Further, the control center air-fuel ratio AFR is corrected so that the difference between the lean oxygen amount cumulative value and the rich oxygen amount cumulative value becomes smaller.

Further, in the present embodiment, as explained above, when the difference between the calculated lean oxygen amount cumulative value and the rich oxygen amount cumulative value is a predetermined value or more, the above-mentioned inter-cylinder air-fuel ratio control is not performed, but the target air-fuel ratios of the cylinders are controlled so that the target air-fuel ratios become equal at all of the cylinders. Below, such control will be explained with reference to FIG. 9.

Figure 9:
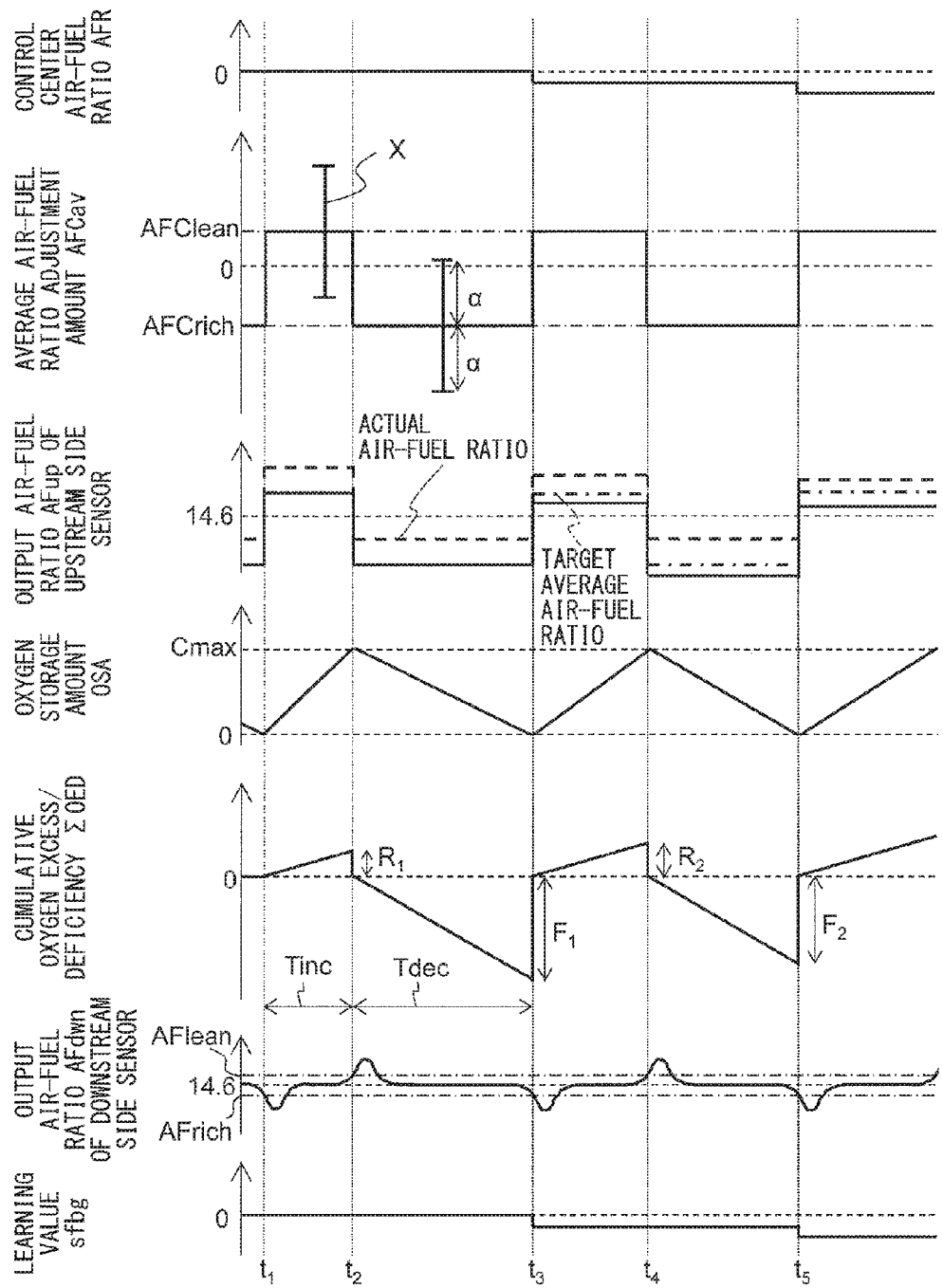
FIG. 9 is a time chart of the air-fuel ratio correction amount etc. when performing normal learning control.

FIG. 9 is a time chart of the control center air-fuel ratio AFR, the average air-fuel ratio correction amount AFCav, the output air-fuel ratio AFup of the upstream side air-fuel ratio sensor 40, the oxygen storage amount OSA of the upstream side exhaust purification catalyst 20, the cumulative oxygen excess/deficiency ΣOED, the output air-fuel ratio AFdwn of the downstream side air-fuel ratio sensor 41, and the learning value sfbg. FIG. 9 shows the case, like FIG. 8, where the output air-fuel ratio AFup of the upstream side air-fuel ratio sensor 40 deviates to the low side (rich side). Note that, the learning value sfbg is a value which changes in accordance with the deviation of the output air-fuel ratio (output current) of the upstream side air-fuel ratio sensor 40 and, in the present embodiment, is used for correction of the control center air-fuel ratio AFR. Further, in the figure, the solid line in the output air-fuel ratio AFup of the upstream side air-fuel ratio sensor 40 shows the air-fuel ratio which corresponds to the output detected by the upstream side air-fuel ratio 40, while the broken line shows the actual air-fuel ratio of the exhaust gas flowing around the upstream side air-fuel ratio 40. In addition, one-dot chain line shows the target average air-fuel ratio, that is, an air-fuel ratio corresponding to the average air-fuel ratio correction amount AFCav.

Note that, the cumulative oxygen excess/deficiency ΣOED is the cumulative value of the oxygen excess/deficiency. The "oxygen excess/deficiency" means the oxygen which becomes in excess or the oxygen which becomes deficient (amount of excessive unburned gas, etc.) when trying to make the air-fuel ratio of the exhaust gas flowing into the upstream side exhaust purification catalyst 20 the stoichiometric air-fuel ratio. In particular, when the target average air-fuel ratio becomes the lean set air-fuel ratio, oxygen in the exhaust gas flowing into the upstream side exhaust purification catalyst 20 becomes excessive. This excess oxygen is stored in the upstream side exhaust purification catalyst 20. Therefore, the cumulative value of the oxygen excess/deficiency (that is, "cumulative oxygen excess/deficiency") can be said to express the oxygen storage amount OSA of the upstream side exhaust purification catalyst 20.

The oxygen excess/deficiency is calculated based on the output air-fuel ratio AFup of the upstream side air-fuel ratio sensor 40 and the estimated value of the amount of intake air to the inside of the combustion chamber 5 which is calculated based on the air flow meter 39, etc. or the amount of feed of fuel from the fuel injector 11, etc. Specifically, the oxygen excess/deficiency OED is, for example, calculated by the following formula (1):

$$OED = 0.23 \cdot Qi \cdot (AFup - 14.6) \qquad (1)$$

In this regard, 0.23 is the oxygen concentration in the air, Qi indicates the fuel injection amount, and AFup indicates the output air-fuel ratio of the upstream side air-fuel ratio sensor 40.

In the illustrated example, in the state before the time $t_1$, the control center air-fuel ratio is set to the stoichiometric air-fuel ratio and therefore the average air-fuel ratio correction amount AFCav is set to the rich set adjustment amount AFCrich. At this time, the output air-fuel ratio AFup of the upstream side air-fuel ratio sensor 40, as shown by the solid line, becomes an air-fuel ratio which corresponds to the rich set air-fuel ratio. However, since the output air-fuel ratio of the upstream side air-fuel ratio sensor 40 deviates, the actual air-fuel ratio of the exhaust gas becomes an air-fuel ratio which is leaner than the rich set air-fuel ratio (broken line in FIG. 9). However, in the example shown in FIG. 9, as will be understood from the broken line in FIG. 9, the actual air-fuel ratio of the exhaust gas before the time $t_1$ is a rich air-fuel ratio, while it is richer than the stoichiometric air-fuel ratio. Therefore, the upstream side exhaust purification catalyst 20 is gradually decreased in the oxygen storage amount.

In the illustrated example, at the time $t_1$, the output air-fuel ratio AFdwn of the downstream side air-fuel ratio sensor 41 reaches the rich judged air-fuel ratio AFrich. Due to this, as explained above, the average air-fuel ratio correction amount AFCav is switched to the lean set adjustment amount AFClean. After the time $t_1$, the output air-fuel ratio AFdwn of the upstream side air-fuel ratio sensor 40 becomes an air-fuel ratio which corresponds to the lean set air-fuel ratio. However, due to deviation of the output air-fuel ratio of the upstream side air-fuel ratio sensor 40, the actual air-fuel ratio of the exhaust gas becomes an air-fuel ratio which is leaner than the lean set air-fuel ratio, that is, an air-fuel ratio with a larger lean degree (see broken line in FIG. 9). Therefore, the oxygen storage amount OSA of the upstream side exhaust purification catalyst 20 rapidly increases.

On the other hand, the oxygen excess/deficiency OSA is calculated based on the output air-fuel ratio AFup of the upstream side air-fuel ratio sensor 40 (more accurately, the difference between the output air-fuel ratio AFup and control center air-fuel ratio AFR). However, as explained above, deviation occurs in the output air-fuel ratio AFup of the upstream side air-fuel ratio sensor 40. Therefore, the calculated oxygen excess/deficiency becomes a value smaller than the actual oxygen excess/deficiency (that is, small oxygen amount). As a result, the calculated cumulative oxygen excess/deficiency ΣOED becomes smaller than the actual value.

In the illustrated example, at the time $t_2$, the output air-fuel ratio AFdwn of the downstream side air-fuel ratio sensor 41 reaches the lean judged air-fuel ratio AFlean. For this reason, the average air-fuel ratio correction amount AFCav is switched to the rich set correction amount AFCrich. Therefore, the target average air-fuel ratio is made the rich air-fuel ratio.

At the time $t_2$ on, the target average air-fuel ratio is made the rich air-fuel ratio. However, at this time as well, the actual air-fuel ratio of the exhaust gas becomes an air-fuel ratio leaner than the rich set air-fuel ratio (see broken line in FIG. 9). As a result, the speed of decrease of the oxygen storage amount OSA of the upstream side exhaust purification catalyst 20 becomes slower.

At the time $t_3$, the output air-fuel ratio AFdwn of the downstream side air-fuel ratio sensor 41 reaches the rich judged air-fuel ratio AFrich. Due to this, as explained above, the average air-fuel ratio correction amount AFCav is switched to the lean set correction amount AFClean. Therefore, the target average air-fuel ratio is switched from the rich set air-fuel ratio to the lean set air-fuel ratio.

In this regard, in the present embodiment, as explained above, the cumulative oxygen excess/deficiency ΣOED is calculated from the time $t_1$ to the time $t_2$. Here, if referring to the time period from the time when the target average air-fuel ratio is switched to the lean air-fuel ratio (time $t_1$) to the time when the target average air-fuel ratio is again switched to the rich air-fuel ratio or the time when the output air-fuel ratio AFdwn of the downstream side air-fuel ratio sensor 41 reaches the lean judged air-fuel ratio AFlean (time $t_2$) as the "oxygen increase time period Tinc", in the present embodiment, the cumulative oxygen excess/deficiency ΣOED is calculated in the oxygen increase time period Tinc. In FIG. 9, the absolute value of the cumulative oxygen excess/deficiency ΣOED at the oxygen increase time period Tinc of the time $t_1$ to the time $t_2$ (lean oxygen amount cumulative value) is shown by $R_1$.

The cumulative oxygen excess/deficiency ΣOED ($R_1$) of this oxygen increase time period Tinc corresponds to the oxygen storage amount OSA at the time $t_2$. However, as explained above, the output air-fuel ratio AFup of the upstream side air-fuel ratio sensor 40 is used for estimation of the oxygen excess/deficiency. Deviation occurs in the output air-fuel ratio AFup. For this reason, in the example which is shown in FIG. 9, the cumulative oxygen excess/deficiency ΣOED at the oxygen increase time period Tinc of the time $t_1$ to the time $t_2$ is smaller than the value corresponding to the actual oxygen storage amount OSA at the time $t_2$.

In this regard, in the present embodiment, the cumulative oxygen excess/deficiency ΣOED is calculated at the time $t_2$ to the time $t_3$ as well. Here, if referring to the time period from the time when the target average air-fuel ratio is switched to the rich air-fuel ratio (time $t_3$) to the time when the target average air-fuel ratio is again switched to the lean air-fuel ratio or the time when the output air-fuel ratio AFdwn of the downstream side air-fuel ratio sensor 41 reaches the rich judged air-fuel ratio AFrich (time $t_3$) as the "oxygen decrease time period Tdec", in the present embodiment, the cumulative oxygen excess/deficiency ΣOED is calculated in the oxygen decrease time period Tdec. In FIG. 9, the absolute value of the cumulative oxygen excess/deficiency ΣOED at the oxygen decrease time period Tdec of the time $t_2$ to the time $t_3$ (rich oxygen amount cumulative value) is shown by $F_1$.

The cumulative oxygen excess/deficiency ΣOED ($F_1$) of this oxygen decrease time period Tdec corresponds to the total oxygen amount which is discharged from the upstream side exhaust purification catalyst 20 from the time $t_2$ to the time $t_3$. However, as explained above, deviation occurs in the output air-fuel ratio AFup of the upstream side air-fuel ratio sensor 40. For this reason, in the example which is shown in FIG. 9, the cumulative oxygen excess/deficiency ΣOED in the oxygen decrease time period Tdec of the time $t_2$ to the time $t_3$ becomes greater than the value corresponding to the total oxygen amount which is actually discharged from the upstream side exhaust purification catalyst 20 from the time $t_2$ to the time $t_3$.

In this regard, in the oxygen increase time period Tinc, oxygen is stored at the upstream side exhaust purification catalyst 20, while in the oxygen decrease time period Tdec, the stored oxygen is completely released. Therefore, the absolute value $R_1$ of the cumulative oxygen excess/deficiency at the oxygen increase time period Tinc and the absolute value $F_1$ of the cumulative oxygen excess/deficiency at the oxygen decrease time period Tdec must be basically the same value as each other. However, as explained above, when deviation occurs in the output air-fuel ratio AFup of the upstream side air-fuel ratio sensor 40, the cumulative values change in accordance with the deviation. As explained above, when the output air-fuel ratio of the upstream side air-fuel ratio sensor 40 deviates to the low side (rich side), the absolute value $F_1$ becomes greater than the absolute value $R_1$. Conversely, when the output air-fuel ratio of the upstream side air-fuel ratio sensor 40 deviates to the high side (lean side), the absolute value $F_1$ becomes smaller than the absolute value $R_1$. In addition, the difference ΔΣOED of the absolute value $R_1$ of the cumulative oxygen excess/deficiency at the oxygen increase time period Tinc and the absolute value $F_1$ of the cumulative oxygen excess/deficiency at the oxygen decrease time period Tdec ($=R_1-F_1$. below, also referred to as the "excess/deficiency error") expresses the extent of deviation at the output air-fuel ratio of the upstream side air-fuel ratio sensor 40. The larger the excess/deficiency errorΔΣOED, the greater the deviation in the output air-fuel ratio of the upstream side air-fuel ratio sensor 40.

Therefore, in the present embodiment, the control center air-fuel ratio AFR is corrected based on the excess/deficiency error ΔΣOED. In particular, in the present embodiment, the control center air-fuel ratio AFR is corrected so that the difference ΔΣOED of the absolute value $R_1$ of the cumulative oxygen excess/deficiency at the oxygen increase time period Tinc and the absolute value $F_1$ of the cumulative oxygen excess/deficiency at the oxygen decrease time period Tdec becomes smaller.

Specifically, in the present embodiment, the learning value sfbg is calculated by the following formula (2), and the control center air-fuel ratio AFR is corrected by the following formula (3).

$$sfbg(n)=sfbg(n-1)+k_1 \cdot \Delta\Sigma OED \tag{2}$$

$$AFR=AFRbase+sfbg(n) \tag{3}$$

Note that, in the above formula (2), "n" expresses the number of calculations or time. Therefore, sfbg(n) is the current calculated or current learning value. In addition, "$k_1$" in the above formula (2) is the gain which shows the extent by which the excess/deficiency error ΔΣOED is reflected in the control center air-fuel ratio AFR. The larger the value of the gain "$k_1$", the larger the correction amount of the control center air-fuel ratio AFR. In addition, in the above formula (3), the base control center air-fuel ratio AFRbase is a control center air-fuel ratio which is used as base, and is the stoichiometric air-fuel ratio in the present embodiment.

At the time $t_3$ of FIG. 9, as explained above, the learning value sfbg is calculated based on the absolute values $R_1$ and $F_1$. In particular, in the example shown in FIG. 9, the absolute value $F_1$ of the cumulative oxygen excess/deficiency at the oxygen decrease time period Tdec is larger than the absolute value $R_1$ of the cumulative oxygen excess/deficiency at the oxygen increase time period Tinc, and therefore at the time $t_3$, the learning value sfbg is decreased.

In this regard, the control center air-fuel ratio AFR is corrected based on the learning value sfbg by using the above formula (3). In the example shown in FIG. 9, since the learning value sfbg is a negative value, the control center air-fuel ratio AFR becomes a value smaller than the base control center air-fuel ratio AFRbase, that is, the rich side value. Due to this, the air-fuel ratio of the exhaust gas flowing into the upstream side exhaust purification catalyst 20 is corrected to the rich side.

As a result, after the time $t_3$, the deviation of the actual air-fuel ratio of the exhaust gas flowing into the upstream side exhaust purification catalyst 20 with respect to the target average air-fuel ratio becomes smaller than before the time $t_3$. Therefore, the difference between the broken line showing the actual air-fuel ratio and the one-dot chain line showing the target average air-fuel ratio after the time $t_3$ becomes smaller than the difference before the time $t_3$.

In addition, the excess/deficiency error $\Delta\Sigma OED$ which is calculated at the time $t_3$ becomes a calculated predetermined judgment value or more. For this reason, in the present embodiment, at the time $t_3$ on, the inter-cylinder air-fuel ratio control is made to stop. As a result, the air-fuel ratio correction amounts AFC become equal values which match the average air-fuel ratio correction amount AFCav in all of the cylinders. That is, in all of the cylinders, the target air-fuel ratios are made equal air-fuel ratios. Note that, the judgment value is made a value larger than zero and smaller than the maximum storable oxygen amount Cmax of the upstream side exhaust purification catalyst 20 at the time when not yet used.

Further, at the time $t_3$ on as well, an operation similar to the operation of the time $t_1$ to the time $t_2$ is performed. Therefore, at the time $t_4$, if the output air-fuel ratio AFdwn of the upstream side air-fuel ratio sensor 40 reaches the lean judged air-fuel ratio AFlean, the target average air-fuel ratio is switched from the lean set air-fuel ratio to the rich set air-fuel ratio. After this, at the time $t_5$, if the output air-fuel ratio AFdwn of the downstream side air-fuel ratio sensor 41 reaches the rich judged air-fuel ratio AFrich, again, the target average air-fuel ratio is switched to the lean set air-fuel ratio.

The time $t_3$ to the time $t_4$, as explained above, corresponds to the oxygen increase time period Tinc. Accordingly, the absolute value of the cumulative oxygen excess/deficiency $\Sigma OED$ during this is expressed by $R_2$ in FIG. 9. Further, the time $t_4$ to the time $t_5$, as explained above, corresponds to the oxygen decrease time period Tdec. Accordingly, the absolute value of the cumulative oxygen excess/deficiency $\Sigma OED$ during this is expressed by $F_2$ of FIG. 9. Further, based on the difference $\Delta\Sigma OED$ (=$R_2-F_2$) of these absolute values $R_2$, $F_2$, the above formula (2) is used to update the learning value sfbg. In the present embodiment, similar control is repeated at the time $t_5$ on as well. Due to this, updating of the learning value sfbg is repeated.

Further, at the time $t_5$, the calculated excess/deficiency error $\Delta\Sigma OED$ also becomes a predetermined judgment value or more. For this reason, in the present embodiment, at the time $t_5$ on, the state where the inter-cylinder air-fuel ratio control is made to stop is continued. After that, until the excess/deficiency error $\Delta\Sigma OED$ becomes smaller than the predetermined judgment value, the inter-cylinder air-fuel ratio control is maintained as stopped.

According to the present embodiment, by using normal learning control to update the learning value sfbg in this way, the output air-fuel ratio AFup of the upstream side air-fuel ratio sensor 40 gradually separates from the target average air-fuel ratio, but the actual air-fuel ratio of the exhaust gas which flows into the upstream side exhaust purification catalyst 20 gradually approaches the target average air-fuel ratio. Due to this, deviation in the output air-fuel ratio of the upstream side air-fuel ratio sensor 40 can be compensated for.

Further, in the present embodiment, when the excess/deficiency error $\Delta\Sigma OED$ is the judgment value or more, the inter-cylinder air-fuel ratio control is stopped. Here, when the excess/deficiency error $\Delta\Sigma OED$ is large, that is, when the deviation at the output air-fuel ratio AFup of the upstream side air-fuel ratio sensor 40 is large, if performing inter-cylinder air-fuel ratio control, depending on the cylinder, the combustion air-fuel ratio ends up excessively becoming a rich or lean air-fuel ratio. Further, as explained above, in inter-cylinder air-fuel ratio control, even when the target average air-fuel ratio is controlled to the lean air-fuel ratio, the target air-fuel ratio is made the rich air-fuel ratio in at least one cylinder. However, if the deviation at the output air-fuel ratio AFdwn of the upstream side air-fuel ratio sensor 40 is large, even if the target air-fuel ratio is made the rich air-fuel ratio at even one cylinder at this time, the actual air-fuel ratio of the exhaust gas does not become the rich air-fuel ratio but ends up becoming the stoichiometric air-fuel ratio or lean air-fuel ratio. As a result, even if performing inter-cylinder air-fuel ratio control, the above-mentioned such effect of making the $SO_X$ be stored at the front of the upstream side exhaust purification catalyst 20 ends up becoming unable to be sufficiently obtained.

As opposed to this, in the present embodiment, when the excess/deficiency error $\Delta\Sigma OED$ is the judgment value or more, the inter-cylinder air-fuel ratio control is stopped. For this reason, the combustion air-fuel ratio is prevented from ending up becoming an excessively rich or lean air-fuel ratio. Further, in the region where the effect of making $SO_X$ be stored in the front of the upstream side exhaust purification catalyst 20 cannot be sufficiently obtained, inter-cylinder air-fuel ratio control being unnecessarily performed is suppressed.

Note that, as explained above, the learning value sfbg is preferably updated based on the cumulative oxygen excess/deficiency $\Sigma OED$ at the oxygen increase time period Tinc and the cumulative oxygen excess/deficiency $\Sigma OED$ at the oxygen decrease time period Tdec which follows this oxygen increase time period Tinc. This is because, as explained above, the total amount of oxygen stored at the upstream side exhaust purification catalyst 20 in the oxygen increase time period Tinc and the total amount of oxygen released from the upstream side exhaust purification catalyst 20 in the directly following oxygen decrease time period Tdec, become equal.

In addition, in the above embodiment, the learning value sfbg is updated based on the cumulative oxygen excess/deficiency $\Sigma OED$ in a single oxygen increase time period Tinc and the cumulative oxygen excess/deficiency $\Sigma OED$ in a single oxygen decrease time period Tdec. However, the learning value sfbg may be updated based on the total value or average value of the cumulative oxygen excess/deficiency $\Sigma OED$ in a plurality of oxygen increase time periods Tinc and the total value or average value of the cumulative oxygen excess/deficiency ΣOED in a plurality of oxygen decrease time periods Tdec.

Further, in the above embodiment, the control center air-fuel ratio AFR is corrected based on the learning value sfbg. However, a parameter which is corrected based on the learning value sfbg may another parameter relating to the air-fuel ratio. The other parameter, for example, includes one of the amount of fuel fed to the inside of the combustion chamber 5, the output air-fuel ratio of the upstream side air-fuel ratio sensor 40, the average air-fuel ratio correction amount AFCav, etc.

<Large Deviation in Upstream Side Air-Fuel Ratio Sensor>

In the example shown in FIG. 8 and FIG. 9, deviation occurs in the output air-fuel ratio of the upstream side exhaust purification catalyst 20, but the extent thereof is not that large. Therefore, as will be understood from the broken line of FIG. 8 and FIG. 9, when the target average air-fuel ratio is set to the rich set air-fuel ratio, the actual air-fuel ratio of the exhaust gas becomes a rich air-fuel ratio while leaner than the rich set air-fuel ratio.

As opposed to this, if the deviation which occurs at the upstream side exhaust purification catalyst 20 becomes larger, even if the target average air-fuel ratio is set to the rich set air-fuel ratio, sometimes the actual air-fuel ratio of the exhaust gas becomes the stoichiometric air-fuel ratio. This state is shown in FIG. 10.

Figure 10:
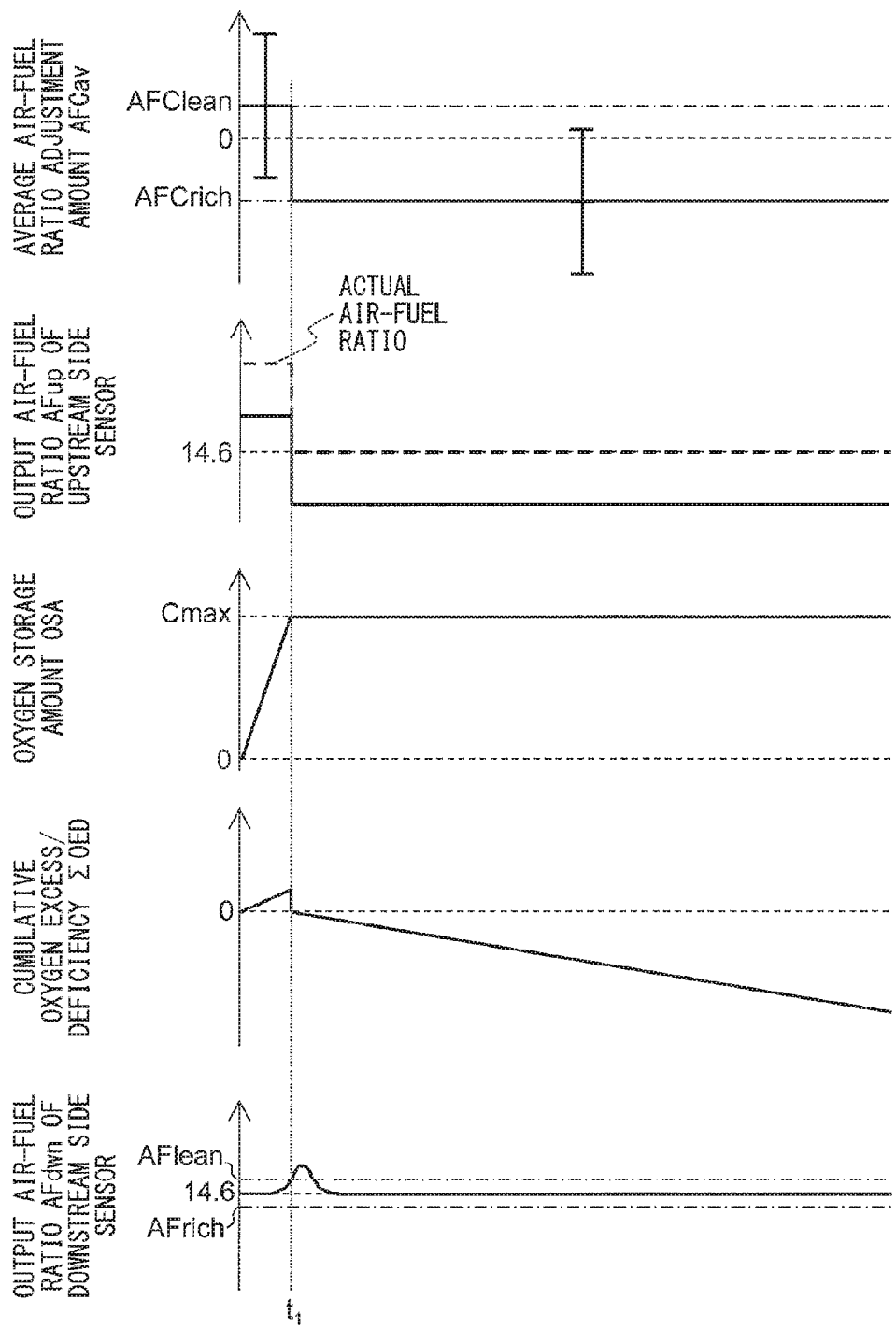
FIG. 10 is a time chart of an average air-fuel ratio correction amount etc. when large deviation occurs in an output air-fuel ratio of an upstream side air-fuel ratio sensor.

As shown in FIG. 10, in the state before the time $t_1$, the average air-fuel ratio correction amount AFCav is set to the lean set adjustment amount AFClean. Along with this, the output air-fuel ratio AFup of the upstream side air-fuel ratio sensor 40 becomes a lean set air-fuel ratio. However, since the output air-fuel ratio of the upstream side air-fuel ratio sensor 40 greatly deviates to the rich side, the actual air-fuel ratio of the exhaust gas becomes an air-fuel ratio which is leaner than the lean set air-fuel ratio (broken line in figure).

After that, if, at the time $t_1$, the output air-fuel ratio AFdwn of the downstream side air-fuel ratio sensor 41 reaches the lean judged air-fuel ratio AFlean, the average air-fuel ratio correction amount AFCav is switched to the rich set correction amount AFCrich. Along with this, the output air-fuel ratio AFup of the upstream side air-fuel ratio sensor 40 becomes an air-fuel ratio corresponding to the rich set air-fuel ratio. However, the output air-fuel ratio of the upstream side air-fuel ratio sensor 40 has greatly deviated to the rich side, therefore the actual air-fuel ratio of the exhaust gas becomes the stoichiometric air-fuel ratio (broken line in the figure).

As a result, the oxygen storage amount OSA of the upstream side exhaust purification catalyst 20 is maintained at a constant value without changing. For this reason, even if a long time elapses from when switching the average air-fuel ratio correction amount AFCav to the rich set correction amount AFCrich, the upstream side exhaust purification catalyst 20 will not discharge unburned gas, therefore the output air-fuel ratio AFdwn of the downstream side air-fuel ratio sensor 41 is maintained at substantially the stoichiometric air-fuel ratio as is. As explained above, the average air-fuel ratio correction amount AFCav is switched from the rich set correction amount AFCrich to the lean set correction amount AFClean at the time the output air-fuel ratio AFdwn of the downstream side air-fuel ratio sensor 41 reaches the rich judged air-fuel ratio AFrich. However, in the example which is shown in FIG. 10, the output air-fuel ratio AFdwn of the downstream side air-fuel ratio sensor 41 is maintained as the stoichiometric air-fuel ratio, therefore the average air-fuel ratio correction amount AFCav is maintained at the rich set correction amount AFCrich over a long time. Here, the above-mentioned normal learning control is predicated on the average air-fuel ratio correction amount AFCav being alternately switched between the rich set correction amount AFCrich and the lean set correction amount AFClean. Therefore, if the output air-fuel ratio of the upstream side air-fuel ratio sensor 40 greatly deviates, the average air-fuel ratio correction amount AFCav is not switched. Therefore, the above-mentioned normal learning control cannot be performed.

Figure 11:
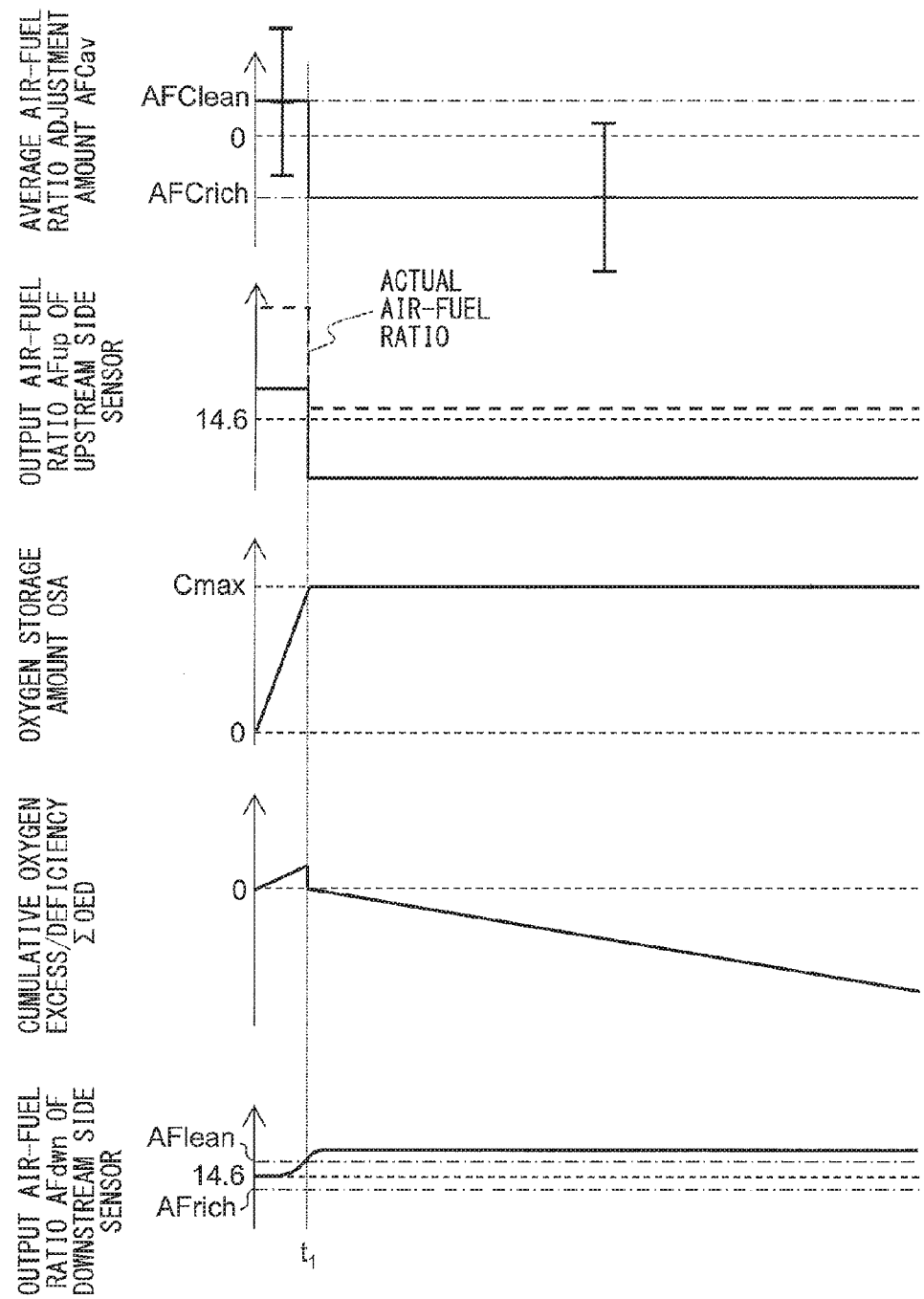
FIG. 11 is a time chart of an average air-fuel ratio correction amount etc. when large deviation occurs in an output air-fuel ratio of an upstream side air-fuel ratio sensor.

FIG. 11 is a view, similar to FIG. 10, which shows the case where the output air-fuel ratio of the upstream side air-fuel ratio sensor 40 deviates extremely largely to the rich side. In the example which is shown in FIG. 11, in the same way as the example which is shown in FIG. 10, at the time $t_1$, the air-fuel ratio correction amount AFC is switched to the rich set correction amount AFCrich. That is, at the time $t_1$, the target average air-fuel ratio is set to the rich set air-fuel ratio. However, due to the deviation of the output air-fuel ratio of the upstream side air-fuel ratio sensor 40, the actual air-fuel ratio of the exhaust gas becomes the lean air-fuel ratio (broken line in the figure).

As a result, regardless of the average air-fuel ratio correction amount AFCav being set to the rich set correction amount AFCrich, exhaust gas of a lean air-fuel ratio flows into the upstream side exhaust purification catalyst 20. The oxygen storage amount OSA of the upstream side exhaust purification catalyst 20 already reaches the maximum storable oxygen amount Cmax, therefore the oxygen and $NO_X$ which were contained in the exhaust gas which flowed in from the upstream side exhaust purification catalyst 20 flow out as they are. As a result, the output air-fuel ratio AFdwn of the downstream side air-fuel ratio sensor 41 is maintained at the lean judged air-fuel ratio AFlean or more. Therefore, in this case, the average air-fuel ratio correction amount AFCav is not switched from the rich set correction amount AFCrich to the lean set correction amount AFClean and therefore the above-mentioned normal learning control cannot be performed.

<Stuck Learning Control>

Therefore, in the present embodiment, even if the deviation of the output air-fuel ratio of the upstream side air-fuel ratio sensor 40 is large, to compensate that deviation, in addition to the above-mentioned normal learning control, stoichiometric air-fuel ratio stuck learning control, lean stuck learning control, and rich stuck learning control are performed.

<Stoichiometric Air-Fuel Ratio Stuck Learning>

First, the stoichiometric air-fuel ratio stuck learning control will be explained. The stoichiometric air-fuel ratio stuck learning control is learning control which is performed when the air-fuel ratio detected by the downstream side air-fuel ratio sensor 41 is stuck at the stoichiometric air-fuel ratio as shown in the example shown in FIG. 10.

In this regard, the region between the rich judged air-fuel ratio AFrich and the lean judged air-fuel ratio AFlean will be referred to as the "middle region M". This middle region M corresponds to a "stoichiometric air-fuel ratio proximity region" which is the air-fuel ratio region between the rich judged air-fuel ratio and the lean judged air-fuel ratio. In stoichiometric air-fuel ratio-stuck learning control, after the average air-fuel ratio correction amount AFCav is switched to the rich set adjustment amount AFCrich, that is, after the target average air-fuel ratio is switched to the rich set air-fuel ratio, it is judged if the output air-fuel ratio AFdwn of the downstream side air-fuel ratio sensor 41 has been maintained in the middle region M over a predetermined stoichiometric air-fuel ratio maintenance judged time or more or over the time period in which the cumulative oxygen excess/deficiency becomes a predetermined value or more. Further, if it has been maintained in the middle region M for the stoichiometric air-fuel ratio maintenance judged time or more, the learning value sfbg is decreased so that the air-fuel ratio of the exhaust gas flowing into the upstream side exhaust purification catalyst 20 changes to the rich side.

Figure 12:
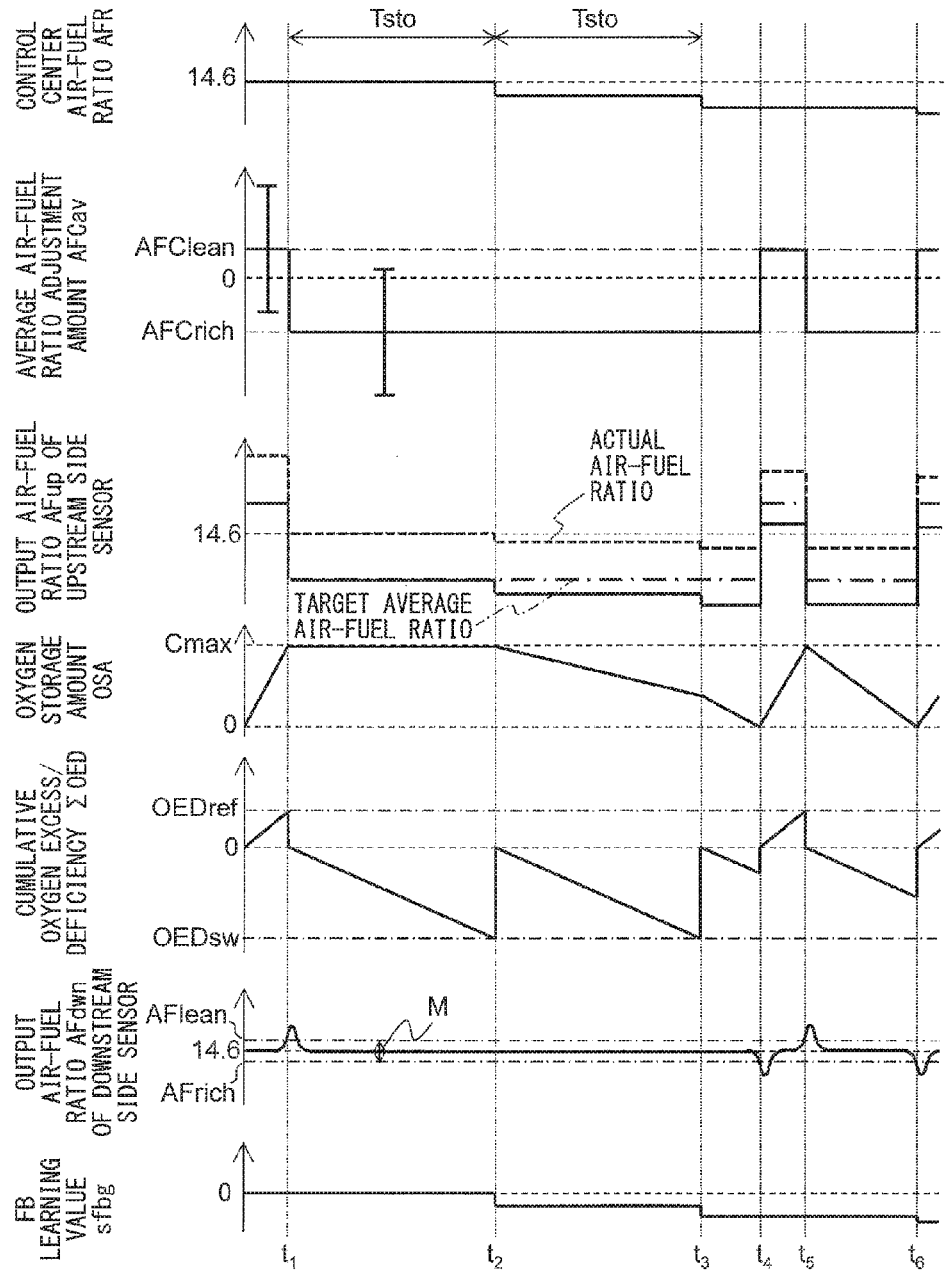
FIG. 12 is a time chart of an air-fuel ratio correction amount etc. when performing stoichiometric air-fuel ratio stuck learning.

In addition, in the present embodiment, when the target average air-fuel ratio is set to either air-fuel ratio of the rich air-fuel ratio or lean air-fuel ratio, if the air-fuel ratio which is detected by the downstream side air-fuel ratio sensor is maintained in the stoichiometric air-fuel ratio vicinity air-fuel ratio region over the stoichiometric air-fuel ratio maintenance judgment time or more or over the time period in which the cumulative oxygen excess/deficiency becomes a predetermined value or more, inter-cylinder air-fuel ratio control is not performed and the target air-fuel ratios of all cylinders are controlled so that the target air-fuel ratios become equal at all of the cylinders. FIG. 12 shows this state.

FIG. 12 is a view similar to FIG. 9 which shows a time chart of the average air-fuel ratio correction amount AFCav, etc. FIG. 12, similarly to FIG. 10, shows the case where the output air-fuel ratio AFup of the upstream side air-fuel ratio sensor 40 greatly deviates to the low side (rich side).

In the illustrated example, similarly to FIG. 10, before the time $t_1$, the average air-fuel ratio correction amount AFCav is set to the lean set adjustment amount AFClean. After that, if, at the time $t_1$, the output air-fuel ratio AFdwn of the downstream side air-fuel ratio sensor 41 reaches the lean judged air-fuel ratio AFlean, the average air-fuel ratio correction amount AFCav is switched to the rich set correction amount AFCrich. However, since the output air-fuel ratio AFup of the upstream side air-fuel ratio sensor 40 greatly deviates to the rich side, similarly to the example shown in FIG. 10, the actual air-fuel ratio of the exhaust gas is substantially the stoichiometric air-fuel ratio. Therefore, after the time $t_1$, the oxygen storage amount OSA of the upstream side exhaust purification catalyst 20 is maintained at a constant value. As a result, the output air-fuel ratio AFdwn of the downstream side air-fuel ratio sensor 41 is maintained near the stoichiometric air-fuel ratio and accordingly is maintained in the middle region M, for a long time period.

Therefore, in the present embodiment, after the average air-fuel ratio correction amount AFCav is switched to the rich set adjustment amount AFCrich, if the output air-fuel ratio AFdwn of the downstream side air-fuel ratio sensor 41 has been maintained in the middle region M over a predetermined stoichiometric air-fuel ratio maintenance judged time Tsto or more (the time $t_2$), the control center air-fuel ratio AFR is corrected. In particular, in the present embodiment, the learning value sfbg is updated so that the air-fuel ratio of the exhaust gas flowing into the upstream side exhaust purification catalyst 20 changes to the rich side. In addition, in the present embodiment, in such a case, inter-cylinder air-fuel ratio control is not performed and the target air-fuel ratios of all cylinders are controlled so that the target air-fuel ratios become equal at all of the cylinders.

Specifically, in the present embodiment, the learning value sfbg is calculated by the following formula (4), and the control center air-fuel ratio AFR is corrected by the above formula (3).

$$sfbg(n)=sfbg(n-1)+k_2 \cdot AFCrich \qquad (4)$$

Note that in the above formula (4), $k_2$ is the gain which shows the extent of correction of the control center air-fuel ratio AFR ($0<k_2 \leq 1$). The larger the value of the gain $k_2$, the larger the correction amount of the control center air-fuel ratio AFR becomes.

In this regard, as explained above, after the average air-fuel ratio correction amount AFCav is switched, if the output air-fuel ratio AFdwn of the downstream side air-fuel ratio sensor 41 is maintained in the middle region M for a long period of time, the actual air-fuel ratio of the exhaust gas becomes a value close to substantially the stoichiometric air-fuel ratio. Therefore, the deviation at the upstream side air-fuel ratio sensor 40 becomes the same extent as the difference between the control center air-fuel ratio (stoichiometric air-fuel ratio) and the target average air-fuel ratio (in this case, the rich set air-fuel ratio). In the present embodiment, as shown in the above formula (4), the learning value sfbg is updated based on the average air-fuel ratio correction amount AFCav corresponding to the difference between the control center air-fuel ratio and the target average air-fuel ratio. Due to this, it is possible to more suitably compensate for deviation in the output air-fuel ratio of the upstream side air-fuel ratio sensor 40.

In the example shown in FIG. 12, the average air-fuel ratio correction amount AFCav is set to the rich set adjustment amount AFCrich until the time $t_2$ after a lapse of the stoichiometric air-fuel ratio maintenance judged time Tsto from the time $t_1$. Therefore, if using formula (4), at the time $t_2$, the learning value sfbg is decreased. As a result, the actual air-fuel ratio of the exhaust gas flowing into the upstream side exhaust purification catalyst 20 changes to the rich side. Due to this, after the time $t_2$, the deviation of the actual air-fuel ratio of the exhaust gas flowing into the upstream side exhaust purification catalyst 20 from the target average air-fuel ratio becomes smaller compared with before the time $t_2$. Therefore, after the time $t_2$, the difference between the broken line which shows the actual air-fuel ratio and the one-dot chain line which shows the target average air-fuel ratio becomes smaller than the difference before the time $t_2$.

Further, according to the present embodiment, the inter-cylinder air-fuel ratio control is made to stop at the time $t_2$ after the elapse of the stoichiometric air-fuel ratio maintenance judgment time Tsto from the time $t_1$. As a result, the air-fuel ratio correction amounts AFC become equal values matching with the average air-fuel ratio correction amount AFCav at all of the cylinders. That is, the target air-fuel ratios are made equal air-fuel ratios at all of the cylinders.

In the example shown in FIG. 12, the gain $k_2$ is set to a relatively small value. For this reason, even if the learning value sfbg is updated at the time $t_2$, deviation of the actual air-fuel ratio of the exhaust gas flowing into the upstream side exhaust purification catalyst 20, from the target average air-fuel ratio, remains. Therefore, the actual air-fuel ratio of the exhaust gas becomes an air-fuel ratio which is leaner than the rich set air-fuel ratio, that is, an air-fuel ratio with a small rich degree (see broken line of FIG. 12). For this reason, the decreasing speed of the oxygen storage amount OSA of the upstream side exhaust purification catalyst 20 is slow.

As a result, from the time $t_2$ to the time $t_3$ when the stoichiometric air-fuel ratio maintenance judged time Tsto elapses, the output air-fuel ratio AFdwn of the downstream side air-fuel ratio sensor 41 is maintained close to the stoichiometric air-fuel ratio, and accordingly is maintained in the middle region M. Therefore, in the example shown in FIG. 12, even at the time $t_5$, the learning value sfbg is updated by using formula (4). Further, after the time $t_3$, the state where the inter-cylinder air-fuel ratio control is made to stop is continued.

In the example shown in FIG. 12, after that, at the time $t_4$, the output air-fuel ratio AFdwn of the downstream side air-fuel ratio sensor 41 becomes the rich judged air-fuel ratio AFrich or less. After the output air-fuel ratio AFdwn becomes the rich judged air-fuel ratio AFrich or less in this way, as explained above, the average air-fuel ratio correction amount AFCav is alternately set to the lean set adjustment amount AFClean and the rich set adjustment amount AFCrich. Along with this, the above-mentioned normal learning control is performed. Further, until the excess/deficiency error ΔΣOED becomes smaller than the predetermined judgment value in the normal learning control, the inter-cylinder air-fuel ratio control is maintained as stopped.

By updating the learning value sfbg by the stoichiometric air-fuel ratio stuck learning control in this way, the learning value can be updated even when the deviation of the output air-fuel ratio AFup of the upstream side air-fuel ratio sensor 40 is large. Due to this, it is possible to compensate deviation at the output air-fuel ratio of the upstream side air-fuel ratio sensor 40.

<Modification of Stoichiometric Air-Fuel Ratio Stuck Learning>

Note that in the above embodiment, the stoichiometric air-fuel ratio maintenance judged time Tsto is a predetermined time. In this case, the stoichiometric air-fuel ratio maintenance judged time is set to not less than the usual time taken from when switching the target average air-fuel ratio to the rich air-fuel ratio to when the absolute value of the cumulative oxygen excess/deficiency ΣOED reaches the maximum storable oxygen amount of the upstream side exhaust purification catalyst 20 at the time of unused product. Specifically, it is preferably set to two to four times that time.

Alternatively, the stoichiometric air-fuel ratio maintenance judged time Tsto may be changed in accordance with other parameters, such as the cumulative oxygen excess/deficiency ΣOED after the target average air-fuel ratio is switched to the rich air-fuel ratio. Specifically, for example, the greater the cumulative oxygen excess/deficiency ΣOED, the shorter the stoichiometric air-fuel ratio maintenance judged time Tsto is set. Due to this, it is also possible to update the above-mentioned learning value sfbg when the cumulative oxygen excess/deficiency ΣOED after the target average air-fuel ratio is switched to the rich air-fuel ratio is maintained in the middle region M becomes a predetermined amount. Further, in this case, the above predetermined amount in the cumulative oxygen excess/deficiency ΣOED has to be set to not less than the maximum storable oxygen amount of the upstream side exhaust purification catalyst 20 at the time of a new product. Specifically, an amount of about two to four times the maximum storable oxygen amount is preferable.

Further, in the above-mentioned stoichiometric air-fuel ratio stuck learning control, the learning value is updated if the output air-fuel ratio of the downstream side air-fuel ratio sensor 41 is maintained in the air-fuel ratio region close to stoichiometric air-fuel ratio for the stoichiometric air-fuel ratio judged time Tsto or more. However, stoichiometric air-fuel ratio stuck learning may be performed based on a parameter other than time.

For example, when the output air-fuel ratio of the downstream side air-fuel ratio sensor 41 is stuck to the stoichiometric air-fuel ratio, the cumulative oxygen excess/deficiency becomes greater after the target air-fuel ratio is switched between the lean air-fuel ratio and the rich air-fuel ratio. Therefore, it is also possible to update the learning value in the above-mentioned way if the absolute value of the cumulative oxygen excess/deficiency after switching the target air-fuel ratio or the absolute value of the cumulative oxygen excess/deficiency in the period when the output air-fuel ratio AFdwn of the downstream side air-fuel ratio sensor 41 is maintained in the middle region M becomes larger than a predetermined value or more.

Furthermore, the example shown in FIG. 12 shows the case where the target air-fuel ratio is switched to the rich air-fuel ratio, and then the output air-fuel ratio AFdwn of the downstream side air-fuel ratio sensor 41 is maintained in the air-fuel ratio region close to stoichiometric air-fuel ratio, for the stoichiometric air-fuel ratio judged time Tsto or more. However, similar control is possible even where the target air-fuel ratio is switched to the lean air-fuel ratio, and then the output air-fuel ratio AFdwn of the downstream side air-fuel ratio sensor 41 is maintained in the air-fuel ratio region close to the stoichiometric air-fuel ratio, for the stoichiometric air-fuel ratio judged time Tsto or more.

<Rich/Lean Stuck Learning>

Next, lean stuck learning control will be explained. The lean stuck learning control is learning control which is performed where, as shown in the example of FIG. 11, although the target average air-fuel ratio is set to the rich air-fuel ratio, the air-fuel ratio detected by the downstream side air-fuel ratio sensor 41 is stuck at the lean air-fuel ratio.

Figure 13:
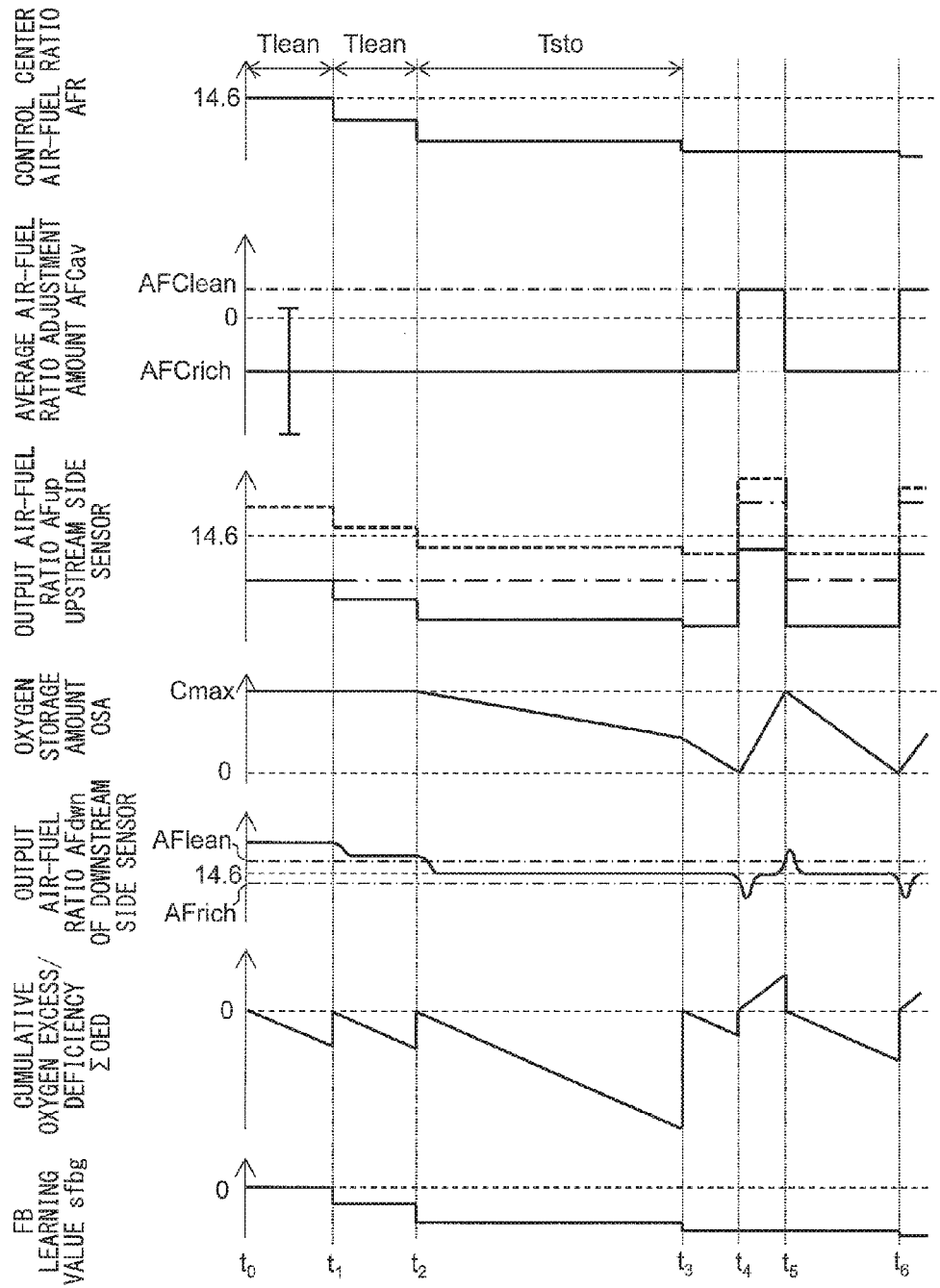
FIG. 13 is a time chart of an air-fuel ratio correction amount etc. when performing lean stuck learning etc.

In lean stuck learning control, it is judged if the output air-fuel ratio AFdwn of the downstream side air-fuel ratio sensor 41 has been maintained at the lean air-fuel ratio for a predetermined lean air-fuel ratio judged time or more after the average air-fuel ratio correction amount AFCav is switched to the rich set adjustment amount AFCrich, that is, the target average air-fuel ratio is switched to the rich set air-fuel ratio. Further, when it is maintained at the lean air-fuel ratio for the lean air-fuel ratio maintenance judged time or more, the learning value sfbg is decreased so that the air-fuel ratio of the exhaust gas flowing into the upstream side exhaust purification catalyst 20 changes to the rich side. FIG. 13 shows this state.

FIG. 13 is a view, similar to FIG. 9, which shows a time chart of the average air-fuel ratio correction amount AFCav, etc. FIG. 13, like FIG. 9, shows the case where the output air-fuel ratio AFup of the upstream side air-fuel ratio sensor 40 deviates extremely greatly to the low side (rich side).

In the illustrated example, at the time $t_0$, the average air-fuel ratio correction amount AFCav is switched from the lean set adjustment amount AFClean to the rich set adjustment amount AFCrich. However, since the output air-fuel ratio of the upstream side air-fuel ratio sensor 40 deviates extremely greatly to the rich side, similarly to the example shown in FIG. 9, the actual air-fuel ratio of the exhaust gas becomes the lean air-fuel ratio (see broken line of FIG. 13). Therefore, after the time $t_0$, the output air-fuel ratio AFdwn of the downstream side air-fuel ratio sensor 41 is maintained at the lean air-fuel ratio.

Therefore, in the present embodiment, when the output air-fuel ratio AFdwn of the downstream side air-fuel ratio sensor 41 has been maintained at the lean air-fuel ratio for the predetermined lean air-fuel maintenance ratio judged time Tlean or more after the average air-fuel ratio correction amount AFCav is set to the rich set adjustment amount AFCrich, the control center air-fuel ratio AFR is corrected. In particular, in the present embodiment, the learning value sfbg is corrected so that the air-fuel ratio of the exhaust gas flowing into the upstream side exhaust purification catalyst 20 changes to the rich side.

Specifically, in the present embodiment, the learning value sfbg is calculated by using the following formula (5) and the control center air-fuel ratio AFR is corrected based on the learning value sfbg by using the above formula (3).

$$sfbg(n)=sfbg(n-1)+k_3 \cdot (\text{AFCrich}-(\text{AFdwn}-14.6)) \quad (5)$$

Note that in the above formula (5), $k_3$ is the gain which expresses the extent of correction of the control center air-fuel ratio AFR ($0<k_3 \leq 1$). The larger the value of the gain $k_3$, the larger the correction amount of the control center air-fuel ratio AFR.

In this regard, in the example shown in FIG. 13, when the average air-fuel ratio correction amount AFCav is set at the rich set adjustment amount AFCrich, the output air-fuel ratio AFdwn of the downstream side air-fuel ratio sensor 41 is maintained at the lean air-fuel ratio. In this case, the deviation at the upstream side air-fuel ratio sensor 40 corresponds to the difference between the target average air-fuel ratio and the output air-fuel ratio of the downstream side air-fuel ratio sensor 41. If breaking this down, the deviation at the upstream side air-fuel ratio sensor 40 can be said to be of the same extent as the difference between the target average air-fuel ratio and the stoichiometric air-fuel ratio (corresponding to rich set adjustment amount AFCrich) and the difference between the stoichiometric air-fuel ratio and the output air-fuel ratio of the downstream side air-fuel ratio sensor 41 added together. Therefore, in the present embodiment, as shown in the above formula (5), the learning value sfbg is updated based on the value acquired by adding the rich set adjustment amount AFCrich to the difference between the output air-fuel ratio of the downstream side air-fuel ratio sensor 41 and the stoichiometric air-fuel ratio. In particular, in the above-mentioned stoichiometric air-fuel ratio stuck learning, the learning value is corrected by an amount corresponding to the rich set adjustment amount AFCrich, while in lean stuck learning, the learning value is corrected by this amount plus a value corresponding to the output air-fuel ratio AFdwn of the downstream side air-fuel ratio sensor 41. Further, the gain $k_3$ is set to a similar extent to the gain $k_2$. For this reason, the correction amount in the lean stuck learning is larger than the correction amount in the stoichiometric air-fuel ratio stuck learning.

In the example shown in FIG. 13, if using formula (5), the learning value sfbg is decreased at the time $t_1$. As a result, the actual air-fuel ratio of the exhaust gas flowing into the upstream side exhaust purification catalyst 20 changes to the rich side. Due to this, after the time $t_1$, the deviation of the actual air-fuel ratio of the exhaust gas flowing into the upstream side exhaust purification catalyst 20 from the target average air-fuel ratio becomes smaller, compared with before the time $t_1$. Therefore, after the time $t_1$, the difference between the broken line which shows the actual air-fuel ratio and the one-dot chain line which shows the target average air-fuel ratio becomes smaller than the difference before the time $t_1$.

Further, in the present embodiment, inter-cylinder air-fuel ratio control is made to stop at the time $t_2$ after the elapse of the lean air-fuel ratio maintenance judgment time Tlean from the time $t_1$. As a result, the air-fuel ratio correction amounts AFC become equal values which match the average air-fuel ratio correction amount AFCav at all cylinders. That is, the target air-fuel ratios are made equal air-fuel ratios at all of the cylinders.

In FIG. 13, an example where the gain $k_3$ is made a relatively small value will be shown. For this reason, even if updating the learning value sfbg at the time $t_1$, deviation at the output air-fuel ratio of the upstream side air-fuel ratio sensor 40 still remains. In particular, in the illustrated example, at the time $t_1$ on as well, the actual air-fuel ratio of the exhaust gas remains as a lean air-fuel ratio. As a result, the output air-fuel ratio AFdwn of the downstream side air-fuel ratio sensor is maintained at the lean air-fuel ratio from the time $t_1$ over the lean air-fuel ratio maintenance judgment time Tlean. For this reason, in the illustrated example, even at the time $t_2$, lean stuck learning is used to correct the learning value sfbg using the above formula (5). Further, at the time $t_2$ on as well, the state where the inter-cylinder air-fuel ratio control is made to stop is continued.

If the learning value sfbg is corrected at the time $t_2$, the deviation of the actual air-fuel ratio of the exhaust gas which flows into the upstream side exhaust purification catalyst 20 from the target average air-fuel ratio becomes smaller. Due to this, in the illustrated example, at the time $t_2$ on, the actual air-fuel ratio of the exhaust gas becomes slightly richer than the stoichiometric air-fuel ratio. Along with this, the output air-fuel ratio AFdwn of the downstream side air-fuel ratio sensor 41 changes from the lean air-fuel ratio to substantially the stoichiometric air-fuel ratio. In particular, in the example which is shown in FIG. 13, the output air-fuel ratio AFdwn of the downstream side air-fuel ratio sensor 41 is maintained at substantially the stoichiometric air-fuel ratio, that is, in the intermediate region M, over the stoichiometric air-fuel ratio maintenance judgment time Tsto from the time $t_2$ to the time $t_3$. For this reason, at the time $t_3$, stoichiometric air-fuel ratio stuck learning is used to correct the learning value sfbg using the above-mentioned formula (4). Further, the inter-cylinder air-fuel ratio control is maintained as stopped so that the excess/deficiency error ΔΣOED becomes smaller than the predetermined judgment value in normal learning control.

By updating the learning value sfbg in this way by lean stuck learning control, it is possible to update the learning value even when the deviation of the output air-fuel ratio AFup of the upstream side air-fuel ratio sensor 40 is extremely large. Due to this, it is possible to reduce the deviation in the output air-fuel ratio of the upstream side air-fuel ratio sensor 40.

Note that, in the above embodiment, the lean air-fuel ratio maintenance judged time Tlean is a predetermined time. In this case, the lean air-fuel ratio maintenance judged time Tlean is set to not less than the delayed response time of the downstream side air-fuel ratio sensor which is usually taken from when switching the target average air-fuel ratio to the rich air-fuel ratio to when, according to this, the output air-fuel ratio of the downstream side air-fuel ratio sensor 41 changes. Specifically, it is preferably set to two times to four times that time. Further, the lean air-fuel ratio maintenance judged time Tlean is shorter than the time usually taken from when switching the target average air-fuel ratio to the rich air-fuel ratio to when the absolute value of the cumulative oxygen excess/deficiency ΣOED reaches the maximum storable oxygen amount of the upstream side exhaust purification catalyst 20 at the time of non-use. Therefore, the lean air-fuel ratio maintenance judged time Tlean is set shorter than the above-mentioned stoichiometric air-fuel ratio maintenance judged time Tsto.

Alternatively, the lean air-fuel ratio maintenance judged time Tlean may be changed in accordance with another parameter, such as the cumulative exhaust gas flow amount from when switching the target average air-fuel ratio to the rich air-fuel ratio. Specifically, for example, the larger the cumulative exhaust gas flow amount ΣGe, the shorter the lean air-fuel ratio maintenance judged time Tlean is set. Due to this, when the cumulative exhaust gas flow, from when switching the target air-fuel ratio to the rich air-fuel ratio, becomes a given amount (for example, see ΣGesw of FIG. 13), the above-mentioned learning value sfbg can be updated. Further, in this case, the predetermined amount has to be not less than the total amount of flow of the exhaust gas which is required from when switching the target average air-fuel ratio to when the output air-fuel ratio of the downstream side air-fuel ratio sensor 41 changes according to the switch. Specifically, it is preferably set to an amount of 2 to 4 times that total flow.

Next, rich stuck learning control will be explained. The rich stuck learning control is control similar to the lean stuck learning control, and is learning control which is performed when although the target average air-fuel ratio is set to the lean air-fuel ratio, the air-fuel ratio detected by the downstream side air-fuel ratio sensor 41 is stuck at the rich air-fuel ratio. In rich stuck learning control, from when switching the average air-fuel ratio correction amount AFCav to the lean set adjustment amount AFClean, that is, from when switching the target average air-fuel ratio to the lean set air-fuel ratio, it is judged if the output air-fuel ratio AFdwn of the downstream side air-fuel ratio sensor 41 is maintained at the rich air-fuel ratio for a predetermined rich air-fuel ratio maintenance judged time (similar to lean air-fuel ratio maintenance judged time) or more. Further, when maintained at the rich air-fuel ratio for the rich air-fuel ratio maintenance judged time or more, the learning value sfbg is increased so that the air-fuel ratio of the exhaust gas flowing into the upstream side exhaust purification catalyst 20 changes to the lean side. In addition, in the present embodiment, when maintained at the rich air-fuel ratio for the rich air-fuel ratio maintenance judged time or more, inter-cylinder air-fuel ratio control is not performed and the target air-fuel ratios of all cylinders are controlled so that the target air-fuel ratios become equal at all of the cylinders. That is, in rich stuck learning control, control is performed with rich and lean reversed from the above lean stuck learning control.

<Explanation of Specific Control>

Next, referring to FIG. 14 to FIG. 19, the control device of the exhaust purification system in the above embodiment will be specifically explained. The control device in the present embodiment is configured so as to include the functional blocks A1 to A10 of the block diagram of FIG. 14. Below, while referring to FIG. 14, the different functional blocks will be explained. The operations of these functional blocks A1 to A10 are basically executed by the ECU 31 which functions as a control device for controlling the exhaust purification system of the internal combustion engine.

<Calculation of Fuel Injection Amount>

First, calculation of the fuel injection amount will be explained. In calculating the fuel injection amount, the cylinder intake air calculating unit A1, basic fuel injection calculating unit A2, and fuel injection calculating unit A3 are used.

The cylinder intake air calculating unit A1 calculates the intake air amount Mc to each cylinder based on the intake air flow rate Ga, engine speed NE, and map or calculation formula which is stored in the ROM 34 of the ECU 31. The intake air flow rate Ga is measured by the air flow meter 39, and the engine speed NE is calculated based on the output of the crank angle sensor 44.

The basic fuel injection calculating unit A2 divides the cylinder intake air amount Mc which was calculated by the cylinder intake air calculating unit A1 by the target air-fuel ratio AFT to calculate the basic fuel injection amount Qbase (Qbase=Mc/AFT). The target air-fuel ratio AFT is calculated by the later explained target air-fuel ratio setting unit A8.

The fuel injection calculating unit A3 adds the later explained F/B correction amount DQi to the basic fuel injection amount Qbase which was calculated by the basic fuel injection calculating unit A2 to calculate the fuel injection amount Qi (Qi=Qbase+DQi). An injection is instructed to the fuel injector 11 so that fuel of the thus calculated fuel injection amount Qi is injected from the fuel injector 11.

<Calculation of Target Air Fuel Ratio>

Next, calculation of the target air-fuel ratio will be explained. In calculating the target air-fuel ratio, oxygen excess/deficiency calculating unit A4, air-fuel ratio adjustment amount calculating unit A5, learning value calculating unit A6, control center air-fuel ratio calculating unit A7, and target air-fuel ratio setting unit A8 are used.

The oxygen excess/deficiency calculating unit A4 calculates the cumulative oxygen excess/deficiency ΣOED based on the fuel injection amount Qi which was calculated by the fuel injection calculating unit A3 and the output air-fuel ratio AFup of the upstream side air-fuel ratio sensor 40. For example, the oxygen excess/deficiency calculating unit A4 multiplies a difference between the output air-fuel ratio of the upstream side air-fuel ratio sensor 40 and the control center air-fuel ratio by the fuel injection amount Qi based on the above formula (1) in order to calculate the cumulative oxygen excess/deficiency ΣOED.

The air-fuel ratio adjustment amount calculating unit AS calculates the average air-fuel ratio correction amount AFCav and the air-fuel ratio adjustment amount AFC of the cylinders, based on the output air-fuel ratio AFdwn of the downstream side air-fuel ratio sensor 41. Specifically, the average air-fuel ratio correction amount AFCav and the air-fuel ratio adjustment amount AFC of the cylinders are calculated based on the flow chart shown in FIG. 15.

The learning value calculating unit A6 calculates the learning value sfbg, based on the output air-fuel ratio AFdwn of the downstream side air-fuel ratio sensor 41, the cumulative oxygen excess/deficiency ΣOED which was calculated by the oxygen excess/deficiency calculating unit A4, etc. Specifically, the learning value sfbg is calculated based on the flow chart of the normal learning control shown in FIGS. 16 and the flow chart of the normal learning control stuck learning control shown in FIGS. 17. The thus calculated learning value sfbg is stored in a storage medium among RAM 33 of the ECU31 which is not erased even if an ignition key of the vehicle which mounts the internal combustion engine is turned on.

The control center air-fuel ratio calculating unit A7 calculates the control center air-fuel ratio AFR, based on the basic control center air-fuel ratio AFRbase (for example, the stoichiometric air-fuel ratio) and the learning value sfbg which was calculated by the learning value calculating unit A6. Specifically, the control center air-fuel ratio AFR is calculated by adding the learning value sfbg to the basic control center air-fuel ratio AFRbase, based on the above formula (3).

The target air-fuel ratio setting unit A8 adds the average air-fuel ratio correction amount AFCav and the calculated air-fuel ratio adjustment amount AFC of the cylinders which were calculated by the target air-fuel ratio correction calculating unit A5 to the control center air-fuel ratio AFR which was calculated by the control center air-fuel ratio calculating unit A7 in order to calculate the target average air-fuel ratio AFTav and the target air-fuel ratio AFT of the cylinders. The thus calculated target air-fuel ratio AFT is input to the basic fuel injection calculating unit A2 and the thus calculated target average air-fuel ratio AFTav is input to later explained air-fuel ratio deviation calculating unit A9.

<Calculation of F/B Correction Amount>

Next, calculation of the F/B correction amount based on the output air-fuel ratio AFup of the upstream side air-fuel ratio sensor 40 will be explained. In calculating the F/B correction amount, air-fuel ratio deviation calculating unit A9, and F/B correction calculating unit A10 are used.

The air-fuel ratio deviation calculating unit A9 subtracts the target average air-fuel ratio AFTav which was calculated by the target air-fuel ratio setting unit A8 from the output air-fuel ratio AFup of the upstream side air-fuel ratio sensor 40 to calculate the air-fuel ratio deviation DAF (DAF=AFup−AFTav). This air-fuel ratio deviation DAF is a value which expresses the excess/deficiency of the amount of fuel feed to the target average air-fuel ratio AFTav.

The F/B correction calculating unit A10 processes the air-fuel ratio deviation DAF which was calculated by the air-fuel ratio deviation calculating unit A9 by proportional integral derivative processing (PID processing) to calculate the F/B correction amount DFi for compensating for the excess/deficiency of the fuel feed amount based on the following formula (6). The thus calculated F/B correction amount DFi is input to the fuel injection calculating unit A3.

$$DFi = Kp \cdot DAF + Ki \cdot SDAF + Kd \cdot DDAF \quad (6)$$

Note that, in the above formula (6), Kp is a preset proportional gain (proportional constant), Ki is a preset integral gain (integral constant), and Kd is a preset derivative gain (derivative constant). Further, DDAF is the time derivative of the air-fuel ratio deviation DAF and is calculated by dividing the difference between the currently updated air-fuel ratio deviation DAF and the previously updated air-fuel ratio deviation DAF by a time corresponding to the updating interval. Further, SDAF is the time integral of the air-fuel ratio deviation DAF. This time derivative DDAF is calculated by adding the currently updated air-fuel ratio deviation DAF to the previously updated time integral DDAF (SDAF=DDAF+DAF).

<Flow Chart of Processing For Calculating Air-Fuel Ratio Correction Amount>

Figure 15:
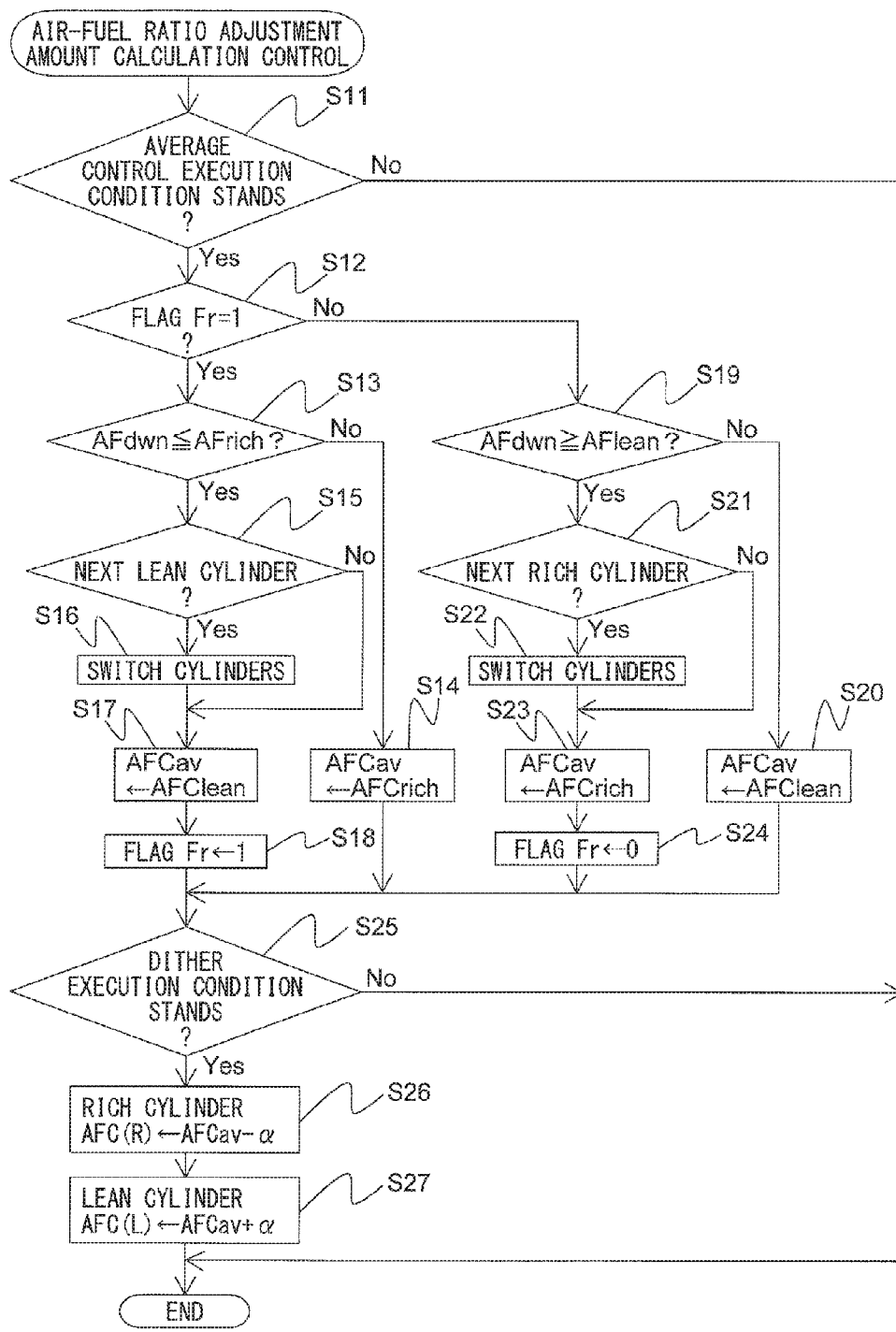
FIG. 15 is a flow chart which shows a control routine of processing for calculating an air-fuel ratio correction amount.

FIG. 15 is a flow chart which shows a control routine of processing for calculating an air-fuel ratio correction amount in the present embodiment. The illustrated control routine is performed by interruption every certain time interval.

First, at step S11, it is judged if the condition for execution of average air-fuel ratio control stands. The condition for execution of average air-fuel ratio control will be explained later. If it is judged that the condition for execution of average air-fuel ratio control does not stand, the control routine is made to end. On the other hand, if it is judged that the condition for execution of the average air-fuel ratio control stands, the routine proceeds to step S12. At step S12, it is judged if the rich flag Fr is "1". The rich flag Fr is a flag which is set to "1" when the average air-fuel ratio is controlled to the rich air-fuel ratio in average air-fuel ratio control and is set to "0" when it is controlled to the lean air-fuel ratio.

If average air-fuel ratio control, if the average air-fuel ratio is controlled to the rich air-fuel ratio, at step S12, it is judged that the rich flag Fr is "1", then the routine proceeds to step S13. At step S13, it is judged if the output air-fuel ratio AFdwn of the downstream side air-fuel ratio sensor 41 becomes the rich judged air-fuel ratio AFrich or less. If the air-fuel ratio of the exhaust gas which flows out from the upstream side exhaust purification catalyst 20 becomes substantially the stoichiometric air-fuel ratio, it is judged at step S13 that the output air-fuel ratio AFdwn of the downstream side air-fuel ratio sensor 41 becomes larger than the rich judged air-fuel ratio AFrich, then the routine proceeds to step S14. At step S14, the average air-fuel ratio correction amount AFCav is set to the rich set correction amount AFCrich. Due to this, the average air-fuel ratio is maintained at the rich air-fuel ratio.

Next, at step S25, it is judged if the condition for execution of inter-cylinder air-fuel ratio control (dither control) stands. The condition for execution of inter-cylinder air-fuel ratio control will be explained later. If it is judged that the condition for execution of inter-cylinder air-fuel ratio control does not stand, the control routine is made to end. On the other hand, if it is judged that the condition for execution of inter-cylinder air-fuel ratio control stands, the routine proceeds to step S26. At step S26, the value of the average air-fuel ratio correction amount AFCav minus the predetermined amount of change α is made the air-fuel ratio correction amount AFC(R) of the rich side cylinders. Next, at step S27, the value of the average air-fuel ratio correction amount AFCav plus the predetermined amount of change α is made the air-fuel ratio correction amount AFC(L) of the lean side cylinders, then the control routine is made to end.

After that, if the air-fuel ratio of the exhaust gas which flows out from the upstream side exhaust purification catalyst 20 becomes the rich air-fuel ratio, at the next control routine, at step S13, it is judged if the output air-fuel ratio AFdwn of the downstream side air-fuel ratio sensor 41 becomes the rich judged air-fuel ratio AFrich or less, then the routine proceeds to step S15. At step S15, it is judged if the cylinder where combustion is performed next is a lean cylinder. If a rich cylinder, step S16 is skipped. On the other hand, if, at step S15, it is judged that the cylinder where combustion is performed next is a lean cylinder, the routine proceeds to step S16. At step S16, the rich side cylinders and lean side cylinders are switched. Therefore, the cylinders which were deemed rich side cylinders in the inter-cylinder air-fuel ratio control up to then are switched to lean side cylinders. Next, at step S17, the average air-fuel ratio correction amount AFCav is set at the lean set correction amount AFClean. Next, at step S18, the rich flag Fr is set to "1", then the routine proceeds to step S25.

If the rich flag Fr is set to "1", at the next control routine, the routine proceeds from step S12 to step S19. At step S19, it is judged if the output air-fuel ratio AFdwn of the downstream side air-fuel ratio sensor 41 is the lean judged air-fuel ratio AFlean or more. If the air-fuel ratio of the exhaust gas which flows out from the upstream side exhaust purification catalyst 20 becomes substantially the stoichiometric air-fuel ratio, at step S19, it is judged if the output air-fuel ratio AFdwn of the downstream side air-fuel ratio sensor 41 is smaller than the lean judged air-fuel ratio AFlean, then the routine proceeds to step S20. At step S20, the average air-fuel ratio correction amount AFCav is set to the lean set correction amount AFClean. Due to this, the average air-fuel ratio is maintained at the lean air-fuel ratio, then the routine proceeds to step S25.

After that, if the air-fuel ratio of the exhaust gas which flows out from the upstream side exhaust purification catalyst 20 becomes the lean air-fuel ratio, at the next control routine, at step S19, it is judged that the output air-fuel ratio AFdwn of the downstream side air-fuel ratio sensor 41 is the lean judged air-fuel ratio AFlean or more, then the routine proceeds to step S21. At step S21, it is judged if the cylinder where combustion is performed next is a rich cylinder. If a lean cylinder, step S22 is skipped. On the other hand, if, at step S21, it is judged that the cylinder where combustion is performed next is a rich cylinder, the routine proceeds to step S22. At step S22, the rich side cylinders and the lean side cylinders are switched. Next, at step S23, the average air-fuel ratio correction amount AFCav is set to the rich set correction amount AFCrich. Next, at step S24, the rich flag Fr is reset to "0", then the routine proceeds to step S25.

<Flow Chart of Normal Learning Control>

Figure 14:
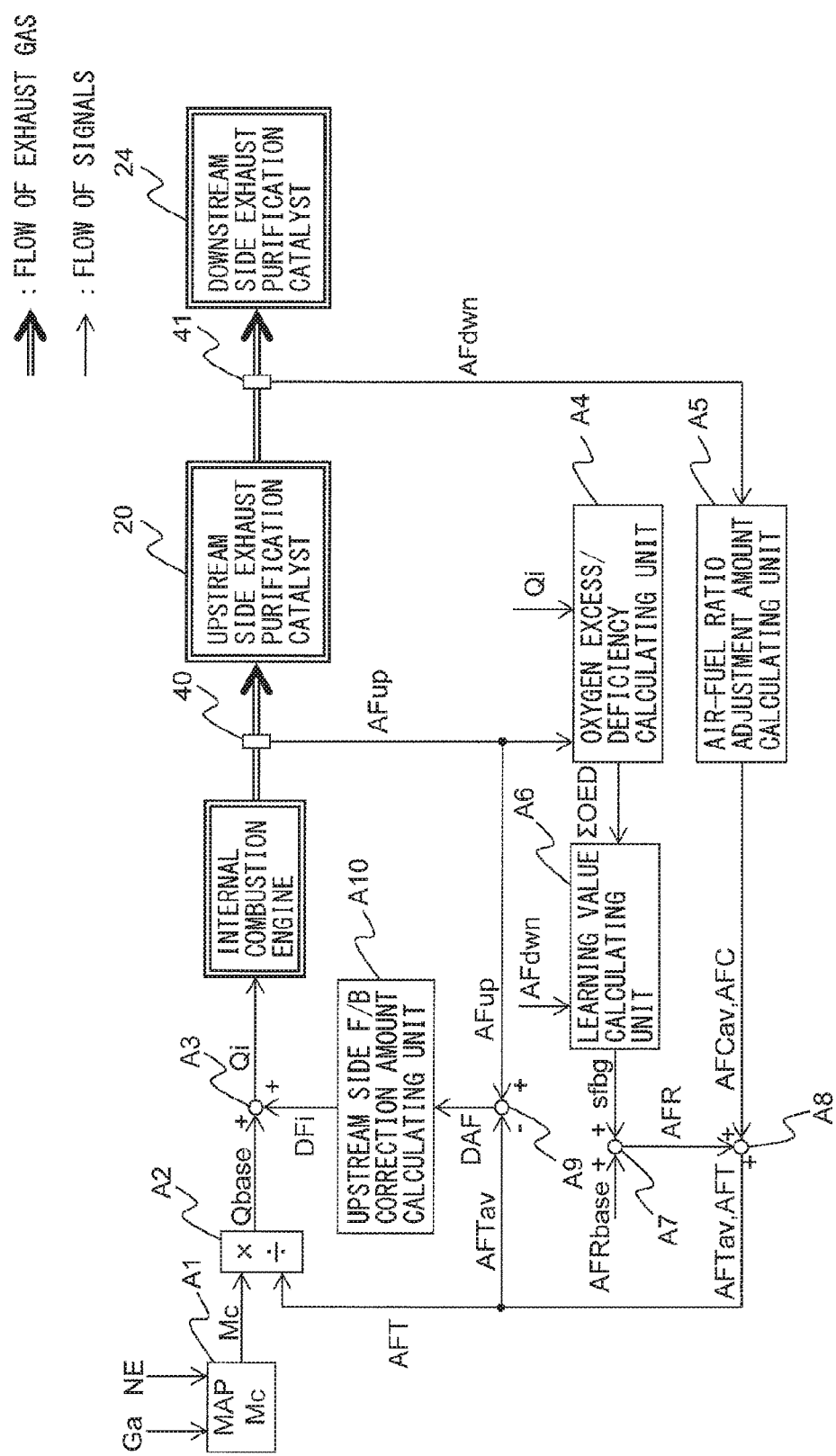
FIG. 14 is a functional block diagram of a control system.

FIG. 14 is a flow chart which shows the control routine of normal leaning control. The illustrated control routine is performed by interruption every certain time interval.

As shown in FIG. 14, first, at step S31, it is judged if the condition for updating the learning value sfbg stands. As the case when the condition for updating stands, for example, normal control being performed, etc., may be mentioned. When it is judged at step S31 that the condition for updating the learning value sfbg stands, the routine proceeds to step S32. At step S32, it is judged if the lean flag Fl has been set to 1. When it is judged at step S32 that the lean flag Fl has been set to 1, the routine proceeds to step S33.

At step S33, it is judged if the average air-fuel ratio correction amount AFCav is larger than 0, that is, if the target air-fuel ratio is a lean air-fuel ratio. If, at step S33, it is judged that the average air-fuel ratio correction amount AFCav is larger than 0, the routine proceeds to step S34. At step S34, the cumulative oxygen excess/deficiency $\Sigma$OED is increased by the current oxygen excess/deficiency OED.

Then, if the target average air-fuel ratio is switched to the rich air-fuel ratio, at the next control routine, at step S33, it is judged if the average air-fuel ratio correction amount AFCav is 0 or less and thus the routine proceeds to step S35. At step S35, the lean flag Fl is set to 1, next, at step S36, Rn is made the absolute value of the current cumulative oxygen excess/deficiency $\Sigma$OED. Next, at step S37, the cumulative oxygen excess/deficiency $\Sigma$OED is reset to 0 and then the control routine is ended.

On the other hand, if the lean flag Fl is set to 0, at the next control routine, the routine proceeds from step S32 to step S38. At step S38, it is judged if the average air-fuel ratio correction amount AFCav is smaller than 0, that is, the target average air-fuel ratio is the rich air-fuel ratio. When it is judged at step S38 that the average air-fuel ratio correction amount AFCav is smaller than 0, the routine proceeds to step S39. At step S39, the cumulative oxygen excess/deficiency $\Sigma$OED is increased by the current oxygen excess/deficiency OED.

Then, if the target average air-fuel ratio is switched to the lean air-fuel ratio, at step S38 of the next control routine, it is judged that the average air-fuel ratio correction amount AFCav is 0 or more, then the routine proceeds to step S40. At step S40, the lean flag Fr is set to 1, then, at step S41, Fn is made the absolute value of the current cumulative oxygen excess/deficiency $\Sigma$OED. Next, at step S42, the cumulative oxygen excess/deficiency $\Sigma$OED is reset to 0. Next, at step S43, the learning value sfbg is updated based on Rn which was calculated at step S36 and the Fn which was calculated at step S41, then the control routine is ended.

<Flow Chart of Stuck Learning Control>

Figure 17:
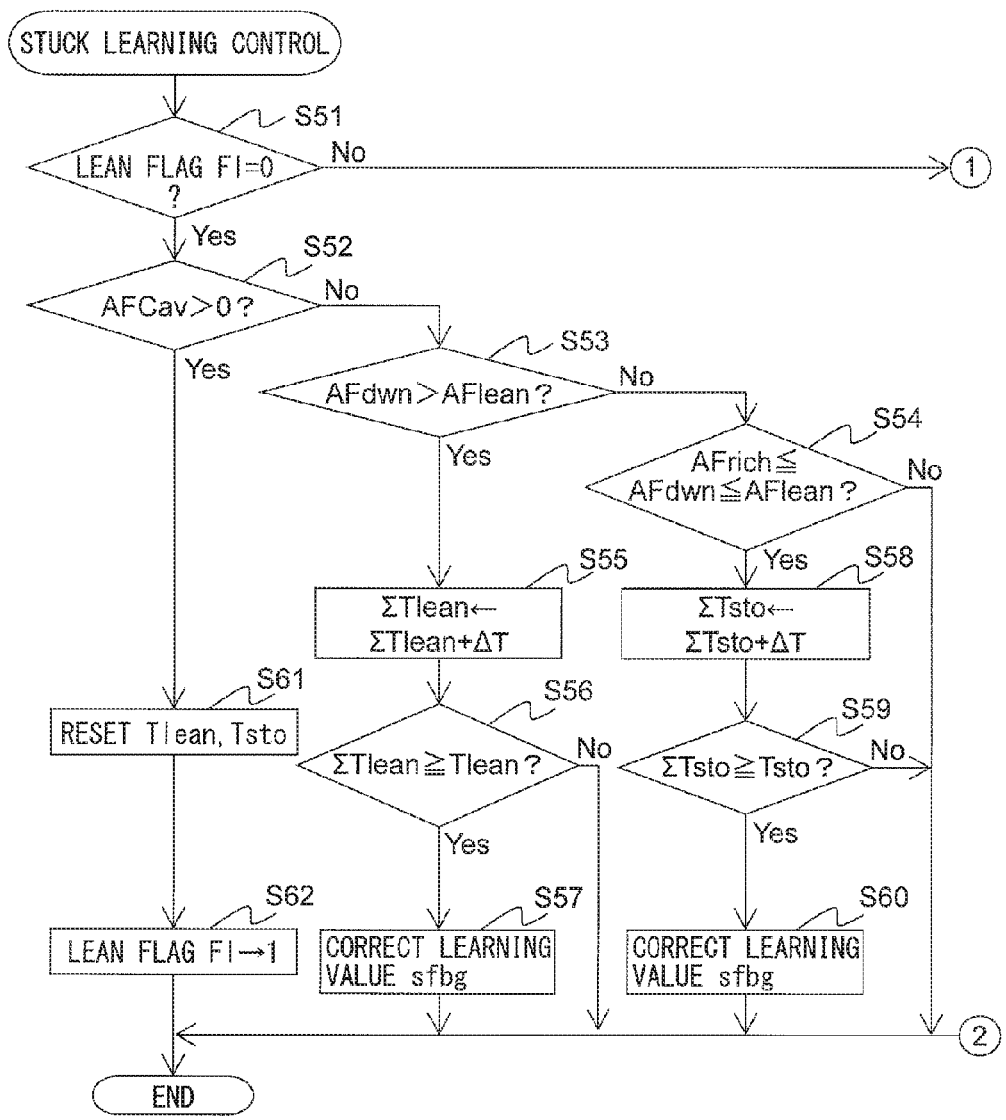
FIG. 17 is part of a flow chart which shows a control routine of stuck learning control.
Figure 18:
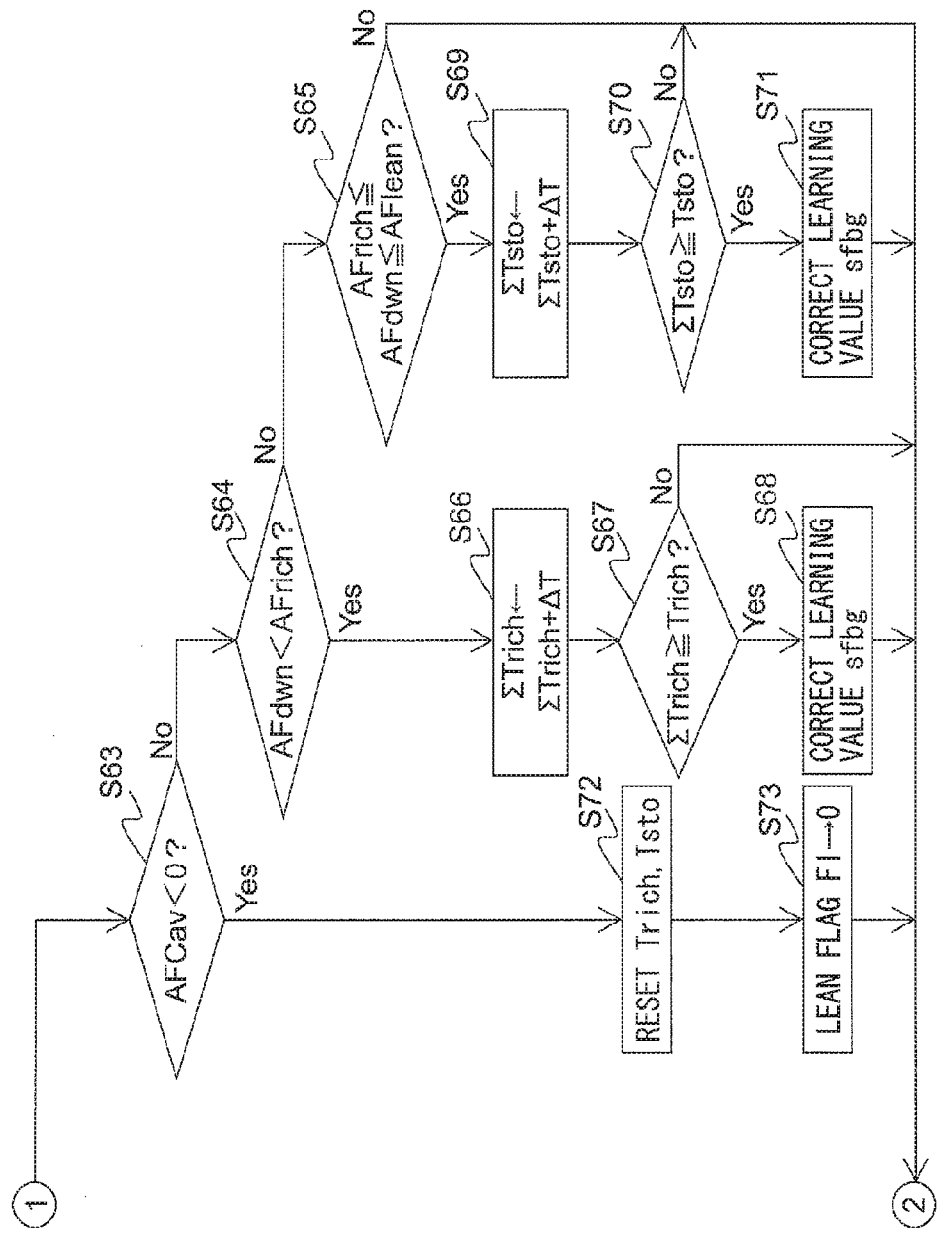
FIG. 18 is part of a flow chart which shows a control routine of stuck learning control.

FIGS. 17 and 18 are flow charts which show the control routine of stuck learning control (stoichiometric air-fuel ratio stuck control, rich stuck control, and lean stuck control). The illustrated control routine is performed by interruption every certain time interval.

As shown in FIGS. 17 and 18, first, at step S51, it is judged if the lean flag Fl is set to "0". If it is judged, at step S51, that the lean flag Fl is set to "0", the routine proceeds to step S52. At step S52, it is judged if the average air-fuel ratio correction amount AFCav is larger than 0, that is, if the target average air-fuel ratio is the lean air-fuel ratio. If it is judged at step S52 that the average air-fuel ratio correction amount AFCav is 0 or less, the routine proceeds to step S53.

At step S53, it is judged if the output air-fuel ratio AFdwn of the downstream side air-fuel ratio sensor 41 is larger than the lean judged air-fuel ratio AFlean, and at step S54, it is judged if the output air-fuel ratio AFdwn is a value between the rich judged air-fuel ratio AFrich and the lean judged air-fuel ratio AFlean. If it is judged at steps S53 and S54 that the output air-fuel ratio AFdwn is smaller than the rich judged air-fuel ratio AFrich, that is, if it is judged that the output air-fuel ratio is the rich air-fuel ratio, the control routine is ended. On the other hand, if it is judged at step S53 that the output air-fuel ratio AFdwn is larger than the lean judged air-fuel ratio AFlean, that is, if it is judged that the output air-fuel ratio is the lean air-fuel ratio, the routine proceeds to step S55.

At step S55, the new lean maintenance time Tlean is set to a value acquired by adding the time $\Delta$T to the lean maintenance time $\Sigma$Tlean. Note that, the lean maintenance time $\Sigma$Tlean indicates the time during which the output air-fuel ratio is maintained at the lean air-fuel ratio. Next, at step S56, it is judged if the lean maintenance time $\Sigma$Tlean which was calculated at step S55 is the lean air-fuel ratio judgment time Tlean or more. At step S56, when it is judged that $\Sigma$Tlean is smaller than Tlean, the control routine is ended. On the other hand, when the lean maintenance time $\Sigma$Tlean increases and thus, at step S56, it is judged that $\Sigma$Tlean is Tlean or more, the routine proceeds to step S57. At step S57, the learning value sfbg is corrected by using the above-mentioned formula (5).

On the other hand, when if it is judged at step S54 that the output air-fuel ratio AFdwn is a value between the rich judged air-fuel ratio AFrich and the lean judged air-fuel ratio AFlean, the routine proceeds to step S58. At step S58, the new stoichiometric air-fuel ratio maintenance time $\Sigma$Tsto is set to a value acquired by adding the time $\Delta$AT to the stoichiometric air-fuel ratio maintenance time $\Sigma$Tsto. Next, at step S59, it is judged if the stoichiometric air-fuel ratio maintenance time $\Sigma$Tsto which was calculated at step S58 is the stoichiometric air-fuel ratio judgment time Tsto or more. If it is judged at step S59 that $\Sigma$Tsto is smaller than Tsto, the control routine is ended. On the other hand, if the stoichiometric air-fuel ratio maintenance time $\Sigma$Tsto increases and thus it is judged at step S59 that $\Sigma$Tsto is Tsto or more, the routine proceeds to step S60. At step S60, the learning value sfbg is corrected by using the above-mentioned formula (4).

Then, when the target average air-fuel ratio is switched and it is judged at step S52 that the average air-fuel ratio correction amount AFCav is larger than 0, the routine proceeds to step S61. At step S61, the lean air-fuel ratio maintenance time $\Sigma$Tlean and the stoichiometric air-fuel ratio maintenance time $\Sigma$Tsto are reset to 0. Next, at step S62, the lean flag Fl is set to "1".

If the lean flag Fl is set to "1", at the next control routine, the routine proceeds from step S51 to step S63. At step S63, it is judged if the average air-fuel ratio correction amount AFCav is smaller than 0, that is, if the target average air-fuel ratio is the rich air-fuel ratio. When it is judged at step S63 that the average air-fuel ratio correction amount AFCav is 0 or more, the routine proceeds to step S64.

At step S64, it is judged if the output air-fuel ratio AFdwn of the downstream side air-fuel ratio sensor 41 is smaller than the rich judged air-fuel ratio AFrich. At step S65, it is judged if the output air-fuel ratio AFdwn is a value between the rich judged air-fuel ratio AFrich and the lean judged air-fuel ratio AFlean. If it is judged at steps S64 at S65 that the output air-fuel ratio AFdwn is larger than the lean judged air-fuel ratio AFlean, that is, if the output air-fuel ratio is the lean air-fuel ratio, the control routine is ended. On the other hand, if it is judged at step S64 that the output air-fuel ratio AFdwn is smaller than the rich judged air-fuel ratio AFrich, that is, if it is judged that the output air-fuel ratio is the rich air-fuel ratio, the routine proceeds to step S66.

At step S66, the new rich maintenance time ΣTrich is set to a value acquired by adding the time AT to the rich maintenance time ΣTrich. Note that, the rich maintenance time ΣTrich indicates the time during which the output air-fuel ratio is maintained at the rich air-fuel ratio. Next, at step S67, it is judged if the rich maintenance time ΣTrich which was calculated at step S66 is the rich air-fuel ratio judgment time Trich or more. If at step S67 it is judged that ΣTrich is smaller than Trich, the control routine is ended. On the other hand, if the rich maintenance time ΣTrich increases and thus it is judged at step S67 that ΣTrich is Trich or more, the routine proceeds to step S68. At step S68, the learning value sfbg is corrected by using the above formula (5).

On the other hand, if it is judged at step S65 that the output air-fuel ratio AFdwn is a value between the rich judged air-fuel ratio AFrich and the lean judged air-fuel ratio AFlean, the routine proceeds to step S69. At steps S69 to S71, control similar to steps S58 to S60 is performed.

Then, if the target average air-fuel ratio is switched and thus it is judged at step S63 that the average air-fuel ratio correction amount AFCav is smaller than 0, the routine proceeds to step S72. At step S72, the rich air-fuel ratio maintenance time ΣTrich and the stoichiometric air-fuel ratio maintenance time ΣTsto are reset to 0. Next, at step S73, the lean flag Fl is set to "0" and the control routine is ended.

<Processing for Judging Execution of Inter-Cylinder Air-Fuel Ratio Control>

Figure 19:
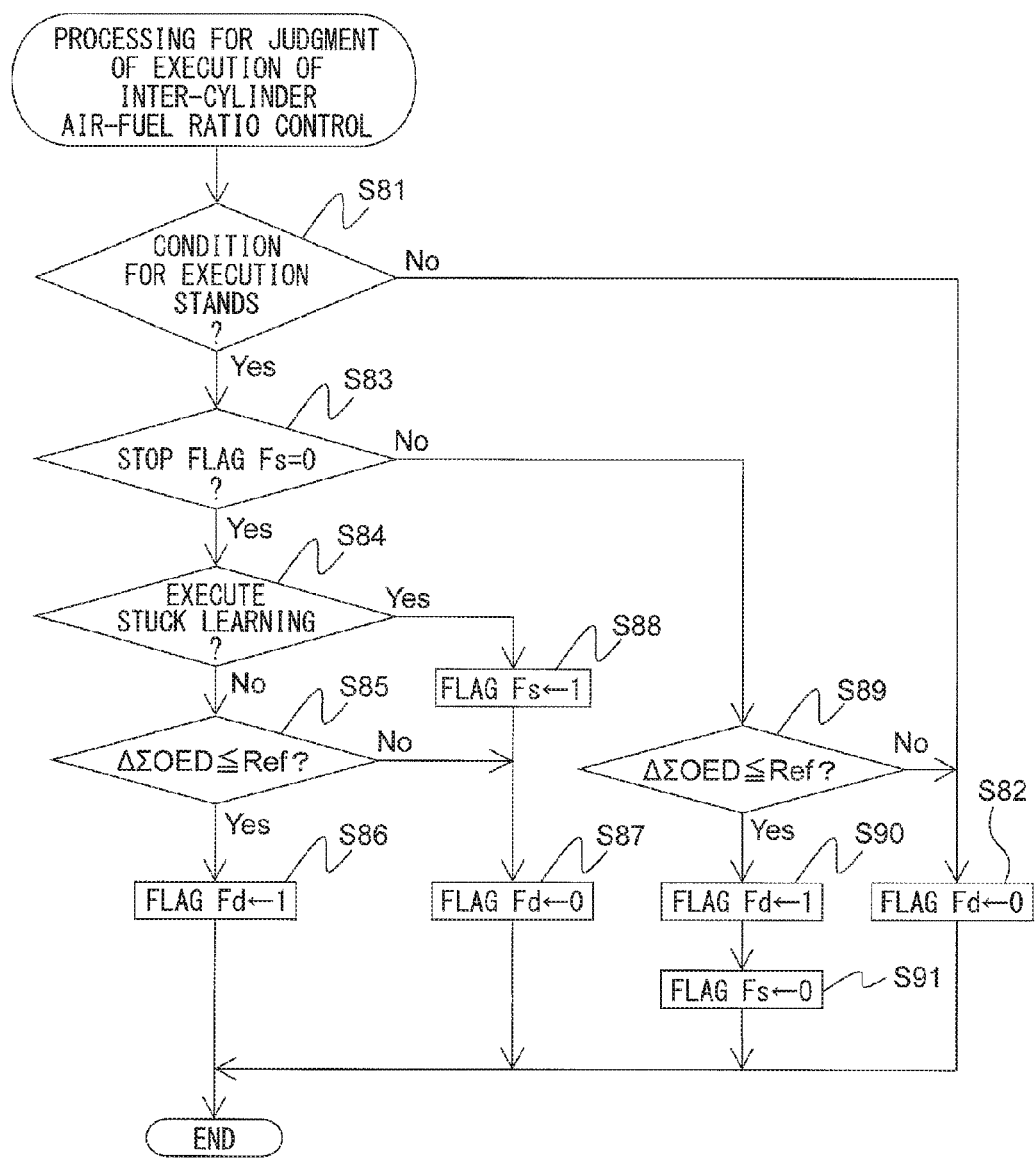
FIG. 19 is a flow chart which shows a control routine of processing for executing and judging inter-cylinder air-fuel ratio control.

FIG. 19 is a flow chart which shows a control routine of processing for judging if a condition for execution of inter-cylinder air-fuel ratio control stands. The illustrated control routine is performed by interruption every certain time interval.

First, at step S81, it is judged if a condition for execution of inter-cylinder air-fuel ratio control stands. The condition for execution of inter-cylinder air-fuel ratio control, for example, stands when conditions such as the temperature of the upstream side exhaust purification catalyst 20 being the activation temperature (for example, 400° C.) or more and the upper limit temperature (for example, 800° C.) or less, for example, fuel cut control or other control which cannot be realized together with feedback control is not being perform, etc. are satisfied. When, at step S81, it is judged that the condition for execution does not stand, the routine proceeds to step S82. At step S82, the inter-cylinder air-fuel ratio control execution flag Fd is reset to "0". The inter-cylinder air-fuel ratio control execution flag Fd is a flag which is set to "1" when the inter-cylinder air-fuel ratio control can be performed and is set to "0" when it cannot be performed. If the inter-cylinder air-fuel ratio control execution flag Fd is set to "1", at step S25 of FIG. 15, it is judged that the condition for execution of inter-cylinder air-fuel ratio control stands.

On the other hand, when, at step S81, it is judged that the condition for execution does not stand, the routine proceeds to step S83. At step S83, it is judged if the stop flag Fs has become "0". The stop flag Fs is a flag which is set to "1" if performance of stuck learning control causes the inter-cylinder air-fuel ratio control to be stopped and is set to "0" otherwise. At step S83, stuck learning control is not performed. If it is judged that the stop flag Fs is "0", the routine proceeds to step S84. At step S84, it is judged if stuck learning control has been performed. For example, in steps S57, S60, S68, and S71 of FIG. 17 and FIG. 18, if the learning value sfbg has been corrected, it is judged that stuck learning control was performed.

Figure 16:
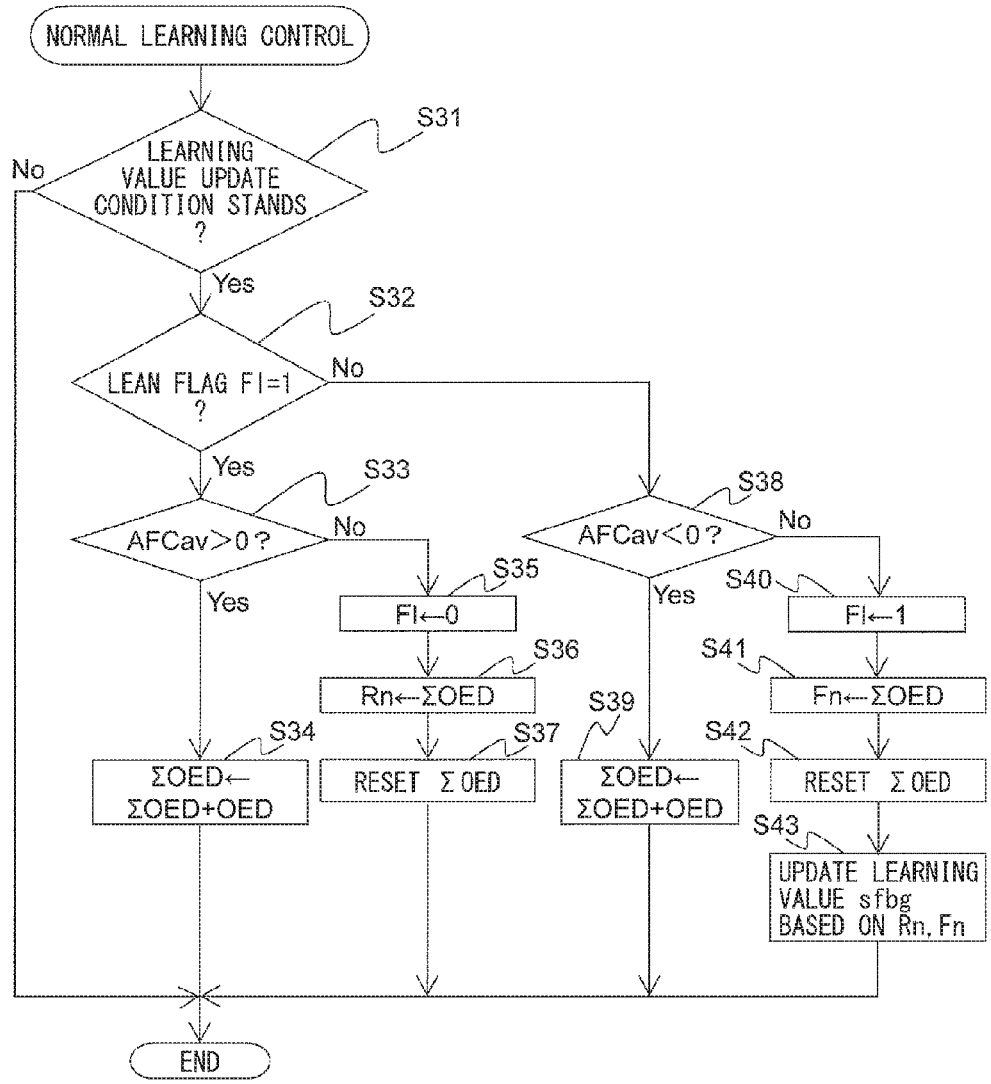
FIG. 16 is a flow chart which shows a control routine of normal learning control.

If, at step S84, it is judged that stuck learning control is not being performed, the routine proceeds to step S85. At step S85, it is judged if the excess/deficiency error ΔΣOED which is calculated at step S43 of FIG. 16 is the predetermined judgment value Ref or less. If it is judged that the excess/deficiency error ΔΣOED is the judgment value Ref or less, since no error occurs in the learning value, at step S86, the inter-cylinder air-fuel ratio control execution flag Fd is set to "1". On the other hand, if, at step S85, it is judged that the excess/deficiency error ΔΣOED is larger than the judgment value Ref, the routine proceeds to step S87. At step S87, the inter-cylinder air-fuel ratio control execution flag Fd is set to "0" and the inter-cylinder air-fuel ratio control is made to stop.

On the other hand, if, at step S84, it is judged that stuck learning control is being performed, the routine proceeds to step S88. At step S88, the stop flag Fs is set to "1", then the routine proceeds to step S87.

If the stop flag Fs is set to "1", at the next control routine, the routine proceeds from step S83 to step S89. At step S89, it is judged if the excess/deficiency error ΔΣOED is the judgment value Ref or less. If it is judged that the excess/deficiency error ΔΣOED is larger than the judgment value Ref, the routine proceeds to step S82 where the inter-cylinder air-fuel ratio control execution flag Fd is set to "0". On the other hand, when, at step S89, it is judged that the excess/deficiency error ΔΣOED is the judgment value Ref or less, the routine proceeds to steps S90 and S91. At these steps S90 and S91, the inter-cylinder air-fuel ratio control execution flag Fd is set to "1", the stop flag Fs is set to "0", and the control routine is made to end.

Modification of First Embodiment

Next, referring to FIG. 20 and FIG. 21, a modification of the exhaust purification system of a first embodiment of the present invention will be explained. In the inter-cylinder air-fuel ratio control of the above-mentioned first embodiment, both when the average air-fuel ratio correction amount AFCav is set to the rich set correction amount AFCrich and when it is set to the lean set correction amount AFClean, the combustion air-fuel ratios are made to change between cylinders.

However, if, when the average air-fuel ratio correction amount AFCav is set to the rich set correction amount AFCrich, the combustion air-fuel ratios are made to change between the cylinders, the air-fuel ratio correction amounts AFC of the rich side cylinders become the rich set correction amount AFCrich minus the amount of change α. For this reason, the combustion air-fuel ratios at the rich side cylinders become rich air-fuel ratios with large rich degrees. In this way, if the rich degree becomes higher, as explained above, even if the $SO_X$ had been strongly stored at the oxygen storage substance, desorption of $SO_X$ is invited and therefore the sulfur content ends up moving to the precious metal surface.

Figure 20:
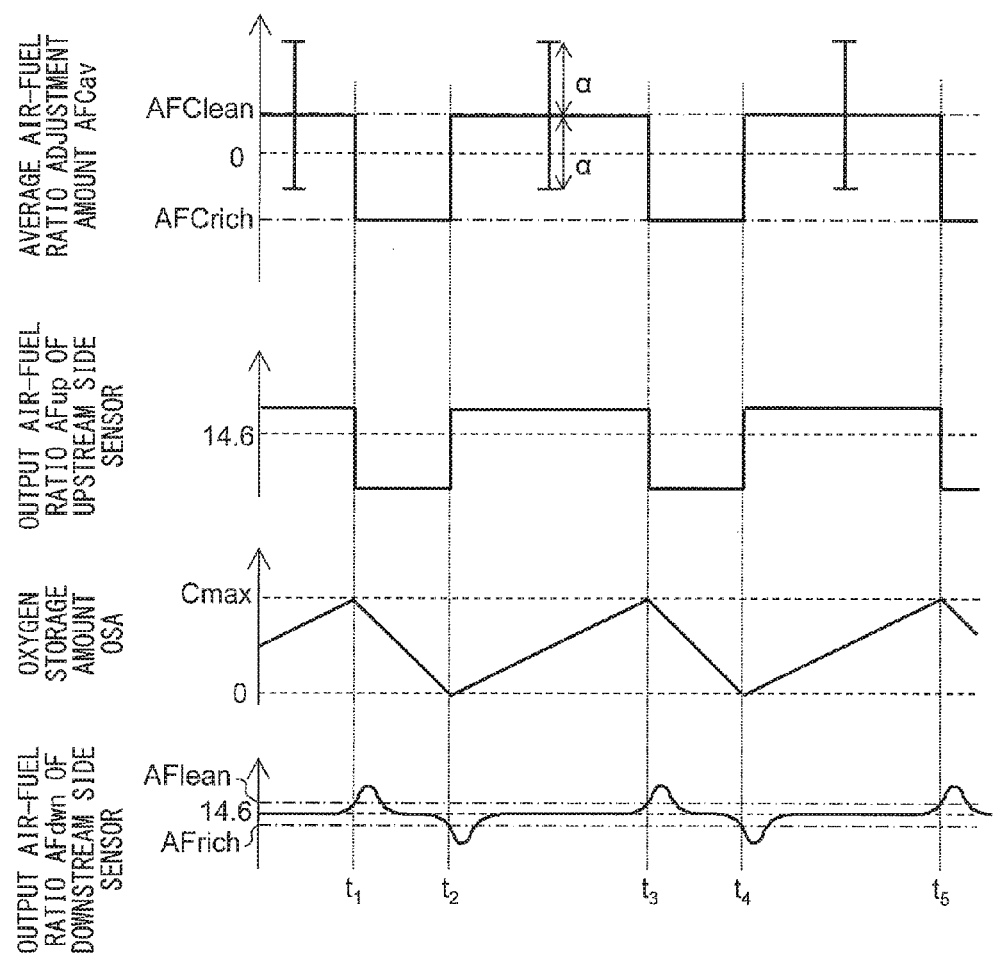
FIG. 20 is a time chart of an average air-fuel ratio correction amount etc.

Therefore, in the present modification, as shown in FIG. 20, when the average air-fuel ratio correction amount AFCav is made the lean set correction amount AFClean, inter-cylinder air-fuel ratio control is performed. In addition, when the average air-fuel ratio correction amount AFCav is made the rich set correction amount AFCrich, inter-cylinder air-fuel ratio control is not performed, but the target air-fuel ratios of the cylinders are controlled so that the target air-fuel ratios become equal at all of the cylinders. Due to this, even when the average air-fuel ratio is made the rich air-fuel ratio, the combustion air-fuel ratios of the cylinders are kept from becoming rich with a large rich degree. Accordingly, movement of sulfur content from the oxygen storage substance to the precious metal surface can be suppressed.

Figure 21:
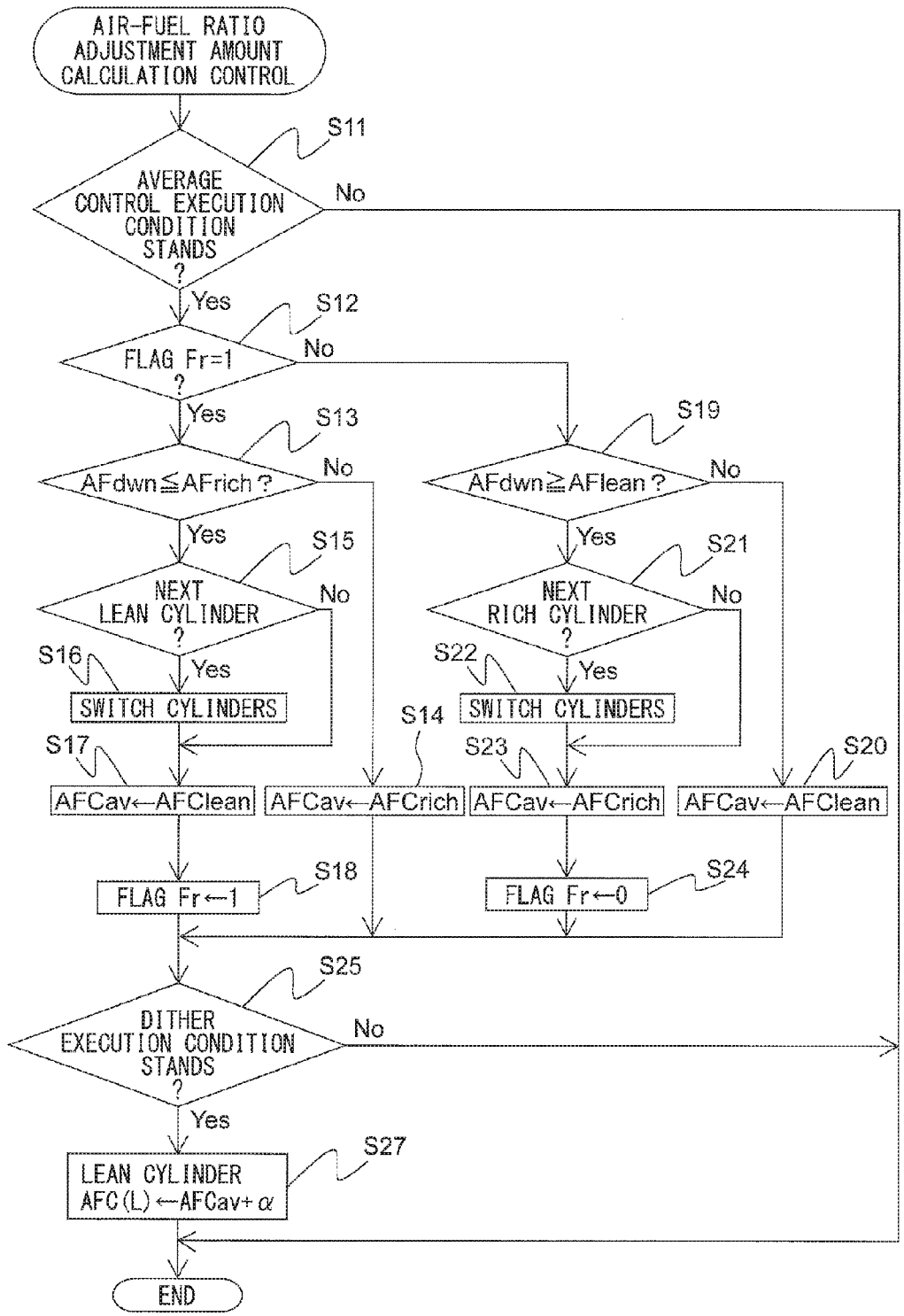
FIG. 21 is a flow chart which shows a control routine of processing for calculating an air-fuel ratio correction amount according to a modification of the first embodiment.

FIG. 21 is a flow chart which shows a control routine of processing for calculating an air-fuel ratio correction amount in the present modification. The control routine which is shown in FIG. 21 is similar to the control routine which is shown in FIG. 15 except for the point of the omission of step S26 of FIG. 15.

Second Embodiment

Next, referring to FIG. 22 and FIG. 23, a second embodiment of the exhaust purification system of embodiments of the present invention will be explained. The configuration and control of the exhaust purification system according to the second embodiment are, except for the points which are explained below, basically the configuration and control of the exhaust purification system according to the first embodiment.

In the average air-fuel ratio control of the present embodiment, first, if, in the state where the target average air-fuel ratio is set to the rich set air-fuel ratio, it is judged that the output air-fuel ratio of the downstream side air-fuel ratio sensor 41 has become the rich air-fuel ratio, the target average air-fuel ratio is switched to the lean set air-fuel ratio. Due to this, the average air-fuel ratio of the exhaust gas which flows into the upstream side exhaust purification catalyst 20 changes to the lean air-fuel ratio.

If the target average air-fuel ratio is switched to the lean set air-fuel ratio, the oxygen excess/deficiency of the exhaust gas which flows into the upstream side exhaust purification catalyst 20 is cumulatively added. If the calculated cumulative oxygen excess/deficiency obtained by cumulatively adding the oxygen excess/deficiency becomes a predetermined switching reference value (corresponding to predetermined switching reference storage amount Cref) or more, the target average air-fuel ratio which had up to then been set to the lean set air-fuel ratio is switched to the rich set air-fuel ratio. That is, the average air-fuel ratio is switched to the rich air-fuel ratio when the oxygen storage amount OSA of the upstream side exhaust purification catalyst 20 from when starting to control the average air-fuel ratio to the lean air-fuel ratio reaches a predetermined switching reference storage amount Cref.

After that, when the output air-fuel ratio of the downstream side air-fuel ratio sensor 41 again becomes the rich judged air-fuel ratio or less, the target average air-fuel ratio is again made the lean set air-fuel ratio. After that, a similar operation is repeated. In this way, in the present embodiment as well, the target average air-fuel ratio of the exhaust gas which flows into the upstream side exhaust purification catalyst 20 is alternately set to the lean set air-fuel ratio and the rich set air-fuel ratio.

Figure 22:
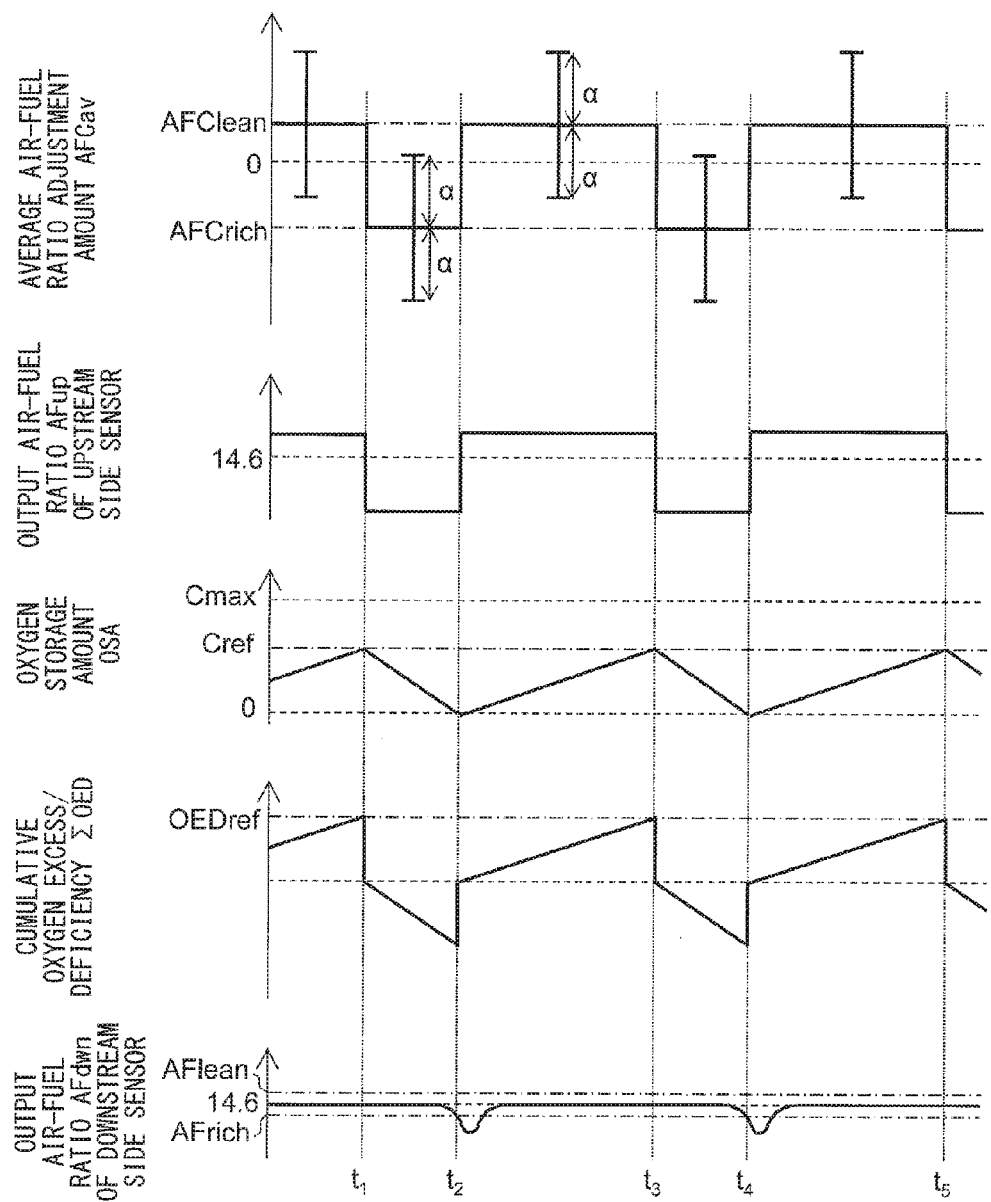
FIG. 22 is a time chart of an average air-fuel ratio correction amount etc.

Referring to FIG. 22, the average air-fuel ratio control of the present embodiment will be explained in detail. FIG. 22 is a time chart, similar to FIG. 4, of an average air-fuel ratio correction amount AFCav etc. In the example which is shown in FIG. 22, at the times $t_1$ to $t_2$, the average air-fuel ratio correction amount AFCav is set to the rich set correction amount AFCrich. That is, the target average air-fuel ratio is made the rich air-fuel ratio. Along with this, the output air-fuel ratio AFup of the upstream side air-fuel ratio sensor 40 becomes the rich air-fuel ratio. The unburned HC and CO which are contained in the exhaust gas which flows into the upstream side exhaust purification catalyst 20 are removed by the upstream side exhaust purification catalyst 20. Along with this, the oxygen storage amount OSA of the upstream side exhaust purification catalyst 20 gradually decreases. On the other hand, due to the removal of unburned HC and CO in the upstream side exhaust purification catalyst 20, the output air-fuel ratio AFdwn of the downstream side air-fuel ratio sensor 41 becomes substantially the stoichiometric air-fuel ratio.

After that, if the oxygen storage amount OSA of the upstream side exhaust purification catalyst 20 decreases and approaches zero, part of the unburned HC and CO which flow into the upstream side exhaust purification catalyst 20 starts to flow out from the upstream side exhaust purification catalyst 20. For this reason, in the illustrated example, at the time $t_2$, the output air-fuel ratio AFdwn of the downstream side air-fuel ratio sensor 41 reaches the rich judged air-fuel ratio AFrich.

In the present embodiment, if the output air-fuel ratio AFdwn of the downstream side air-fuel ratio sensor 41 becomes the rich judged air-fuel ratio AFrich or less, to make the oxygen storage amount OSA increase, the average air-fuel ratio correction amount AFCav is switched to the lean set correction amount AFClean. Therefore, the target average air-fuel ratio is switched to the lean air-fuel ratio. At this time, the cumulative oxygen excess/deficiency ΣOED is reset to zero.

At the time $t_2$, if the average air-fuel ratio correction amount AFCav is switched to the lean set correction amount AFClean, the air-fuel ratio of the exhaust gas which flows into the upstream side exhaust purification catalyst 20 changes from the rich air-fuel ratio to the lean air-fuel ratio. Further, along with this, the output air-fuel ratio AFup of the upstream side air-fuel ratio sensor 40 becomes the lean air-fuel ratio. In addition, at the time $t_2$ on, the oxygen storage amount OSA of the upstream side exhaust purification catalyst 20 gradually increases and further the cumulative oxygen excess/deficiency ΣOED also gradually increases. Further, the output air-fuel ratio AFdwn of the downstream side air-fuel ratio sensor 41 converges to the stoichiometric air-fuel ratio.

After that, if the oxygen storage amount OSA of the upstream side exhaust purification catalyst 20 increases, at the time $t_3$, the oxygen storage amount OSA of the upstream side exhaust purification catalyst 20 reaches the switching reference storage amount Cref. At this time, the cumulative oxygen excess/deficiency ΣOED reaches the switching reference value OEDref corresponding to the switching reference storage amount Cref. In the present embodiment, if the cumulative oxygen excess/deficiency ΣOED becomes the switching reference value OEDref or more, the storage of oxygen in the upstream side exhaust purification catalyst 20 is stopped by the average air-fuel ratio correction amount AFCav being switched to the rich set correction amount AFCrich. Therefore, the target average air-fuel ratio is made the rich air-fuel ratio. Further, at this time, the cumulative oxygen excess/deficiency ΣOED is reset to zero. After that, in the average air-fuel ratio control, the control of the times $t_1$ to $t_3$ is repeated.

Note that, the switching reference storage amount Cref is set sufficiently lower than the maximum storable oxygen amount Cmax when the upstream side exhaust purification catalyst 20 is not yet used. For this reason, even if the actual air-fuel ratio of the exhaust gas unintentionally greatly deviates from the target average air-fuel ratio for an instant, the oxygen storage amount OSA does not reach the maximum storable oxygen amount Cmax. Conversely speaking, the switching reference storage amount Cref is made a sufficiently small amount so that even if the above-mentioned such unintentional deviation of the air-fuel ratio occurs, the oxygen storage amount OSA does not reach the maximum storable oxygen amount Cmax. For example, the switching reference storage amount Cref is made ¾ or less of the maximum storable oxygen amount Cmax when the upstream side exhaust purification catalyst 20 is unused, preferably ½ or less, more preferably ⅕ or less.

According to the present embodiment, before oxygen or $NO_X$ flows out from the upstream side exhaust purification catalyst 20, the target average air-fuel ratio is switched from the lean air-fuel ratio to the rich air-fuel ratio. For this reason, it is possible to constantly suppress the amount of discharge of $NO_X$ from the upstream side exhaust purification catalyst 20. That is, so long as performing the above-mentioned control, basically it is possible to make the amount of discharge of $NO_X$ from the upstream side exhaust purification catalyst 20 substantially zero. Further, the cumulative addition time period when calculating the cumulative oxygen excess/deficiency ΣOED is short, therefore there is greater resistance to calculation error compared with the case of cumulative addition over a long time period. For this reason, calculation error of the cumulative oxygen excess/deficiency ΣOED can be kept from causing $NO_X$ to end up being discharged.

Note that, in the present embodiment, both in the time period during which the average air-fuel ratio correction amount AFCav is set to the rich set correction amount AFCrich (for example, times $t_1$ to $t_2$) and in the time period during which it is set to the lean set correction amount AFClean (for example, times $t_2$ to $t_3$), inter-cylinder air-fuel ratio control is performed. In particular, in the example which is shown in FIG. 22, at the rich side cylinders, the air-fuel ratio correction amount AFC is set to the average air-fuel ratio correction amount AFCav minus the amount of change α. On the other hand, at the lean side cylinders, the air-fuel ratio correction amount AFC is set to the average air-fuel ratio correction amount AFCav plus the amount of change α. However, in the same way as the above-mentioned modification of the first embodiment, it is also possible not to perform the inter-cylinder air-fuel ratio control in the time period during which the average air-fuel ratio correction amount AFCav is set to the rich set correction amount.

Further, in the present embodiment as well, in the same way as the first embodiment, normal learning control and stuck learning control are performed. In the case, in normal learning control, the absolute value of the cumulative oxygen excess/deficiency in a first time period from when the target average air-fuel ratio is switched to the rich air-fuel ratio to when the amount of change of the oxygen storage amount becomes the switching reference amount or more, constituting the "cumulative value of the first oxygen amount", and the absolute value of the cumulative oxygen excess/deficiency in a second time period from when the target average air-fuel ratio is switched to the rich air-fuel ratio to when the output air-fuel ratio of the downstream side air-fuel ratio sensor 41 becomes the rich judged air-fuel ratio or less, constituting the "cumulative value of the second oxygen amount", are used as the basis for correction of a parameter relating to the air-fuel ratio so that the difference of the cumulative value of the first oxygen amount and cumulative value of the second oxygen amount becomes small. Further, for example, in stoichiometric air-fuel ratio stuck learning control, when switching the target average air-fuel ratio to the lean air-fuel ratio, if the air-fuel ratio which is detected by the downstream side air-fuel ratio sensor 41 has been maintained within the stoichiometric air-fuel ratio vicinity air-fuel ratio region over the stoichiometric air-fuel ratio maintenance judgment time Tsto or more, the learning value sfbg is made to increase or decrease so that the air-fuel ratio of the exhaust gas which flows into the upstream side exhaust purification catalyst 20 changes to the rich side or lean side in accordance with the target average air-fuel ratio at that time.

<Explanation of Specific Control and Flow Chart>

Figure 23:
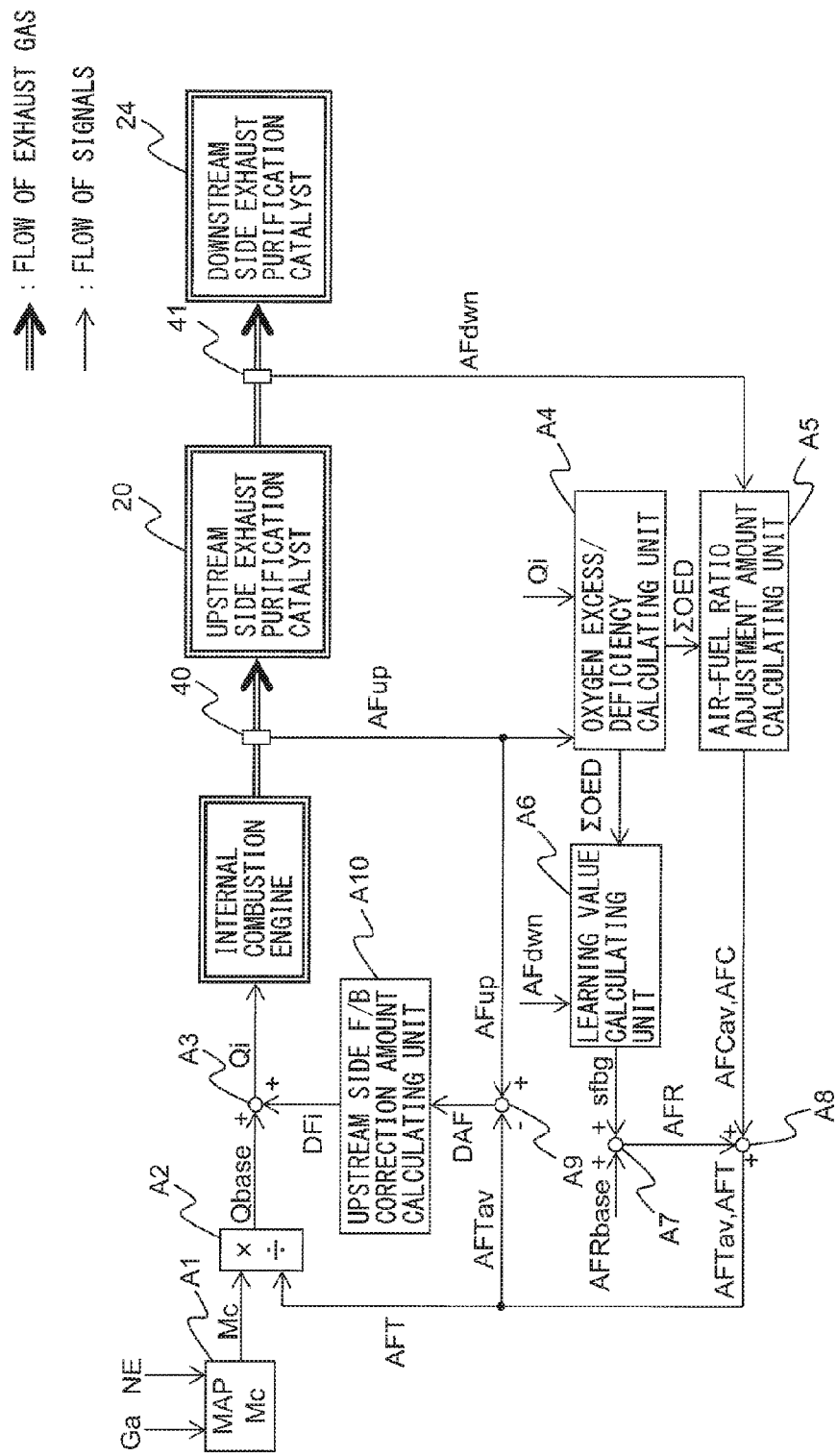
FIG. 23 is a functional block diagram of a control system.

Next, referring to FIG. 23, a control system of an exhaust purification system of the above embodiment will be specifically explained. FIG. 23 is a functional block diagram similar to FIG. 14. However, in the functional block diagram in the present embodiment which is shown in FIG. 23, the air-fuel ratio correction amount calculating means A5 uses the output air-fuel ratio AFdwn of the downstream side air-fuel ratio sensor 41 and also the cumulative oxygen excess/deficiency ΣOED which was calculated by the oxygen excess/deficiency calculating means A4 as the basis to calculate the average air-fuel ratio correction amount AFCav and the air-fuel ratio correction amount AFC of each cylinder.

Figure 24:
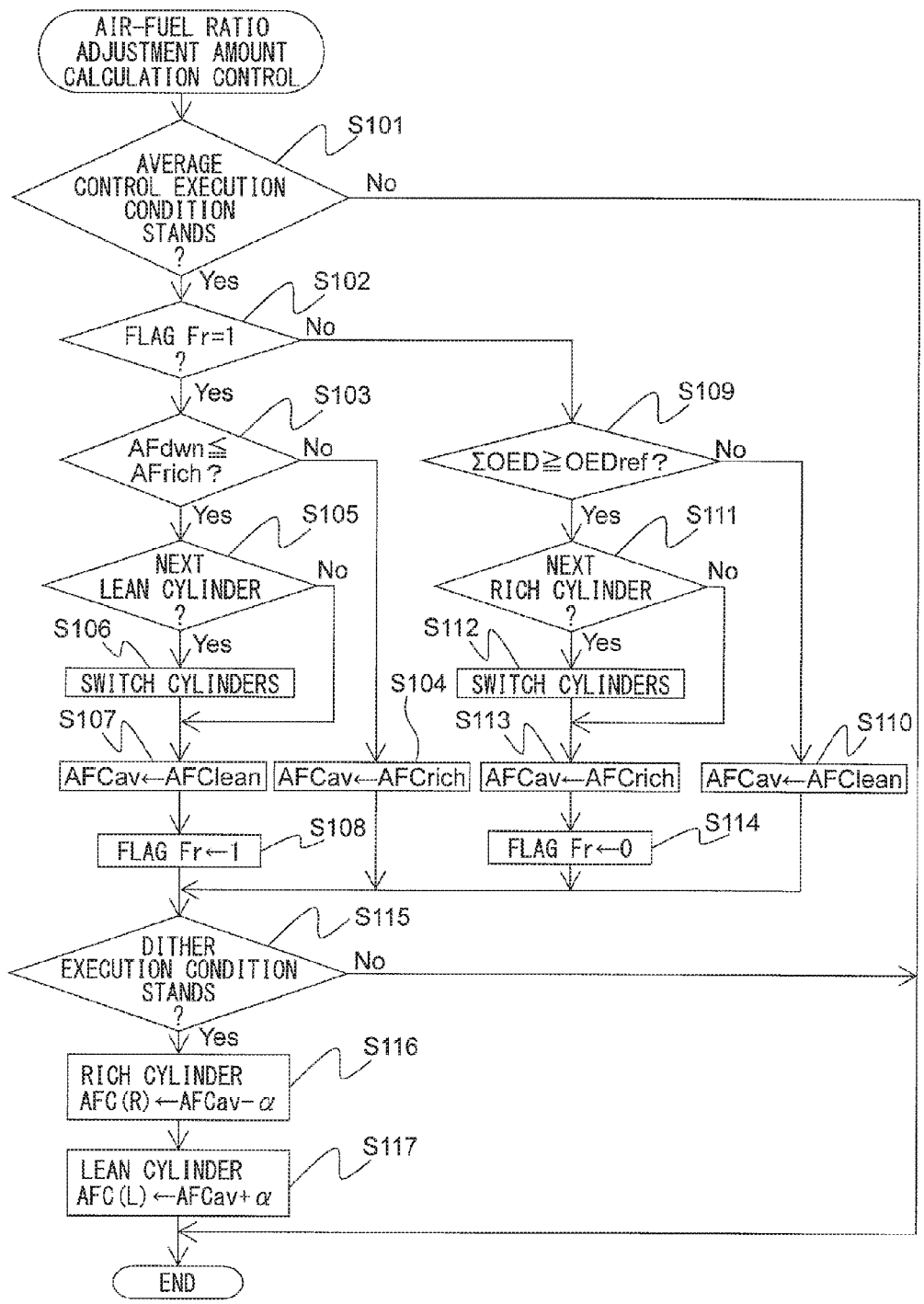
FIG. 24 is a flow chart which shows a control routine of processing for calculating an air-fuel ratio correction amount in a second embodiment.

FIG. 24 is a flow chart which shows a control routine of processing for calculating an air-fuel ratio correction amount in the second embodiment. The illustrated control routine is performed by interruption every certain time interval. Steps S101 to S108 and steps S110 to S117 of FIG. 24 are similar to steps S11 to S18 and steps S20 to S27 of FIG. 15, therefore explanations will be omitted.

In the control routine which is shown in FIG. 24, when it is judged at step S102 that the rich flag Fr is not "1", the routine proceeds to step S109. At step S109, it is judged if the cumulative oxygen excess/deficiency ΣOED from when the average air-fuel ratio correction amount AFCav is switched is a switching reference value OEDref or more. If the cumulative oxygen excess/deficiency ΣOED is smaller than the switching reference value OEDref, the routine proceeds to step S110. On the other hand, if it is judged that the cumulative oxygen excess/deficiency ΣOED is the switching reference value OEDref or more, the routine proceeds to step S111.

Note that, in the first embodiment, if the output air-fuel ratio AFdwn of the downstream side air-fuel ratio sensor 41 becomes the lean judged air-fuel ratio AFlean or more, the average air-fuel ratio correction amount AFCav is switched to the rich air-fuel ratio. On the other hand, in the above second embodiment, when the cumulative oxygen excess/deficiency ΣOED becomes the predetermined switching reference value OEDref or more, the target average air-fuel ratio is switched to the rich air-fuel ratio. Therefore, summarizing the above, in the above embodiment, the target average air-fuel ratio is switched to the lean air-fuel ratio when the output air-fuel ratio of the downstream side air-fuel ratio sensor 41 reaches the rich judged air-fuel ratio. In addition, the target average air-fuel ratio is switched to the rich air-fuel ratio when the oxygen storage amount of the upstream side exhaust purification catalyst 20 becomes the predetermined switching reference amount or more or when the output air-fuel ratio of the downstream side air-fuel ratio sensor 41 reaches the lean judged air-fuel ratio. In other words, in the present embodiment, the target average air-fuel ratio is switched between a plurality of different air-fuel ratios at the rich side and lean side of the stoichiometric air-fuel ratio.

Although this invention has been described by way of the specific embodiments, this invention is not limited to the above embodiments. It is possible for a person skilled in the art to modify or alter the above embodiments in various manners within the technical scope of the present invention.

This application claims priority based on Japanese Patent Application No. 2015-050013 filed with the Japan Patent Office on Mar. 12, 2015, the entire contents of which are incorporated into the present specification by reference.

What is claimed is:

1. An exhaust purification system of an internal combustion engine which has a plurality of cylinders comprising:
   an exhaust purification catalyst which is arranged in an engine exhaust passage and which can store oxygen;
   a downstream side air-fuel ratio sensor which is arranged at a downstream side of the exhaust purification catalyst in a direction of flow of exhaust; and
   a control device which is to control by feedback the fuel feed amounts to combustion chambers so that combustion air-fuel ratios when combustion is performed at the cylinders become target air-fuel ratios,
   wherein the control device is configured to be able to:
   perform an average air-fuel ratio control which alternately controls an average value of the target air-fuel ratios for all cylinders, constituting a target average air-fuel ratio, between a rich air-fuel ratio which is richer than a stoichiometric air-fuel ratio and a lean air-fuel ratio which is leaner than the stoichiometric air-fuel ratio and
   an inter-cylinder air-fuel ratio control which controls the target air-fuel ratios of the cylinders so that the target air-fuel ratio becomes the rich air-fuel ratio at least at one cylinder among the plurality of cylinders including if the target average air-fuel ratio is set to the lean air-fuel ratio by the average air-fuel ratio control; and
   calculate an amount of excess oxygen or an amount of deficiency in oxygen when trying to make the exhaust gas which flows into the exhaust purification catalyst the stoichiometric air-fuel ratio, constituting a cumulative oxygen excess/deficiency, and
   wherein the control device is further configured to perform a learning control which uses an absolute value of the cumulative oxygen excess/deficiency in a first time period from when switching the target average air-fuel ratio from the rich air-fuel ratio to the lean air-fuel ratio to when again switching it to the rich air-fuel ratio, constituting a cumulative value of a first oxygen amount, and an absolute value of the cumulative oxygen excess/deficiency in a second time period from when switching the target average air-fuel ratio from the lean air-fuel ratio to the rich air-fuel ratio to when again switching it to the lean air-fuel ratio, constituting a cumulative value of a second oxygen amount, as the basis to correct a parameter relating to the air-fuel ratio so that a difference between the cumulative value of the first oxygen amount and cumulative value of the second oxygen amount becomes smaller.

2. The exhaust purification system of an internal combustion engine according to claim 1,
   wherein the control device is further configured to set the target average air-fuel ratio in the average air-fuel ratio control so that a difference between the target average air-fuel ratio and stoichiometric air-fuel ratio when setting the target average air-fuel ratio to a lean air-fuel ratio, constituting a lean shift amount, becomes smaller than a difference between the target average air-fuel ratio and stoichiometric air-fuel ratio when setting the target average air-fuel ratio to a rich air-fuel ratio, constituting a rich shift amount.

3. The exhaust purification system of an internal combustion engine according to claim 1,
   wherein the control device is further configured to control the target air-fuel ratios of the cylinders without performing the inter-cylinder air-fuel ratio control when the difference of the cumulative value of the first oxygen amount and the cumulative value of the second oxygen amount is a predetermined value or more, so that the target air-fuel ratios become equal at all of the cylinders.

4. The exhaust purification system of an internal combustion engine according to claim 1,
   wherein the control device is further configured to perform a stoichiometric air-fuel ratio stuck learning, which corrects the parameter relating to the air-fuel ratio, in the learning control when the target average air-fuel ratio is set to one air-fuel ratio of either the rich air-fuel ratio or lean air-fuel ratio, if the air-fuel ratio which is detected by the downstream side air-fuel ratio sensor is maintained within a stoichiometric air-fuel ratio vicinity air-fuel ratio region between a rich judged air-fuel ratio which is richer than the stoichiometric air-fuel ratio and a lean judged air-fuel ratio which is leaner than the stoichiometric air-fuel ratio over a stoichiometric air-fuel ratio maintenance judgment time or more or a time period until the cumulative oxygen excess/deficiency becomes a predetermined value or more, so that the air-fuel ratio of the exhaust gas which flows into the exhaust purification catalyst changes to the one air-fuel ratio side.

5. The exhaust purification system of an internal combustion engine according to claim 4,
   wherein the control device is further configured to control the target air-fuel ratios of the cylinders without performing the inter-cylinder air-fuel ratio control when the target average air-fuel ratio is set to one air-fuel ratio of either the rich air-fuel ratio or lean air-fuel ratio, if the air-fuel ratio which is detected by the downstream side air-fuel ratio sensor is maintained within the stoichiometric air-fuel ratio vicinity air-fuel ratio region over a stoichiometric air-fuel ratio maintenance judgment time or more or a time period until the cumulative oxygen excess/deficiency becomes a predetermined value or more, so that the target air-fuel ratios become equal at all of the cylinders.

6. The exhaust purification system of an internal combustion engine according to claim 1,
   wherein the control device is further configured to perform a lean stuck learning, which corrects the parameter relating to the air-fuel ratio so that the air-fuel ratio of the exhaust gas which flows into the exhaust purification catalyst changes to the rich side, in the learning control when the target average air-fuel ratio is set to the rich air-fuel ratio, if the output air-fuel ratio of the downstream side air-fuel ratio sensor is maintained at a lean air-fuel ratio which is leaner than the stoichiometric air-fuel ratio over at least a lean air-fuel ratio judgment time.

7. The exhaust purification system of an internal combustion engine according to claim 6,
wherein the control device is further configured to control the target air-fuel ratios of the cylinders without performing the inter-cylinder air-fuel ratio control when the target average air-fuel ratio is set to the rich air-fuel ratio, if the output air-fuel ratio of the downstream side air-fuel ratio sensor is maintained at a lean air-fuel ratio which is leaner than the lean judged air-fuel ratio over at least the lean air-fuel ratio judgment time, so that the target air-fuel ratios become equal at all of the cylinders.

8. The exhaust purification system of an internal combustion engine according to claim 1,
wherein the control device is further configured to perform a rich stuck learning, which corrects the parameter relating to the air-fuel ratio so that the air-fuel ratio of the exhaust gas which flows into the exhaust purification catalyst changes to the lean side, in the learning control when the target average air-fuel ratio is set to the lean air-fuel ratio, if the output air-fuel ratio of the downstream side air-fuel ratio sensor is maintained at a rich air-fuel ratio which is richer than the stoichiometric air-fuel ratio over a rich air-fuel ratio judgment time or more.

9. The exhaust purification system of an internal combustion engine according to claim 8,
wherein the control device is further configured to control the target air-fuel ratios of the cylinders so that the target air-fuel ratios become equal at all of the cylinders without performing the inter-cylinder air-fuel ratio control when the target average air-fuel ratio is set to the lean air-fuel ratio, if the output air-fuel ratio of the downstream side air-fuel ratio sensor is maintained at a rich air-fuel ratio which is richer than the rich judged air-fuel ratio over at least the rich air-fuel ratio judgment time.

10. The exhaust purification system of an internal combustion engine according to claim 1,
wherein the control device is further configured to:
calculate a learning value based on the difference between the cumulative value of the first oxygen amount and correct the parameter relating to the air-fuel ratio based on the learning value; and
store the learning value in a storage medium which is not erased including if an ignition key of the vehicle which mounts the internal combustion engine is turned on.

11. The exhaust purification system of an internal combustion engine according to claim 1 further comprising an upstream side air-fuel ratio which is arranged at an upstream side of the exhaust purification catalyst in the direction of flow of exhaust and which detects the air-fuel ratio of the exhaust gas which flows into the exhaust purification catalyst,
wherein the control device is further configured to calculate the oxygen excess/deficiency based on at least one of
the air-fuel ratio which is detected by the upstream side air-fuel ratio sensor and a flow amount of the exhaust gas which flows into the exhaust purification catalyst and a fuel injection amount.

12. The exhaust purification system of an internal combustion engine according to claim 1,
wherein the control device is further configured to use one of an air-fuel ratio forming the control center, the target average air-fuel ratio, and fuel feed amount as the parameter relating to the air-fuel.

13. The exhaust purification system of an internal combustion engine according to claim 1 further comprising an upstream side air-fuel ratio which is arranged at an upstream side of the exhaust purification catalyst in the direction of flow of exhaust and which detects the air-fuel ratio of the exhaust gas which flows into the exhaust purification catalyst,
wherein the control device is further configured to:
perform feedback control of the fuel feed amount to the combustion chamber so that the average air-fuel ratio which is detected by the upstream side air-fuel ratio sensor becomes the target average air-fuel ratio; and
use an output value of the upstream side air-fuel ratio sensor as the parameter relating to the air-fuel ratio.

14. The exhaust purification system of an internal combustion engine according to claim 1,
wherein the control device is further configured to set the target air-fuel ratios of the cylinders including when the average air-fuel ratio control is used so that the target average air-fuel ratio is set to the rich air-fuel ratio, so that the target air-fuel ratio becomes the lean air-fuel ratio at least one of the cylinders among the plurality of cylinders.

15. The exhaust purification system of an internal combustion engine according to claim 1, wherein the control device is further configured to set the target air-fuel ratios of the cylinders without performing the inter-cylinder air-fuel ratio control when the target average air-fuel ratio is set to the rich air-fuel ratio, so that the combustion air-fuel ratios become the rich air-fuel ratio at all of the plurality of cylinders.

16. The exhaust purification system of an internal combustion engine according to claim 1,
wherein the control device is further configured to:
switch the target average air-fuel ratio to the lean air-fuel ratio in the average air-fuel ratio control when setting the target average air-fuel ratio to the rich air-fuel ratio, if the output air-fuel ratio of the downstream side air-fuel ratio sensor becomes a rich judged air-fuel ratio which is richer than the stoichiometric air-fuel ratio or becomes less; and
switch the target average air-fuel ratio to the rich air-fuel ratio in the average air-fuel ratio control when controlling the target average air-fuel ratio to the lean air-fuel ratio, if the output air-fuel ratio of the downstream side air-fuel ratio sensor becomes a lean judged air-fuel ratio which is leaner than the stoichiometric air-fuel ratio or becomes more.

17. The exhaust purification system of an internal combustion engine according to claim 1,
wherein the control device is further configured to:
switch the target average air-fuel ratio to the lean air-fuel ratio in the average air-fuel ratio control when setting the target average air-fuel ratio to the rich air-fuel ratio, if the output air-fuel ratio of the downstream side air-fuel ratio sensor becomes one of equal to and less than a rich judged air-fuel ratio which is richer than the stoichiometric air-fuel ratio; and
switch the target average air-fuel ratio to the rich air-fuel ratio in the average air-fuel ratio control when the oxygen storage amount of the exhaust purification catalyst from when starting to control the target average air-fuel ratio to a lean air-fuel ratio reaches a predetermined switching reference storage amount which is smaller than the maximum storable oxygen amount of the exhaust purification catalyst.

* * * * *